United States Patent
Takagi

(10) Patent No.: US 8,588,475 B2
(45) Date of Patent: *Nov. 19, 2013

(54) IMAGE PROCESSING APPARATUS AND IMAGE PROCESSING METHOD FOR INDICATING MOVEMENT INFORMATION

(75) Inventor: Yoshinori Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 109 days.

This patent is subject to a terminal disclaimer.

(21) Appl. No.: 13/308,657

(22) Filed: Dec. 1, 2011

(65) Prior Publication Data

US 2012/0148107 A1  Jun. 14, 2012

(30) Foreign Application Priority Data

Dec. 9, 2010  (JP) .............................. P2010-274387

(51) Int. Cl.
*G06T 7/20*  (2006.01)
(52) U.S. Cl.
USPC .......................................... 382/107; 382/103
(58) Field of Classification Search
None
See application file for complete search history.

(56) References Cited

U.S. PATENT DOCUMENTS

| 6,609,064 | B1 * | 8/2003 | Dean ............................. 701/454 |
| 7,447,331 | B2 * | 11/2008 | Brown et al. ................. 382/103 |
| 7,561,989 | B2 * | 7/2009 | Banks et al. .................. 702/191 |
| 2009/0021576 | A1 * | 1/2009 | Linder et al. .................... 348/36 |

FOREIGN PATENT DOCUMENTS

JP  6-333048  12/1994

* cited by examiner

*Primary Examiner* — Anand Bhatnagar
*Assistant Examiner* — Samah Beg
(74) *Attorney, Agent, or Firm* — Sony Corporation

(57) ABSTRACT

An image processing apparatus including: a representative image creating section which creates a representative image on the basis of images of respective screens which form a predetermined scene; and a symbol drawing section which draws, on the basis of a movement of a target portion of each screen in the predetermined scene, a symbol indicating the movement of the target portion in a peripheral section of the representative image created by the representative image creating section.

15 Claims, 35 Drawing Sheets

FIG. 3

| FRAME NO. | TARGET PORTION MOVEMENT Mv | STAYING NUMBER | ACCUMULATED VALUE | |
|---|---|---|---|---|
| 1 | 0 | 0 | 0 | ⎫ |
| 2 | 0 | 0 | 0 | |
| 3 | 0 | 0 | 0 | |
| 4 | 0 | 0 | 0 | |
| 5 | 0 | 0 | 0 | 10 FRAMES STAYING |
| 6 | 0 | 0 | 0 | |
| 7 | 0 | 0 | 0 | |
| 8 | 0 | 0 | 0 | |
| 9 | 0 | 0 | 0 | |
| 10 | 0 | 10 | 0 | ⎭ |
| 11 | 50 | 1 | 50 | ⎫ |
| 12 | 50 | 1 | 100 | |
| 13 | 50 | 1 | 150 | |
| 14 | 50 | 1 | 200 | 7 FRAMES IN MOVEMENT 50 |
| 15 | 50 | 1 | 250 | |
| 16 | 50 | 1 | 300 | |
| 17 | 50 | 1 | 350 | ⎭ |
| 18 | 100 | 1 | 450 | ⎫ ACCELERATING |
| 19 | 150 | 1 | 600 | ⎭ |
| 20 | 200 | 1 | 800 | ⎫ |
| 21 | 200 | 1 | 1000 | 3 FRAMES IN MOVEMENT 200 |
| 22 | 200 | 1 | 1200 | ⎭ |
| 23 | 150 | 1 | 1350 | ⎫ |
| 24 | 100 | 1 | 1450 | DECELERATING |
| 25 | 50 | 1 | 1500 | ⎭ |
| 26 | 0 | 0 | 1500 | ⎫ |
| 27 | 0 | 0 | 1500 | |
| 28 | 0 | 0 | 1500 | 15 FRAMES STAYING |
| ⋮ | ⋮ | ⋮ | 0 | |
| 40 | 0 | 15 | 1500 | ⎭ |

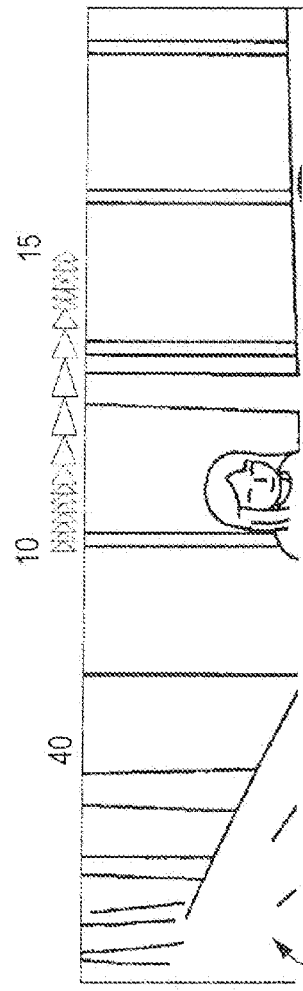
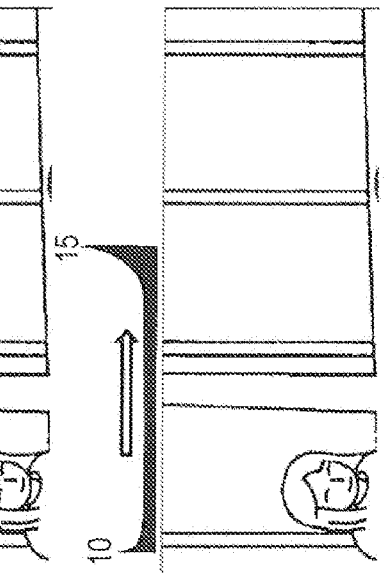
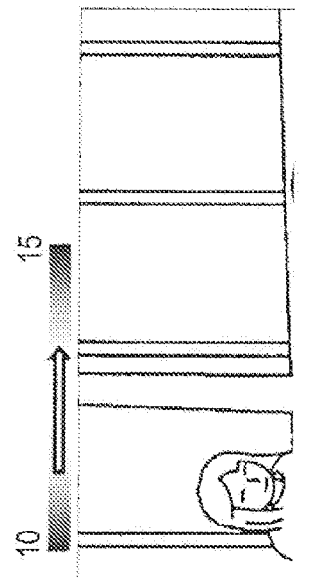
FIG. 10A
FIG. 10B
FIG. 10C

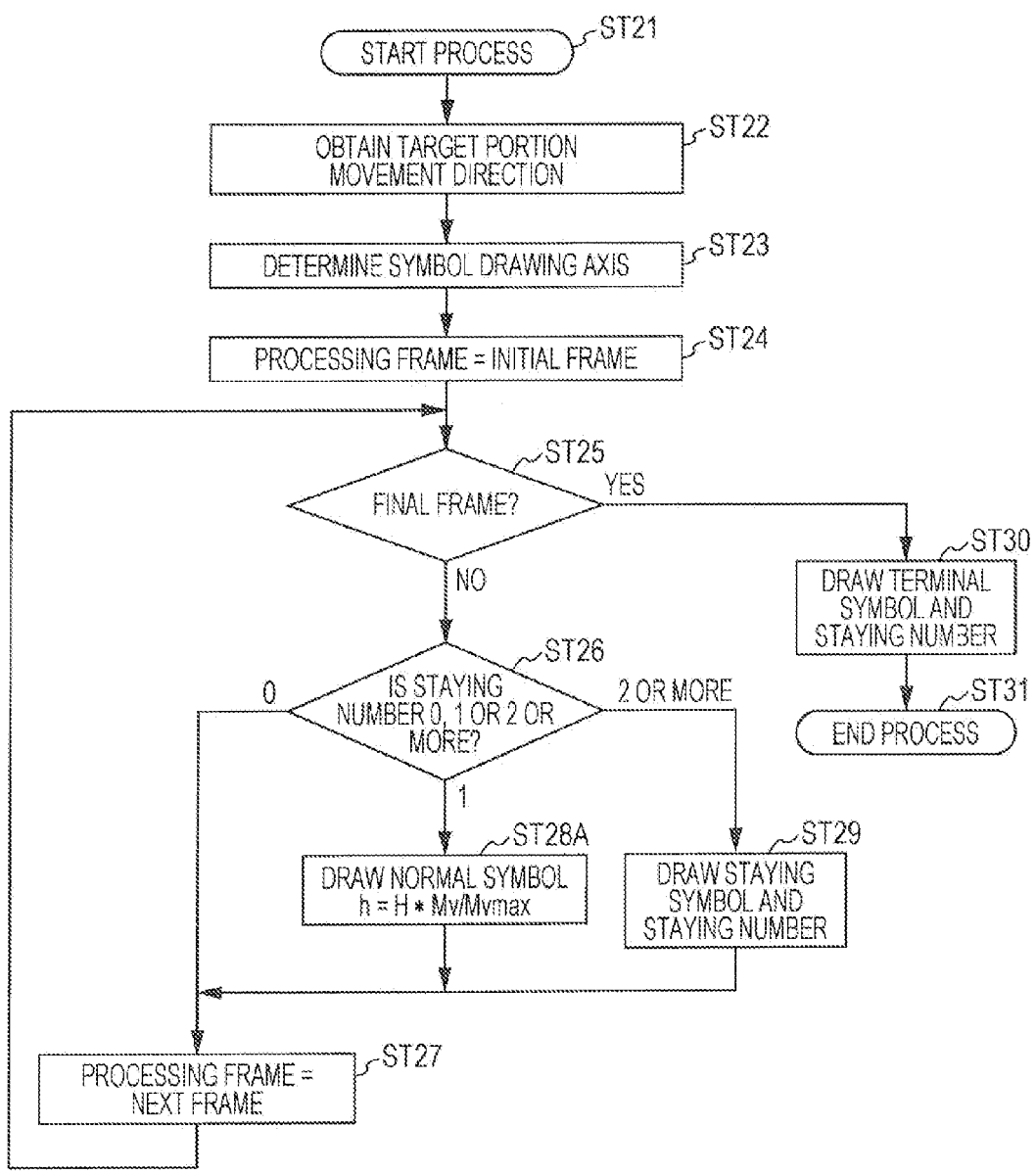

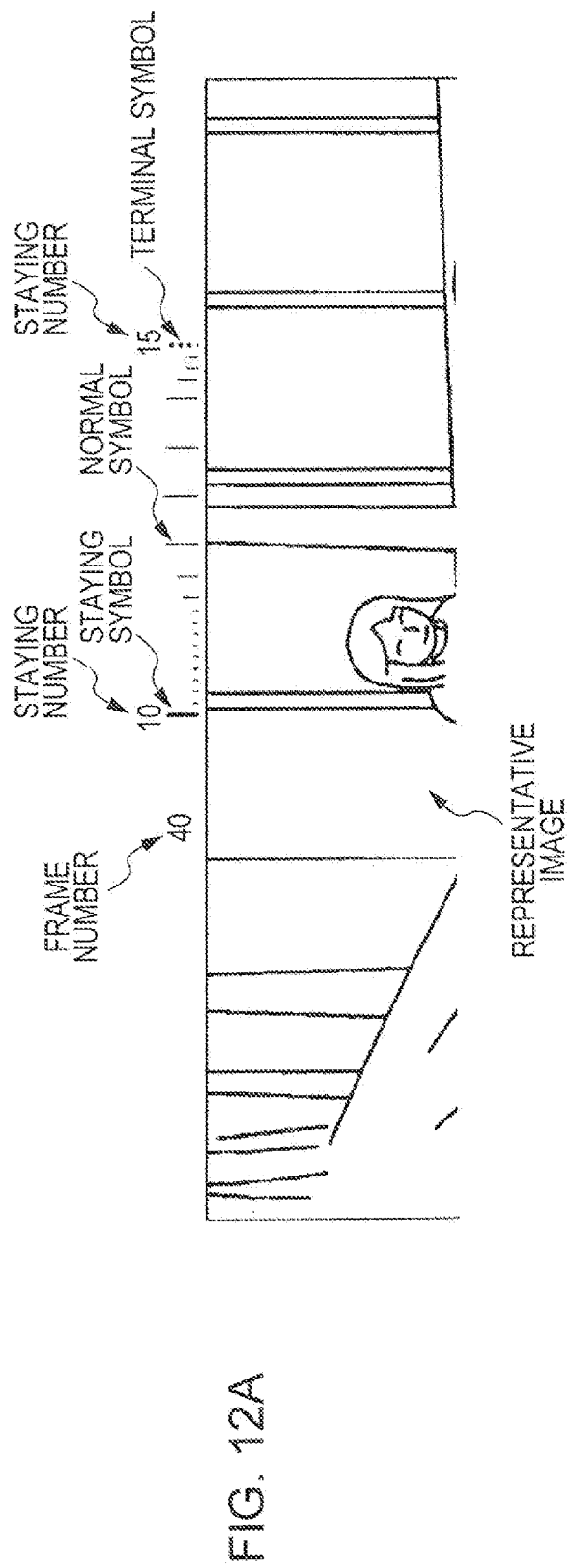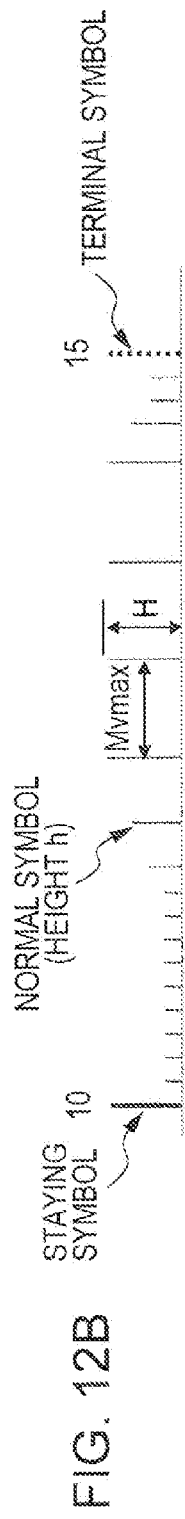
FIG. 12A
FIG. 12B

FIG. 25

| FRAME NO. | TARGET PORTION MOVEMENT Mv | STAYING NUMBER | ACCUMULATED VALUE | MOVEMENT DIFFERENCE | CONSTANT VELOCITY NUMBER | |
|---|---|---|---|---|---|---|
| 1 | 0 | 0 | 0 | 0 | 0 | ⎫ |
| 2 | 0 | 0 | 0 | 0 | 0 | |
| 3 | 0 | 0 | 0 | 0 | 0 | |
| 4 | 0 | 0 | 0 | 0 | 0 | |
| 5 | 0 | 0 | 0 | 0 | 0 | 10 FRAMES STAYING |
| 6 | 0 | 0 | 0 | 0 | 0 | |
| 7 | 0 | 0 | 0 | 0 | 0 | |
| 8 | 0 | 0 | 0 | 0 | 0 | |
| 9 | 0 | 0 | 0 | 0 | 0 | |
| 10 | 0 | 10 | 0 | 0 | 10 | ⎭ |
| 11 | 50 | 1 | 50 | 50 | 0 | ⎫ |
| 12 | 50 | 1 | 100 | 0 | 0 | |
| 13 | 50 | 1 | 150 | 0 | 0 | |
| 14 | 50 | 1 | 200 | 0 | 0 | 7 FRAMES IN MOVEMENT 50 |
| 15 | 50 | 1 | 250 | 0 | 0 | |
| 16 | 50 | 1 | 300 | 0 | 0 | |
| 17 | 50 | 1 | 350 | 0 | 7 | ⎭ |
| 18 | 100 | 1 | 450 | 50 | 1 | ⎫ ACCELERATING |
| 19 | 150 | 1 | 600 | 50 | 1 | |
| 20 | 200 | 1 | 800 | 50 | 1 | ⎭ |
| 21 | 200 | 1 | 1000 | 0 | 0 | ⎫ 3 FRAMES IN MOVEMENT 200 |
| 22 | 200 | 1 | 1200 | 0 | 2 | ⎭ |
| 23 | 150 | 1 | 1350 | -50 | 1 | ⎫ |
| 24 | 100 | 1 | 1450 | -50 | 1 | DECELERATING |
| 25 | 50 | 1 | 1500 | -50 | 1 | ⎭ |
| 26 | 0 | 0 | 1500 | 0 | 0 | ⎫ |
| 27 | 0 | 0 | 1500 | 0 | 0 | |
| 28 | 0 | 0 | 1500 | 0 | 0 | 15 FRAMES STAYING |
| ⋮ | ⋮ | ⋮ | | | | |
| 40 | 0 | 15 | 1500 | 0 | 15 | ⎭ |

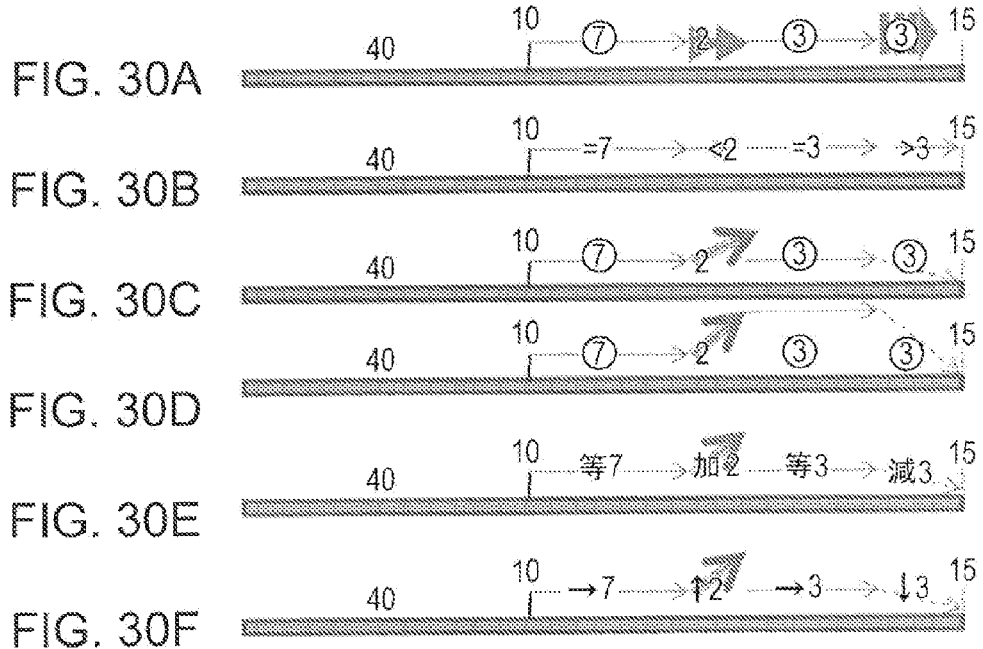

IMAGE PROCESSING APPARATUS AND IMAGE PROCESSING METHOD FOR INDICATING MOVEMENT INFORMATION

BACKGROUND

The present disclosure relates to an image processing apparatus and an image processing method, and in particular, to an image processing apparatus and the like in which movement information on a target portion is added to a representative image of each scene.

In the related art, a technique has been proposed which processes an image signal which is photographed or created, selects a predetermined screen (for example, initial screen or the like) every scene, and uses an image of the screen as a representative image (refer to Japanese Unexamined Patent Application Publication No. 06-333048, for example). In this case, it is difficult for a reader, an editor or the like to grasp the entire movement of a target portion in the scene such as a figure or an object.

In the related art, in order to indicate the movement of the target portion, a technique has been studied in which a movement vector is attached to the target portion such as a figure or an object of the representative image, as shown in FIG. 39, for example. However, even in this case, it is difficult for a reader, an editor or the like to grasp the entire movement in the scene.

SUMMARY

As mentioned above, in the techniques in the related art in which the representative image of each scene is created or the movement vector is added to the target portion of the representative image, it is difficult for a reader, an editor or the like to grasp the entire movement of the target portion such as a figure or an object. That is, it is difficult for the reader, the editor or the like to generally perceive the movement of the target portion in the scene.

Accordingly, it is desirable to provide a technique which is capable of easily grasping the entire movement of a target portion in a scene.

According to an embodiment of the present disclosure, there is an image processing apparatus including: a representative image creating section which creates a representative image on the basis of images of respective screens which form a predetermined scene; and a symbol drawing section which draws, on the basis of a movement of a target portion of each screen in the predetermined scene, a symbol indicating the movement of the target portion in a peripheral section of the representative image created by the representative image creating section.

In this case, the representative image is created by the representative image creating section, on the basis of the images of the respective screens which form the predetermined scene. For example, an image of a predetermined screen, for example, of a leading screen among the images of the respective screens which form the predetermined scene may be selected as the representative image. Further, for example, a united image obtained by connecting the images of the respective screens which form the predetermined scene may be created as the representative image. Further, for example, a composite image obtained by overlapping the images of the respective screens which form the predetermined scene may be created as the representative image.

The symbol indicating the movement of the target portion is drawn in the peripheral section of the representative image created by the representative image creating section, by the symbol drawing section. For example, the movement of the target portion of each screen which forms the predetermined scene is provided from the outside together with an image signal of the predetermined scene, or is calculated by processing the image signal of the predetermined scene using a target portion movement calculating section. This process is a process of calculating a movement vector of the target portion which is selected by a manual operation of an editor or is automatically selected, for example.

In this way, according to this embodiment of the present disclosure, the symbol indicating the movement of the target portion is drawn in the peripheral section of the representative image of the scene. Accordingly, it is possible for a reader, an editor or the like to easily generally perceive the movement of the target portion in the scene.

In this embodiment of the present disclosure, for example, the image processing apparatus may further include a staying number calculating section which calculates a staying number of the target portion of each screen on the basis of the movement of the target portion of each screen in the predetermined scene. Further, when it is determined that the target portion of a predetermined screen is staying, the staying number calculating section may set the staying number of the target portion of the predetermined screen to 0 and may increment a staying counter by 1, and when it is determined that the target portion of the predetermined screen is not staying, the staying number calculating section may set the staying number of the target portion of an immediately previous screen to a value of the staying counter, may set the staying number of the target portion of the predetermined screen to 1, may set the value of the staying counter to 1, and may set to a staying number of the target portion of a final screen to the value of the staying counter. Further, the symbol drawing section may draw the symbol indicating the movement of the target portion in the peripheral section of the representative image created by the representative image creating section on the basis of the staying number of the target portion of each screen calculated by the staying number calculating section.

Further, in this embodiment, for example, the symbol drawing section may draw the symbol in a position corresponding to the target portion of the predetermined screen in the peripheral section of the representative image when the staying number of the target portion of the predetermined screen is 1 or more.

Further, in this embodiment, for example, the symbol drawing section may draw, as the symbol, a normal symbol in the position corresponding to the target portion of the predetermined screen in the peripheral section of the representative image when the staying number of the target portion of the predetermined screen is 1 or more and N or less (N is an integer which is equal to or lager than 1), and may draw, as the symbol, a staying symbol in the position corresponding to the target portion of the predetermined screen in the peripheral section of the representative image when the staying number of the target portion of the predetermined screen exceeds N.

Further, in this embodiment, for example, the symbol drawing section may draw, as the symbol, a symbol of a line segment shape which extends in a direction perpendicular to a movement direction of the target portion, and may set the length of the normal symbol drawn when the staying number of the target portion of the predetermined screen is N or less to a length corresponding to the magnitude of the movement of the target portion of the predetermined screen. For example, the symbol drawing section may calculate the length h of the normal symbol drawn when the staying number of the target portion of the predetermined screen is 1 or more and N or less according to an expression H*Mv/Mvmax, where the length, in the direction perpendicular to the movement direction of the target portion, of a display region of the peripheral section in an output device is H, a maximum movement among the movements of the target portion is Mvmax, and the movement of the target portion of each screen is Mv. In this case, the length of the normal symbol drawn in each screen corresponds to the movement of the target portion of the screen, so that the amount of information indicated by the normal symbol can be increased.

Further, in this embodiment, for example, the symbol drawing section may determine the proximity between the drawn symbols, and may change a drawing state of the normal symbol drawn when the staying number of the target portion of the predetermined screen is 1 or more and N or less on the basis of the determination result. In this case, for example, the symbol drawing section may calculate a distance d between the closest symbols in the display region according to an expression W*Vmin/S, where the length of one screen in the movement direction of the target portion is S, a minimum movement among the movements of the target portion, in which it is determined that the target portion is not staying, is Vmin, and the length in the movement direction of the target portion of the display region of the representative image in the output device is W, and may determine the proximity between the symbols on the basis of the distance d. In this way, it is possible to change the drawing state of the symbol drawn when the staying number of the predetermined screen is N or less on the basis of the proximity determination result of the symbols. Further, even in a case where the display size of the representative image in the output device is small, it is possible to easily grasp the movement of the target portion from the drawn symbol.

In this embodiment, for example, the symbol drawing section may draw the normal symbol every predetermined number of screens so that the distance between the drawn symbols in the movement direction of the target portion exceeds a predetermined value in the display region of the output device. In this case, since the normal symbol is thinned out to be drawn, even in a case where the display size of the representative image in the output device is small, it is possible to prevent the difficulty in grasping the movement of the target portion due to excessive mixture of the drawn normal symbols.

In this embodiment of the present disclosure, for example, the symbol drawing section may draw, as the symbol, a symbol of a line segment shape which extends in a direction perpendicular to a direction of the target portion, may calculate the length h of the normal symbol drawn when the staying number of the target portion of the predetermined screen is 1 or more and N or less according to an expression H*Mv/Mvmax where the length, in the direction perpendicular to the movement direction of the target portion, of a display region of the peripheral section in an output device is H, a maximum movement among the movements of the target portion is Mvmax, and the movement of the target portion of each screen is Mv, and may draw the normal symbol drawn every predetermined number of screens deeply and draws the normal symbol in a different screen lightly.

In this case, since the normal symbol deeply drawn is thinned out, even in a case where the display size of the representative image in the output device is small, it is possible to prevent the difficulty in grasping the movement of the target portion due to excessive mixture of the drawn normal symbols. Further, in this case, the length of the normal symbol drawn in each screen corresponds to the movement of the target portion of the screen, so that the amount of information indicated by the normal symbol can be increased.

Further, in this embodiment of the present disclosure, for example, when the distance between the drawn symbols in the movement direction of the target portion is smaller than a predetermined value in the display region of the output device, the symbol drawing section may draw an acceleration symbol corresponding to an acceleration period, may draw a constant velocity symbol corresponding to a constant velocity period, and may draw a deceleration symbol corresponding to a deceleration period, according to a movement difference of the target portion between each screen and its previous screen.

In this case, the degenerated symbols (acceleration symbol, constant velocity symbol and deceleration symbol) indicating the movement of the target portion are drawn. Thus, in a case where the display size of the representative image in the output device is small, it is possible to reduce the number of symbols which are drawn, and to prevent the difficulty in grasping the movement of the target portion due to excessive mixture of the drawn symbols. Further, in this case, it is possible to easily grasp the acceleration period, the constant velocity period and the deceleration period of the target portion.

Further, in this embodiment of the present disclosure, for example, the image processing apparatus may further include a constant velocity number calculating section which calculates a constant velocity number of each screen on the basis of the movement difference of the target portion between each screen and its previous screen in the predetermined scene. Here, when it is determined that the target portion of the predetermined screen is staying, the constant velocity number calculating section may set the constant velocity number of the predetermined screen to 0 and may increment a constant velocity counter by 1, and when it is determined that the target portion of the predetermined screen is not staying, the constant velocity number calculating section may set the constant velocity number of an immediately previous screen to a value of the constant velocity counter, may set the constant velocity number of the predetermined screen to 1, and may set the value of the constant velocity counter to 1. Further, the symbol drawing section may display the acceleration symbol or the deceleration symbol in the position corresponding to the predetermined screen in the peripheral section of the representative image when the constant velocity number of the predetermined screen is 1 or more and M or less (M is an integer which is equal to or lager than 1), and may draw the constant velocity symbol in the position corresponding to the predetermined screen in the peripheral section of the representative image when the constant velocity number of the predetermined screen exceeds M.

For example, the constant velocity number calculating section may determine whether the target portion of the predetermined screen moves at a constant velocity according to whether the movement difference of the target portion of the predetermined screen is within the range of a threshold. Further, for example, the staying number calculating section may determine whether the target portion of the predetermined screen moves at a constant velocity according to whether an accumulated value of an accumulating section which accumulates the movement differences of the target portion of the respective screens is within the range of a threshold, and may set the accumulated value of the accumulating section to 0 if it is determined that the target portion of the predetermined screen does not move at the constant velocity.

According to the embodiment of the present disclosure, since the symbol indicating the movement of the target portion is drawn in the peripheral section of the representative image of the scene, it is possible for a reader, an editor or the like to easily grasp the entire movement of the target portion in the scene. That is, it is possible for the reader, the editor or the like to generally perceive the movement of the target portion in the scene.

BRIEF DESCRIPTION OF THE DRAWINGS

FIG. 3 is a diagram illustrating an example of a target portion movement Mv of each frame, and a staying number and an accumulated value of each frame (each screen) calculated in a staying number calculating process in a case where the number of frames (screens) which form a predetermined scene is 40.

FIGS. 10A to 10C are diagrams illustrating an example, other than line segments, of symbols indicating movements of a target portion.

FIG. 11 is a flowchart illustrating an example of a process routine of a symbol drawing section.

FIGS. 12A and 12B are diagrams illustrating a drawing example according to a symbol drawing process.

FIG. 25 is a diagram illustrating an example of a target portion movement Mv of each frame, and a staying number, an accumulated value, a movement difference and a constant velocity number obtained by the target portion movement Mv of each frame, in a case where the number of frames (screens) which form a predetermined scene is 40.

FIG. 29 is a diagram illustrating a modification of degenerated symbols of acceleration, constant velocity and deceleration.

FIGS. 30A to 30F are diagrams illustrating drawing examples using degenerated symbols.

DETAILED DESCRIPTION OF EMBODIMENTS

Hereinafter, embodiments according to the present disclosure will be described in the following order.
 1. First embodiment
 2. Second embodiment
 3. Third embodiment
 4. Fourth embodiment
 5. Fifth embodiment

1. First Embodiment

[Configuration Example of Image Processing Apparatus]

Figure 1:
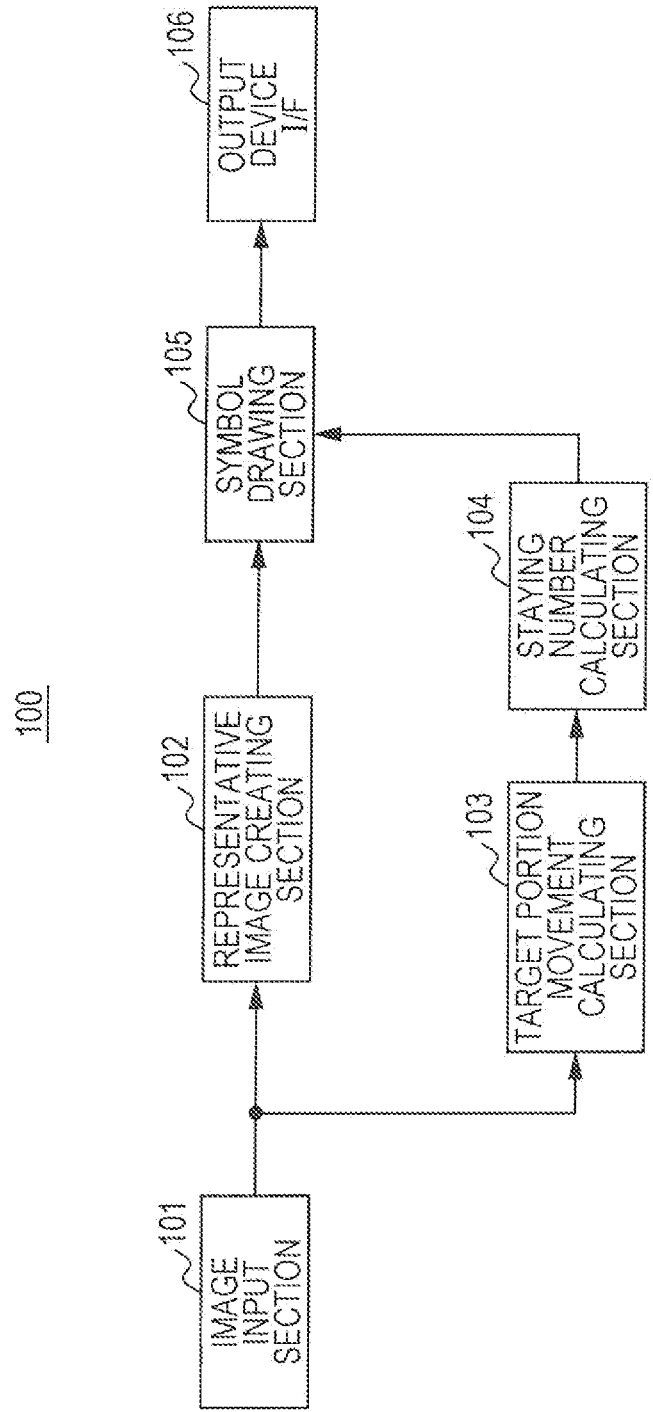
FIG. 1 is a block diagram illustrating a configuration example of an image processing apparatus according to a first embodiment of the present disclosure.

FIG. 1 illustrates a configuration example of an image processing apparatus 100 according to a first embodiment. The image processing apparatus 100 includes an image input section 101, a representative image creating section 102, a target portion movement calculating section 103, a staying number calculating section 104, a symbol drawing section 105, an output device interface (I/F) 106.

The image input section 101 inputs an image signal of a processing target. The image signal of the processing target is obtained by photographing of an imaging device (camera), for example, and is directly supplied from the imaging device (camera) or is supplied by being read from a predetermined recording medium. Further, the image input section 101 processes the input image signal to detect a scene change point, divides the input image signals for each scene, and sequentially supplies the image signals of each scene to the representative image creating section 102 and the target portion movement calculating section 103.

The representative image creating section 102, the target portion movement calculating section 103, the staying number calculating section 104 and the symbol drawing section 105 sequentially process the respective scenes. Here, respective sections will be described using a scene which is a processing target as a predetermined scene.

The representative image creating section 102 creates a representative image on the basis of the image signals of respective screens which form a predetermined scene. In this case, for example, an image of a predetermined one screen, for example, of one leading screen is selected from images of the respective screens which form the predetermined scene, to be created as the representative image. Further, for example, a composite image obtained by overlapping the images of the respective screens which form the predetermined scene is created as the representative image.

Further, for example, in a case where the predetermined scene is photographed using a pan or tilt technique, for example, a united image obtained by connecting the images of the respective screens which form the predetermined scene is created as the representative image. A detailed description about a technique which creates the united image is omitted, which is disclosed in Japanese Unexamined Patent Application Publication No. 07-298137, Japanese Unexamined Patent Application Publication No. 06-326965, or the like as techniques in the related art. For example, the representative image creating section 102 calculates entire screen movements (movement vectors) of the respective screens which form the predetermined scene, and connects the respective images on the basis of the calculated entire screen movements of the respective screens to create the united image.

The target portion movement detecting section 103 processes the image signals of the predetermined scene, and calculates a movement (movement vector) of a target portion of the respective screens in the predetermined scene. A detailed description about the calculation technique of the movement of the target portion is omitted. Such technique is disclosed in the related art, for example, in Japanese Unexamined Patent Application Publication No. 2006-07345 or the like. For example, the target portion movement detecting section 103 performs a process of tracking the target portion in the respective screens to sequentially obtain the movements (movement vectors) of the target portion of the respective screens.

Here, the target portion may be, for example, a figure, an object or the like. The target portion is selected by a manual operation of an editor, or is automatically selected using a face detection technique or a figure detection technique in the related art. For example, the manual operation selection technique is disclosed in the Japanese Unexamined Patent Application Publication No. 2006-07345.

The staying number calculating section 104 calculates the staying numbers of the target portion of the respective screens on the basis of the movements of the target portion of the respective screens in the predetermined scene calculated by the target portion movement detecting section 103.

[Staying Number Calculating Process]

Figure 2:
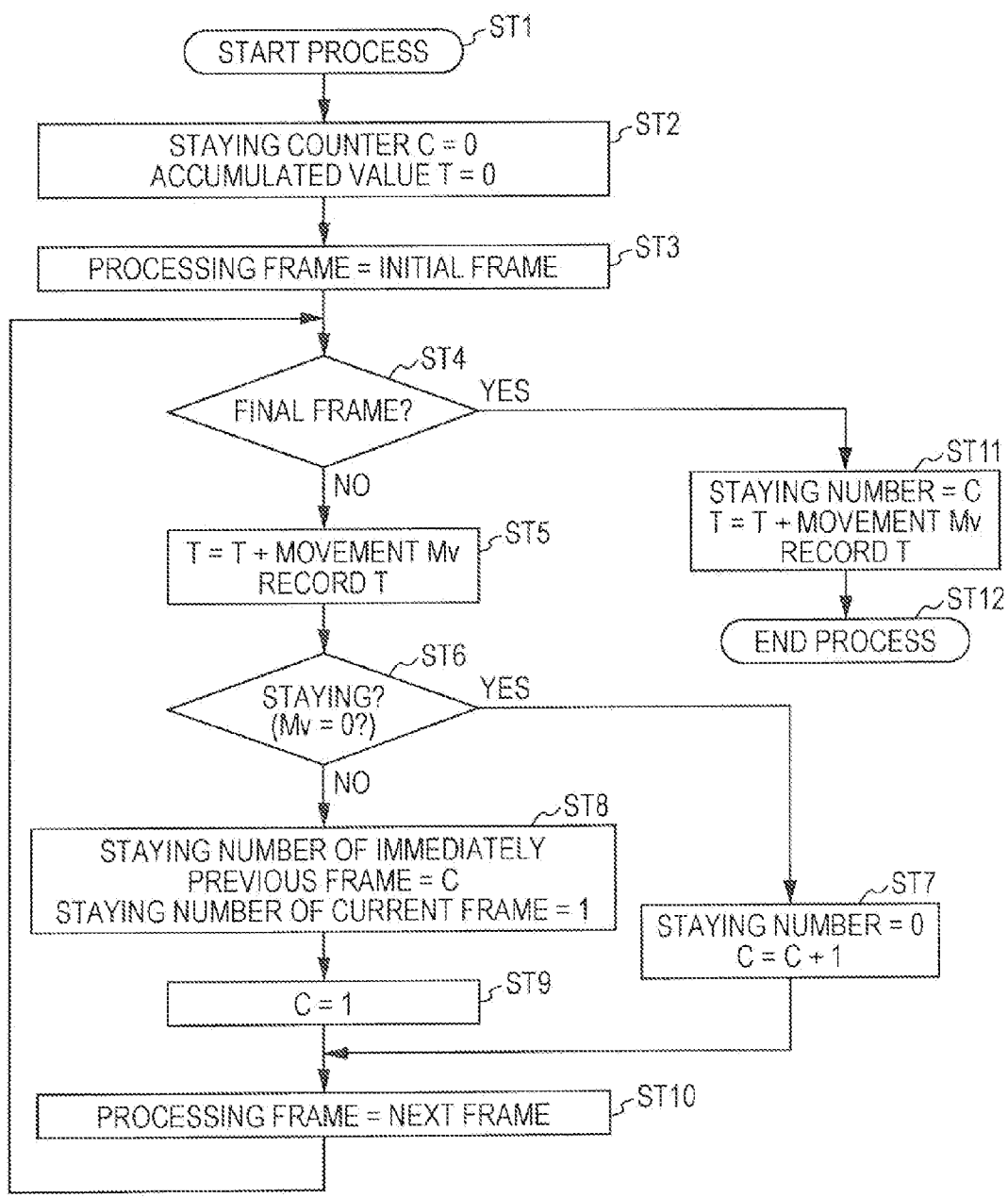
FIG. 2 is a flowchart illustrating an example of a process routine in a staying number calculating section.

FIG. 2 is a flowchart illustrating an example of a process routine in the staying number calculating section 104. The staying number calculating section 104 starts a process in step ST1, and then allows the routine to proceed to step ST2. In step ST2, the staying number calculating section 104 sets a value of a staying counter C to 0, and sets an accumulated value (accumulated movement amount) T to 0. Further, the staying number calculating section 104 sets a processing frame (processing screen) to an initial frame (initial screen) in step ST3.

Next, the staying number calculating section 104 determines whether the processing frame is a final frame (final screen) in step ST4. If the processing frame is not the final frame, the staying number calculating section 104 allows the routine to proceed to step ST5. In step ST5, the staying number calculating section 104 adds a target portion movement Mv of a current frame to the accumulated value T to calculate the accumulated value T in the current frame, and records the accumulated value T as an accumulated value of the current frame.

Next, the staying number calculating section 104 determines whether the target portion is staying in step ST6. Here, the staying number calculating section 104 determines whether the target portion is staying according to whether the target portion movement Mv of the current frame is 0. That is, the staying number calculating section 104 determines that the target portion is staying when Mv is 0, and determines that the target portion does not stay when Mv is 1 or more.

If it is determined that the target portion is staying, the staying number calculating section 104 allows the routine to proceed to step ST7. In step ST7, the staying number calculating section 104 sets a staying number of the current frame to 0, and increments the value of the staying counter C by 1. On the other hand, if it is determined that the target portion is not staying, the staying number calculating section 104 allows the routine to proceed to step ST8. In step ST8, the staying number calculating section 104 sets the staying number of an immediately previous frame (screen) to the value of the staying counter C, and sets the staying number of the current frame to 1. Further, in step ST9, the staying number calculating section 104 sets the value of the staying counter C to 1.

After the operations of step ST7 and step ST9, the staying number calculating section 104 allows the routine to proceed to step ST10. In step ST10, the staying number calculating section 104 sets the processing frame to the next frame, and then the routine returns to step ST4.

Further, if the processing frame is the final frame in step ST4, the staying number calculating section 104 allows the routine to proceed to step ST11. In step ST11, the staying number calculating section 104 sets the staying number of the current frame (=final frame) to the value of the staying counter C. Further, in step ST11, the staying number calculating section 104 adds the target portion movement Mv of the current frame to the accumulated value T to calculate the accumulated value T in the current frame, and records the accumulated value T as an accumulated value of the current frame (=final frame). Further, the staying number calculating section 104 terminates the process, in step ST12.

FIG. 3 illustrates an example of a target portion movement Mv of each frame, a staying number and an accumulated value of each frame (each screen) calculated in the process of the flowchart in FIG. 2, in a case where the number of frames (screens) which form a predetermined scene is 40. In this example, since the target portion movements Mv are 0 in frames 1 to 10, it is determined that the target portion is continuously staying. Further, since the target portion movement Mv is 50 in frame 11, it is determined that the target portion is not staying. Thus, the staying numbers in frames 1 to 9 is 0, and the staying number in frame 10 is 10.

Further, in this example, since the target portion movements Mv are not 0 in frames 11 to 25, it is determined that the target portion does not stay continuously. Thus, the staying numbers in frames 11 to 25 are 1. Further, in this example, since the target portion movements Mv are 0 in frames 26 to 39, it is determined that the target portion is continuously staying. Thus, the staying numbers in frames 26 to 39 are 0, and the staying number in frame 40 which is the final frame is 15.

The symbol drawing section 105 draws a symbol indicating the movement of the target portion in a peripheral section of a representative image created by the representative image creating section 102, on the basis of the staying number of each screen calculated by the staying number calculating section 104. Further, the symbol drawing section 105 supplies an image signal (image data) of the representative image in which the symbol indicating the movement of the target portion is drawn in the peripheral section thereof to the output device interface (I/F) 106.

[Symbol Drawing Process]

Figure 4:
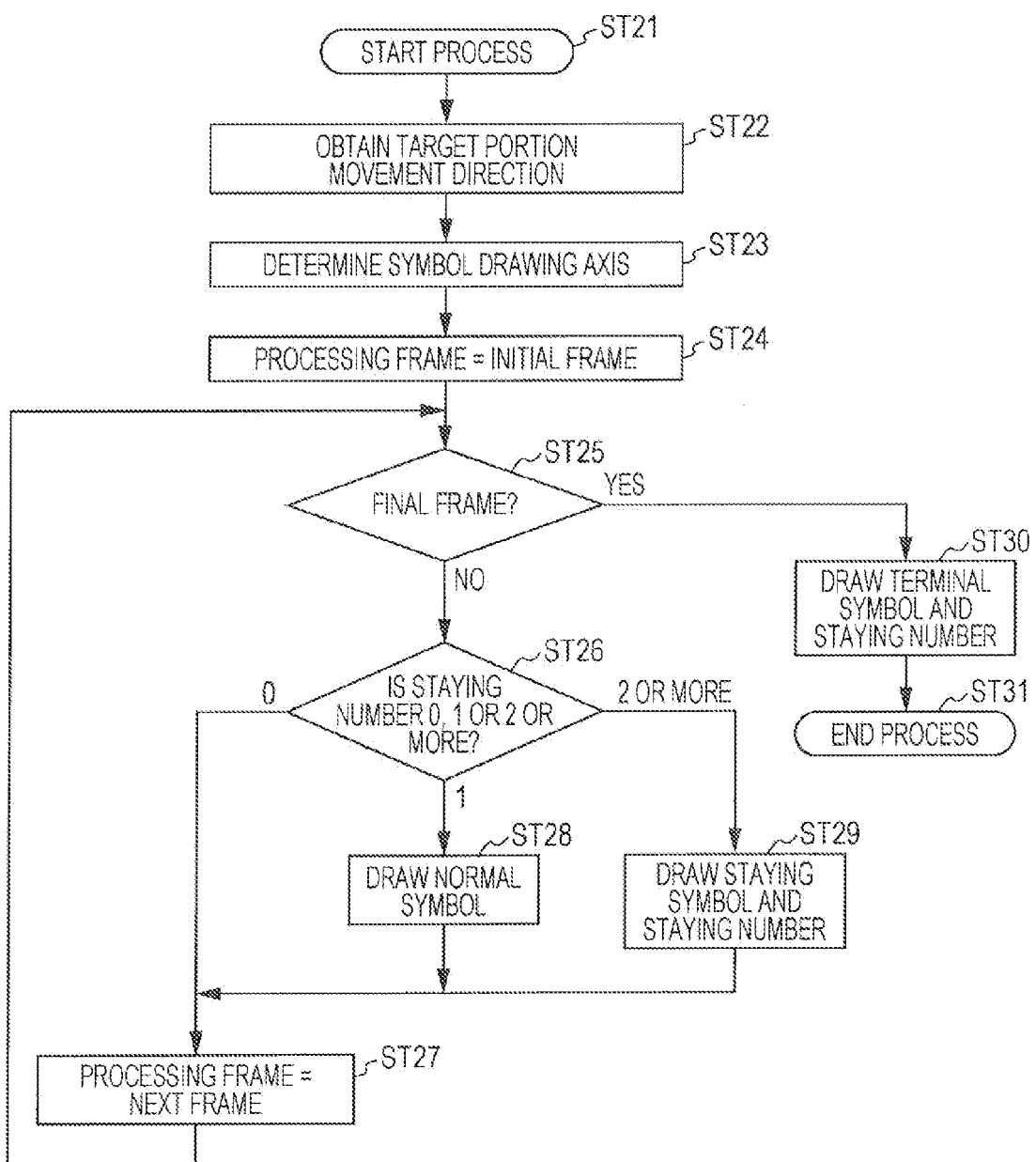
FIG. 4 is a flowchart illustrating an example of a process routine in a symbol drawing section.

FIG. 4 is a flowchart illustrating an example of a process routine in the symbol drawing section 105. The symbol drawing section 105 starts the process in step ST21, and then allows the routine to proceed to step ST22. In step ST22, the symbol drawing section 105 obtains a movement direction of the target portion. For example, a horizontal direction, a vertical direction, a tilt direction (both of the horizontal direction and the vertical direction), or the like is used as the movement direction. In this case, the symbol drawing section 105 obtains the movement direction of the target portion, on the basis of the movement (movement vector) of the target portion of each screen calculated by the target portion movement calculating section 103, for example.

Although not described above, in a case where the movement direction of the target portion is one direction (horizontal direction or vertical direction), the target portion movement calculating section 103 calculates the movement in one direction, and the staying number calculating section 104 calculates a staying number (see FIG. 3) with respect to the movement in one direction. Further, in a case where the movement direction of the target portion is the tilt direction, the target portion movement calculating section 103 calculates a movement in each of the horizontal direction and the vertical direction, and the staying number calculating section 104 calculates a staying number with respect to the movement in each of the horizontal direction and the vertical direction.

In a case where the movement direction is one direction of the horizontal direction and the vertical direction, the symbol drawing process through the following respective steps is performed only with respect to the one direction. Further, in a case where the movement direction is both of the horizontal direction and the vertical direction in the tilt direction, the symbol drawing process through the following respective steps is performed with respect to each direction.

Next, the symbol drawing section 105 determines a symbol drawing axis, in step ST23. In this case, the symbol drawing section 105 determines the symbol drawing axis to correspond to the movement direction of the target portion obtained in step ST22. For example, in a case where the movement direction of the target portion is the horizontal direction, the symbol drawing axis is determined as the horizontal direction. Further, the symbol drawing section 105 sets a processing frame (processing screen) to an initial frame (initial screen), in step ST24.

Next, the symbol drawing section 105 determines in step ST25 whether the processing frame is a final frame (final screen). If the processing frame is not the final frame, the symbol drawing section 105 allows the routine to proceed to step ST26. In step ST26, the symbol drawing section 105 determines whether the staying number is 0, 1, or 2 or more.

If the staying number is 0, the symbol drawing section 105 sets the processing frame to the next frame in step ST27, and then returns the routine to step ST25. Further, if the staying number is 1, the symbol drawing section 105 allows the routine to proceed to step ST28. In step ST28, the symbol drawing section 105 draws a normal symbol as a symbol in a position corresponding to the target portion of the current frame (current screen) of the representative image. Further, after the operation of step ST28, the symbol drawing section 105 sets the processing frame to the next frame in step ST27, and then returns the routine to step ST25.

Further, if the staying number is 2 or more, the symbol drawing section 105 allows the routine to proceed to step ST29. In step ST29, the symbol drawing section 105 draws a staying symbol as a symbol in a position corresponding to the target portion of the current frame (current screen) of the representative image. The staying symbol may be differentiated from the normal symbol according to its shape, size, pattern, color or the like.

Further, the symbol drawing section 105 also draws the staying number in a position corresponding to the drawing position of the staying symbol, in step ST29. Further, after the operation of step ST29, the symbol drawing section 105 sets the processing frame to the next frame in step ST27, and then returns the routine to step ST25.

Further, if the processing frame is the final frame in step ST25, the symbol drawing section 105 allows the routine to proceed to step ST30. In step ST30, the symbol drawing section 105 draws a terminal symbol as a symbol in a position corresponding to the target portion of the current frame (=final frame) of the representative image. The terminal symbol may be differentiated from the normal symbol and the staying symbol according to its shape, size, pattern, color or the like.

Further, the symbol drawing section 105 also draws the staying number in a position corresponding to the drawing position of the terminal symbol, in step ST30. Further, after the operation of step ST30, the symbol drawing section 105 terminates the process in step ST31.

Figure 5:
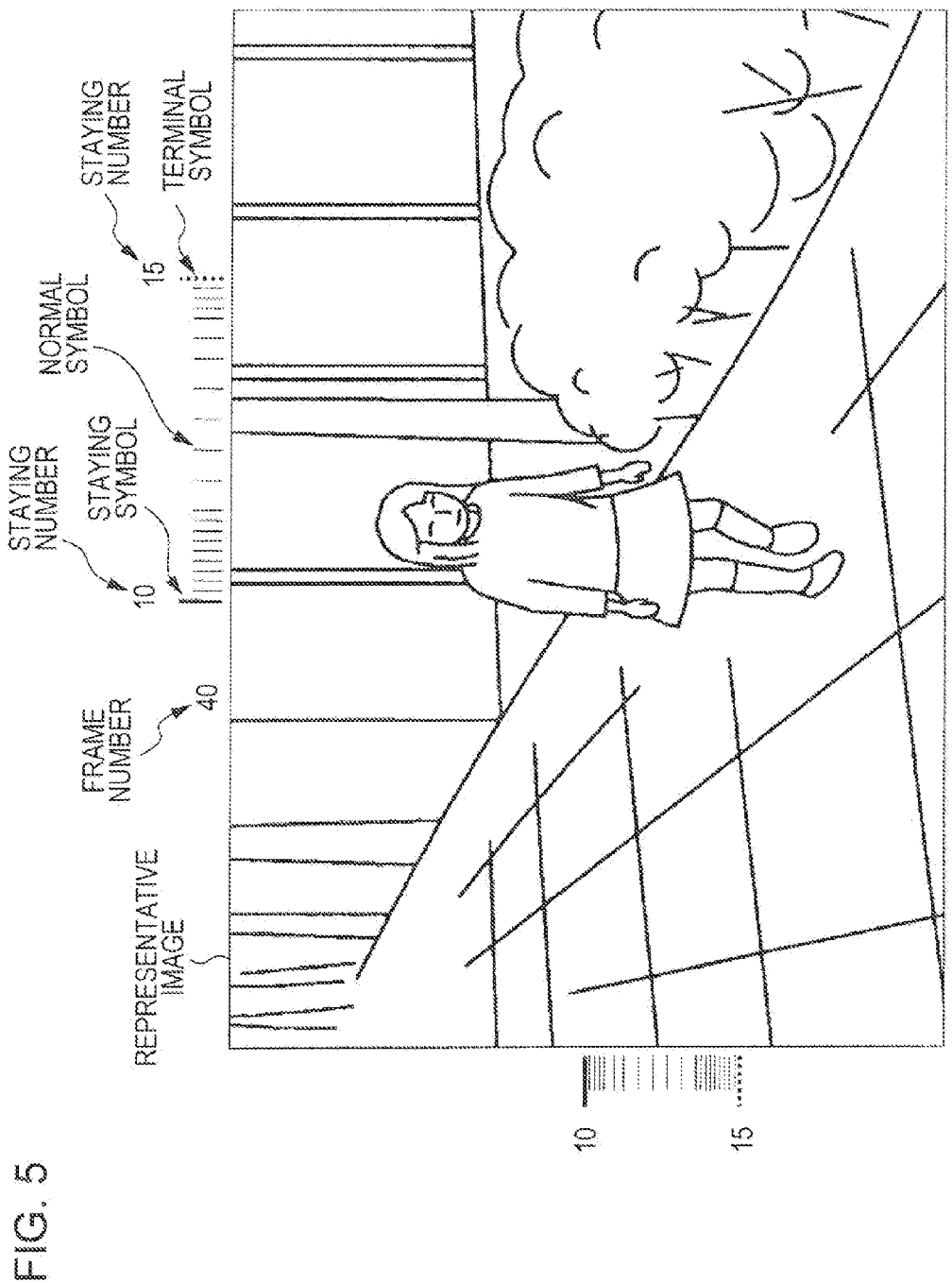
FIG. 5 is a diagram illustrating a drawing example of respective symbols and staying numbers in a case where the number of frames (screens) which form a predetermined scene is 40.

FIG. 5 illustrates a drawing example. In this example, the movement of a figure which is a target portion is in the tilt direction. Here, symbols indicating the movement in the horizontal direction are drawn in a peripheral section on an upper side of a representative image, and symbols indicating the movement in the vertical direction are drawn in a peripheral section on a left side of the representative image. This example illustrates a drawing example of the respective symbols and staying numbers, when the staying number and accumulated value of each frame (each screen) with respect to each direction is as shown in FIG. 3, in a case where the number of frames (screens) which form a predetermined scene is 40.

In this drawing example, each symbol is expressed by a line segment. In this example, since the staying numbers are 0 in frames 1 to 9, symbol drawing is not performed. Further, since the staying number is 10 in frame 10, the staying symbol is drawn in a position (upper right position of the frame) corresponding to the target portion of the frame, and the staying number "10" is drawn in the corresponding position.

Further, since the staying numbers are 1 in frames 11 to 25, the normal symbol is drawn in a position corresponding to the target portion of the frame. Further, since the staying numbers are 0 in frames 26 to 39, symbol drawing is not performed. Further, in the final frame 40, the terminal symbol is drawn in a position corresponding to the target portion of the frame, and further the staying number "15" is drawn in the corresponding position.

The output device interface 106 supplies the image data which is supplied from the symbol drawing section 105, that is, the image signal (image data) of the representative image in which the symbols indicating the movements of the target portion are drawn in the peripheral section, to an output device such as an image display device or a recording device. For example, in the image display device, the representative image in which the symbols indicating the movements of the target portion are drawn in the peripheral section is displayed. Further, for example, in the recording device, the image signal of the representative image of each scene in which the symbols are drawn is recorded in the recording medium in accordance with each scene of the image signal input to the image input section 101.

[Operation Example of Image Processing Apparatus]

An operation example of the image processing section 100 shown in FIG. 1 will be described. An image signal which is a processing target is input to the image input section 101. The image signal which is the processing target is obtained by photographing of an imaging device (camera), for example, and is directly supplied from the imaging device (camera) or is supplied by being read from a predetermined recording medium.

The image input section 101 processes the input image signal to detect a scene change point, and divides the input image signals for each scene. Further, the image input section 101 sequentially supplies the image signals of each scene to the representative image creating section 102 and the target portion movement detecting section 103.

The representative image creating section 102, the target portion movement calculating section 103, the staying number calculating section 104 and the symbol drawing section 105 sequentially process the respective scenes as a scene (predetermined scene) which is a processing target. That is, the representative image creating section 102 processes the image signal of the predetermined scene, and creates a representative image on the basis of the images of the respective screens (frames) which form the predetermined scene. For example, an image of a predetermined one screen, for example, of one leading screen is selected from the images of the respective screens which form the predetermined scene, to be created as the representative image. Further, for example, a composite image obtained by overlapping the images of the respective screens which form the predetermined scene is created as the representative image. Further, for example, a united image obtained by connecting the images of the respective screens which form the predetermined scene is created as the representative image.

Further, the target portion movement calculating section 103 processes the image signals of the predetermined scene, and calculates a movement (movement vector) of a target portion of each screen in the predetermined scene. The movement of the target portion of each screen in the predetermined scene is supplied to the staying number calculating section 104. The staying number calculating section 104 calculates a staying number and an accumulated value of the target portion of each screen, on the basis of the movement of the target portion of each screen in the predetermined scene (see FIG. 2).

The staying number and the accumulated value of the target portion of each screen calculated by the staying number calculating section 104 is supplied to the symbol drawing section 105. Further, the image signal (image data) of the representative image created by the representative image creating section 102 is supplied to the symbol drawing section 105. The symbol drawing section 105 draws the symbols indicating the movements of the target portion in the peripheral section of the representative image, on the basis of the staying numbers of the target portion of the respective screens (see FIG. 4).

In this case, in a screen having a staying number of 1, the normal symbol is drawn as a symbol in a position corresponding to the target portion of the screen of the representative image. Further, in a screen having a staying number of 2 or more, the staying symbol is drawn as a symbol in a position corresponding to the target portion of the screen of the representative image, and the corresponding staying number is also drawn. Further, in the final screen, the terminal symbol is drawn as a symbol in a position corresponding to the target portion of the screen, and the corresponding staying number is also drawn.

The symbol drawing section 105 obtains an image signal (image data) of the representative image in which the symbols indicating the movements of the target portion are drawn in the peripheral section thereof for each scene. The image signal (image data) is supplied to the output device interface (I/F) 106. The output device interface 106 supplies the image signal which is supplied from the symbol drawing section 105, that is, the image signal (image data) of the representative image in which the symbols indicating the movements of the target portion are drawn in the peripheral section, to an output device such as an image display device or a recording device.

Thus, for example, the image display device displays the representative image in which the symbols indicating the movements of the target portion are drawn in the peripheral section. Further, for example, in the recording device, the image signal of the representative image of each scene in which the symbols are drawn is recorded in the recording medium in accordance with each scene of the image signal input to the image input section 101.

As described above, the image processing apparatus 100 shown in FIG. 1 processes the image signal of the predetermined scene by the representative image creating section 102, and creates the representative image on the basis of the image of each screen which forms the predetermined scene. Further, the target portion movement calculating section 103 processes the image signal of the predetermined scene and calculates the movement of the target portion of each screen in the predetermined scene. Further, the staying number calculating section 104 calculates the staying number of the target portion of each screen in the predetermined scene, on the basis of the calculated movement of the target portion of each screen in the predetermined scene.

Further, the symbol drawing section 105 draws the symbols (normal symbol, staying symbol and terminal symbol) indicating the movements of the target portion in the peripheral section of the representative image created by the representative image creating section 102, on the basis of the calculated staying numbers of the target portion of the respective screens in the predetermined scene. Accordingly, it is possible for a reader, an editor or the like to easily grasp the overall movement of the target portion in the scene. That is, it is possible for the reader, the editor or the like to generally perceive the movement of the target portion in the scene.

In the image processing apparatus 100 shown in FIG. 1, the symbol drawing section 105 is configured to draw the normal symbol in the screen having the staying number of 1, and to draw the staying symbol in the screen having the staying number of 2 or more (see FIG. 4). However, generally, the normal symbol may be drawn in a screen having a staying number of 1 to N (N is an integer which is equal to or larger than 1), and the staying symbol may be drawn in a screen having a staying number exceeding N. Further, in this case, a user may set the value N to an arbitrary value by a user operating section (not shown).

Further, in the image processing apparatus 100 shown in FIG. 1, the symbol drawing section 105 is configured to draw the symbols (normal symbol, staying symbol and terminal symbol) indicating the movements of the target portion, on the basis of the staying numbers of the target portion of the respective screens calculated by the staying number calculating section 104. However, for example, the normal symbol may be drawn in the position corresponding to the target portion of the respective screens in order to indicate the movement of the respective screens in the scene. In this case, the symbol drawing section 105 can draw the symbol directly using the movement of the target portion of each screen in the predetermined scene calculated by the target portion movement calculating section 103.

Further, in the image processing apparatus 100 shown in FIG. 1, the symbol drawing section 105 draws the staying numbers corresponding to the drawing positions of the staying symbol and the terminal symbol. However, the staying numbers should not necessarily be drawn.

[Another Example of Staying Number Calculating Process]

In the above description, the staying number calculating section 104 calculates the staying numbers of the target portion of the respective screens, on the basis of the movement of the target portion of the respective screens in the predetermined scene calculated by the target portion movement calculating section 103. However, in a case where information about the movement of the target portion of the respective screens is provided in advance as metadata, the staying number calculating section 104 can calculate the staying numbers of the respective screens using the information. In this case, for example, the information about the movement of the target portion of the respective screens is supplied to the staying number calculating section 104 from the image input section 101, and thus, the target portion movement calculating section 103 is not necessary.

Further, in the above-described embodiment, the staying number calculating section 104 determines whether the target portion is staying according to whether the target portion movement Mv of the current frame is 0. However, there is a case where photographing is performed without a tripod stand, a case where photographing is performed using a poor tripod stand, a case where down-converting or up-converting is performed, or the like. In such a case, it may be considered that the target portion is "staying" in view of intention of a photographer or a sense of a viewer. However, as the target portion movement, a value which is delicately different from "0" may be calculated, and consequently, it may not be determined that the target portion is "staying".

Figure 6:
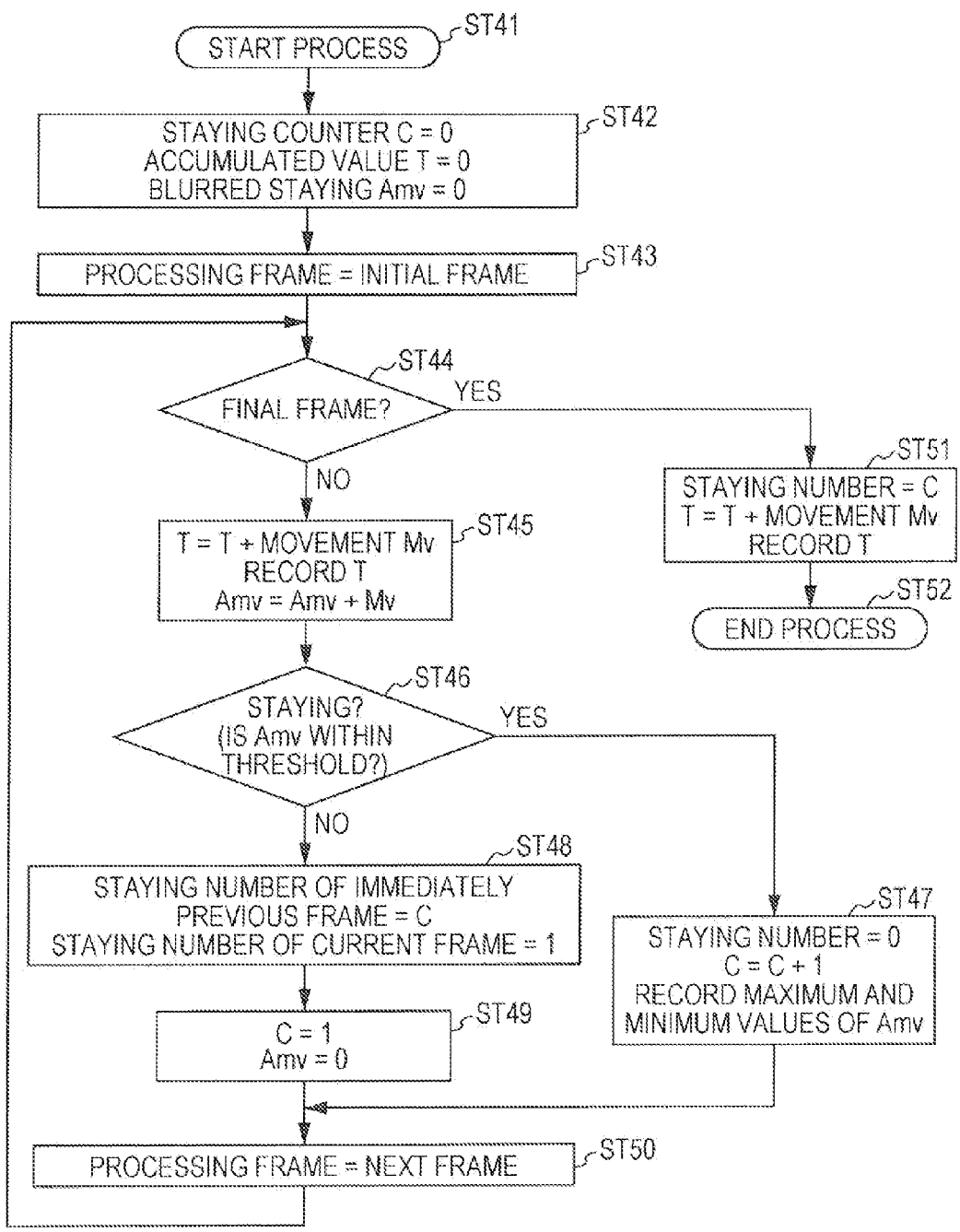
FIG. 6 is a flowchart illustrating an example of a process routine of a staying number calculating section in a case where staying or not is determined according to whether a staying blur Amv is within the range of a threshold.

Thus, the accumulated value of the target portion movement Mv is determined as the staying blur Amv, and the staying may be determined according to whether the staying blur Amv is within the range of a threshold. Thus, it is possible to definitely determine the screen, which may be considered as staying in a sense of the viewer, as staying. FIG. 6 is a flowchart illustrating an example of a process routine of the staying number calculating section 104 in this case.

The staying number calculating section 104 starts the process in step ST41, and then allows the routine to proceed to step ST42. In step ST42, the staying number calculating section 104 sets a value of a staying counter C to 0, sets an accumulated value (accumulated movement amount) T of the target portion movement Mv to 0, and sets the staying blur Amv to 0. Further, the staying number calculating section 104 sets a processing frame (processing screen) to an initial frame (initial screen) in step ST43.

Next, the staying number calculating section 104 determines whether the processing frame is the final frame (final screen) in step ST44. If the processing frame is not the final frame, the staying number calculating section 104 allows the routine to proceed to step ST45. In step ST45, the staying number calculating section 104 adds a target portion movement Mv of a current frame to the accumulated value T to calculate the accumulated value T in the current frame, and records the accumulated value T as an accumulated value of the current frame. Further, in step ST45, the staying number calculating section 104 adds the target portion movement Mv to the staying blur Amv, to thereby update the staying blur Amv.

Next, the staying number calculating section 104 determines whether the target portion is staying in step ST46. Here, the staying number calculating section 104 determines whether the target portion is staying according to whether the staying blur Amv is within the range of the threshold. That is, the staying number calculating section 104 determines that the target portion is staying when Amv is within the range of the threshold, and determines that the target portion is not staying when Amv is beyond the range of the threshold.

If it is determined that the target portion is staying, the staying number calculating section 104 allows the routine to proceed to step ST47. In step ST47, the staying number calculating section 104 sets a staying number of the current frame to 0, and increments the value of the staying counter C by 1. Further, the staying number calculating section 104 records a maximum value and a minimum value of the staying blur Amv in step ST47. The recorded information is information (metadata) indicating the level of the staying blur Amv in a case where it is determined that the target portion is not staying. For example, the threshold may be adaptively changed on the basis of the information.

On the other hand, if it is determined that the target portion is not staying, the staying number calculating section 104 allows the routine to proceed to step ST48. In step ST48, the staying number calculating section 104 sets a staying number of an immediately previous frame (screen) to the value of the staying counter C, and sets the staying number of the current frame to 1. Further, in step ST49, the staying number calculating section 104 sets the value of the staying counter C to 1, and then resets the staying blur Amv to 0.

After the operations of step ST47 and step S49, the staying number calculating section 104 allows the routine to proceed to step ST50. In step ST50, the staying number calculating section 104 sets the processing frame to the next frame, and then the routine returns to step ST44.

Further, if the processing frame is the final frame in step ST44, the staying number calculating section 104 allows the routine to proceed to step ST51. In step ST51, the staying number calculating section 104 sets the staying number of the current frame (=final frame) to the value of the staying counter C. Further, in step ST51, the staying number calculating section 104 adds the target portion movement Mv of the current frame to the accumulated value T to calculate the accumulated value T in the current frame, and records the accumulated value T. Further, the staying number calculating section 104 terminates the process, in step ST52.

In the above description, it is determined whether the target portion is staying according to whether the staying blur Amv which is the accumulated value of the target portion movement Mv is within the range of a threshold. Further, in the respective screens (frames), it may be considered that it is determined whether the target portion is staying according to whether the target portion movement Mv of the screen is within the range of a threshold. In this case, when it is determined that the target portion is staying, the maximum value and the minimum value of the target portion movement Mv are recorded. The recorded information is behavior information (metadata) of the target portion movement Mv indicating the level of the target portion movement Mv in a case where it is determined that the target portion is not staying. For example, the threshold may be adaptively changed on the basis of the information.

[Another Example of Symbol Drawing Process]

Further, in the above description, a case where the movement of the target portion is made in one direction is described as an example. However, a case where the movement of the target portion is made in a bi-directional manner may be considered. In this case, a drawing position of a symbol corresponding to each screen in which the movement direction of the target portion is a forward direction (a first direction) and a drawing position of a symbol corresponding to each screen in which the movement direction of the target portion is a backward direction (a second direction) are shifted in a direction perpendicular to the forward direction and the backward direction, for example. Thus, it is possible to easily view the symbols indicating the movements of the target portion in the respective directions without overlap. Further, in this case, since it may be difficult to know the movement of the image only by the terminal symbol, a symbol (staying ID) indicating the staying order is added to the staying symbol.

Figure 7:
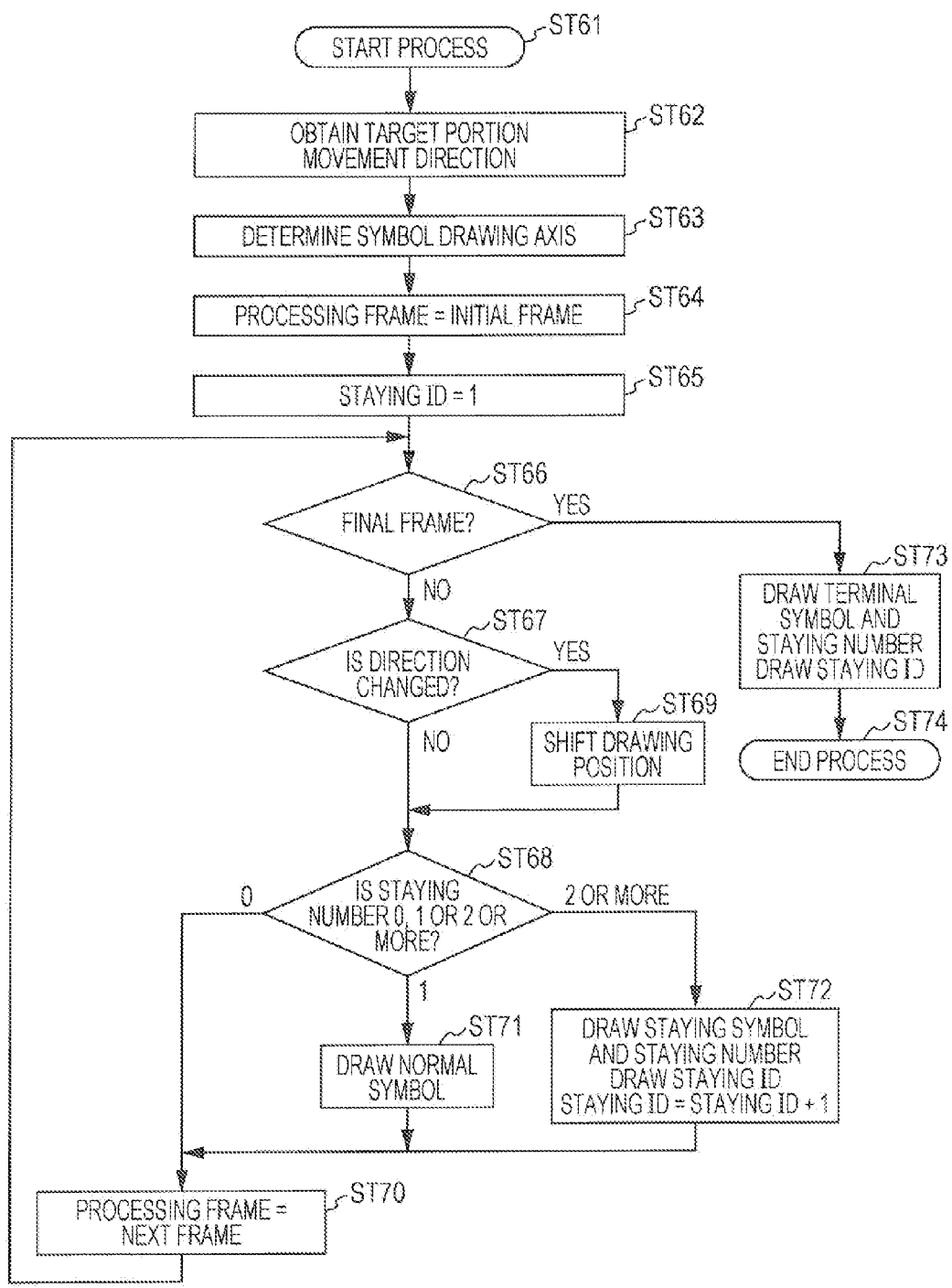
FIG. 7 is a flowchart illustrating an example of a process routine of a symbol drawing section in a case where a symbol (staying ID) indicating the order of staying is added to a staying symbol.

FIG. 7 is a flowchart illustrating an example of a process routine of the symbol drawing section 105 in this case. The symbol drawing section 105 starts the process in step ST61, and then allows the routine to proceed to step ST62. In step ST62, the symbol drawing section 105 obtains a movement direction of the target portion. For example, as the movement direction, the horizontal direction, the vertical direction, the tilt direction (both of the horizontal direction and the vertical direction), or the like are used. In this case, the symbol drawing section 105 obtains the movement direction of the target portion, on the basis of the movement (movement vector) of the target portion of each screen calculated by the target portion calculating section 103, for example.

Next, the symbol drawing section 105 determines a symbol drawing axis in step ST63. In this case, the symbol drawing section 105 determines the symbol drawing axis to correspond to the movement direction of the target portion obtained in step ST62. Further, in step ST64, the symbol drawing section 105 sets the processing frame (processing screen) to the initial frame (initial screen), and sets the staying ID to 1 in step ST65.

Next, the symbol drawing section 105 determines whether the processing frame is the final frame (final screen), in step ST66. If the processing frame is not the final frame, the symbol drawing section 105 determines in step ST67 whether the movement direction of the target portion is changed from the backward direction to the forward direction. If the direction is not changed, the symbol drawing section 105 allows the routine to directly proceed to step ST68. On the other hand, if the direction is changed, in step ST69, the symbol drawing section 105 shifts the drawing position in the direction perpendicular to the forward direction and the backward direction, and then allows the routine to proceed to step ST68.

In step ST68, the symbol drawing section 105 determines whether the staying number is 0, 1 or 2 or more. If the staying number is 0, the symbol drawing section 105 sets the processing frame to the next frame in step ST70, and then returns the routine to step ST66. Further, if the staying number is 1, the symbol drawing section 105 allows the routine to proceed to step ST71. In step ST71, the symbol drawing section 105 draws a normal symbol as a symbol in a position corresponding to the target portion of the current frame (processing screen) of the representative image. Further, after the operation of step ST71, the symbol drawing section 105 sets the processing frame to the next frame in step ST70, and then returns the routine to step ST66.

Further, if the staying number is 2 or more, the symbol drawing section 105 allows the routine to proceed to step ST72. In step ST72, the symbol drawing section 105 draws a staying symbol as a symbol in a position corresponding to the target portion of the current frame (processing screen) of the representative image. The staying symbol may be differentiated from the normal symbol according to its shape, size, pattern, color or the like.

Further, the symbol drawing section 105 also draws the staying number in a position corresponding to the drawing position of the staying symbol, in step ST72. Further, the symbol drawing section 105 draws the staying ID which is the symbol indicating the staying order in a position corresponding to the drawing position of the staying symbol, and increments the staying ID by 1. After the operation of step ST72, the symbol drawing section 105 sets the processing frame to the next frame in step ST70, and then returns the routine to step ST66.

Further, if the processing frame is the final frame in step ST66, the symbol drawing section 105 allows the routine to proceed to step ST73. In step ST73, the symbol drawing section 105 draws a terminal symbol as a symbol in a position corresponding to the target portion of the current frame (=final frame) of the representative image. The terminal symbol may be differentiated from the normal symbol and the staying symbol according to its shape, size, pattern, color or the like.

Further, in step ST73, the symbol drawing section 105 draws the staying number in a position corresponding to the drawing position of the terminal symbol. Further, the symbol drawing section 105 draws the staying ID which is the symbol indicating the staying order in a position corresponding to the drawing position of the terminal symbol. Further, after the operation of step ST73, the symbol drawing section 105 terminates the process in step ST74.

Figure 8:
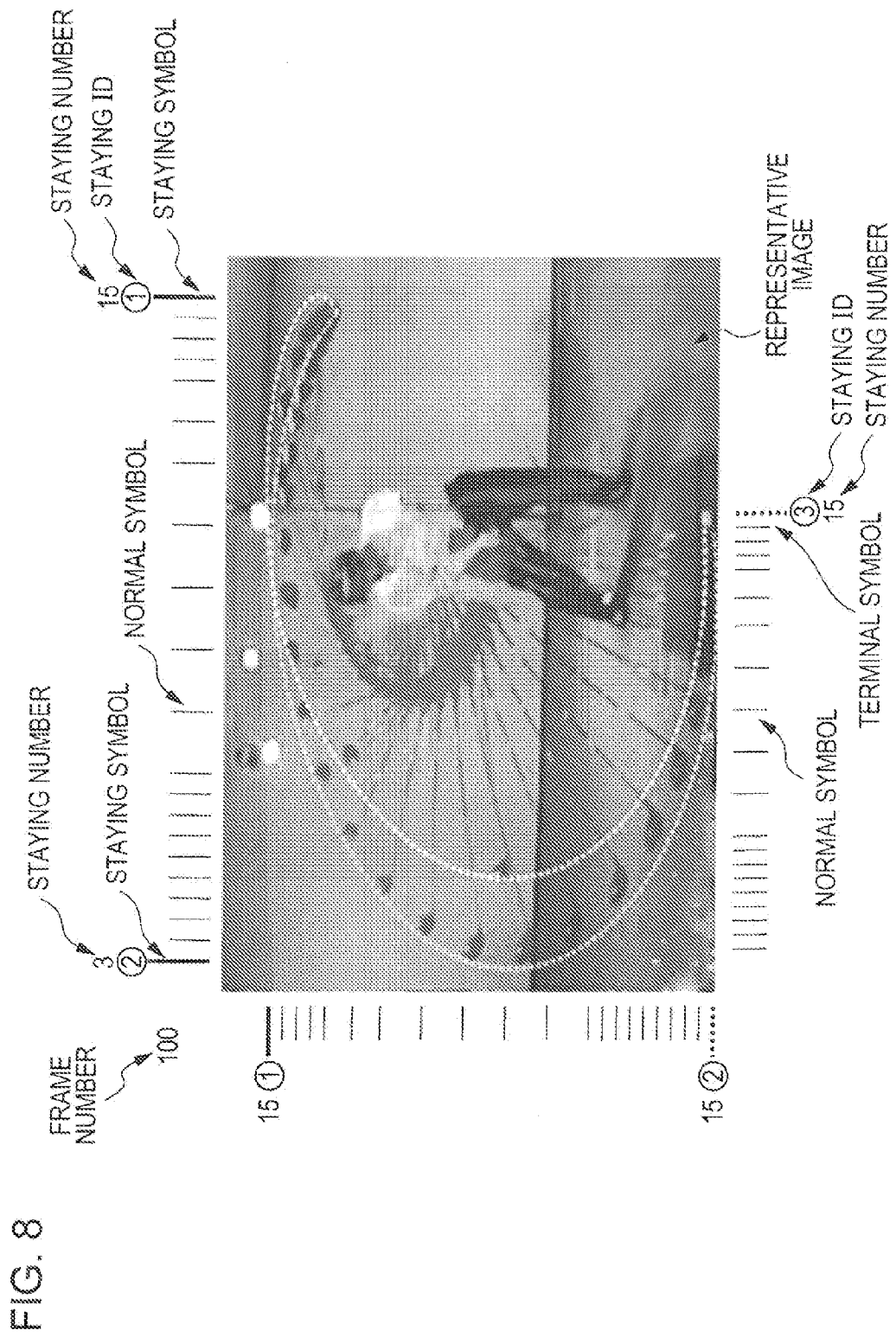
FIG. 8 is a diagram illustrating a drawing example of respective symbols, staying numbers and staying IDs in a case where a movement direction of a target portion is changed to a backward direction from a forward direction.

FIG. 8 illustrates a drawing example of respective symbols, staying numbers and staying IDs. In this example, a head of a golf club is the target portion, and the respective symbols indicating the movements of the head are expressed by line segments. In this example, the staying IDs are expressed as circled numbers. The horizontal movement will be described. It can be understood that a drawing position of a staying symbol in which a circled number "1" is correspondingly drawn as the staying ID is an initial staying position, and that the target portion is staying at this position for 15 screens (frames). Further, it can be understood that a drawing position of a staying symbol in which a circled number "2" is correspondingly drawn as the staying ID is a second staying position, and that the target portion is staying at this position for 3 screens (frames).

Further, thereafter, the movement direction of the target portion is changed from the forward direction to the backward direction. Thus, the drawing position of the symbol is shifted. In this example, the drawing position of the symbol after the movement direction of the target portion is changed to the backward direction is an opposite side. It can be understood that a drawing position of a terminal symbol in which a circled number "3" is correspondingly drawn as the staying ID is a final screen position, and that the target portion is staying at this position for 15 screens (frames).

Next, the vertical movement will be described. It can be understood that a drawing position of a staying symbol in which a circled number "1" is correspondingly drawn as the staying ID is an initial staying position, and that the target portion is staying at this position for 15 screens (frames). Further, it can be understood that a drawing position of a terminal symbol in which a circled number "2" is correspondingly drawn as the staying ID is a position of a final screen (final frame), and that the target portion is staying at this position for 15 screens (frames). With respect to the vertical direction, the movement direction of the target portion is the forward direction.

Figure 9A:
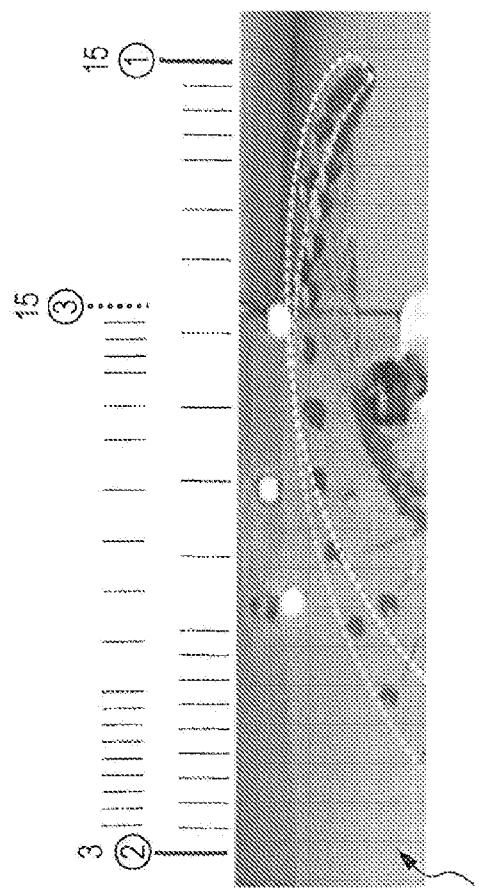
FIGS. 9A and 9B are diagrams illustrating another drawing example of respective symbols, staying numbers and staying IDs in a case where a movement direction of a target portion is changed to a backward direction from a forward direction.

FIG. 9A illustrates another drawing example of the respective symbols, staying numbers and staying IDs. The drawing example is basically the same as the drawing example shown in FIG. 8. In this example, the drawing position of the symbol after the movement direction of the target portion is changed to the backward direction is a position which is shifted in the vertical direction on the same side. Further, FIG. 9B also illustrates another drawing example of the respective symbols, staying numbers and staying IDs. The drawing example is also basically the same as the drawing example shown in FIG. 8. In this example, the drawing position of the symbol after the movement direction of the target portion is changed to the backward direction is a position which is shifted in the vertical direction on the same side. Here, the forward symbol drawing position and the backward symbol drawing position are switched compared with those in FIG. 9A.

Figure 9B:
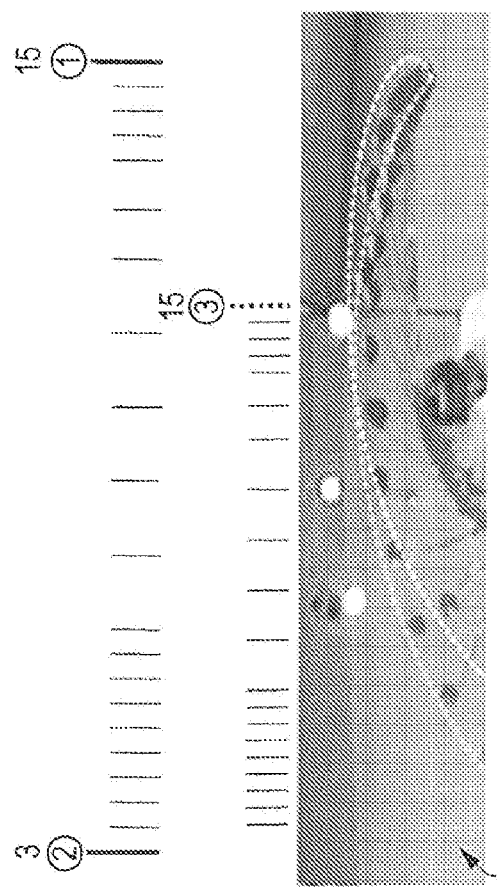

In the drawing examples of FIG. 8 and FIGS. 9A and 9B, the staying IDs are represented as the circled numbers. However, instead of the numbers of 1, 2, 3 and the like, symbols of which the order can be obviously understood, such as A, B, C and the like, symbols which expressly indicate a traveling direction, such as ∇, may be used.

Further, in the above description, as shown in FIG. 5, FIG. 8, and FIGS. 9A and 9B, the symbols indicating the movements of the target portion are expressed as the line segments. However, instead of the line segments, numerals, symbols as shown in FIG. 10A, graphic figures as shown in FIG. 10B, gradation or color shading as shown in FIG. 10C may be considered for indication.

[Another Example of Symbol Drawing Process]

Further, in the above description, the respective normal symbols which are drawn by the symbol drawing section 105 are expressed as the line segments having the same length. However, the length of the normal symbol may be set to a length according to the movement of the target portion of each screen. In this case, for example, a length "h" of the normal symbol drawn in a predetermined screen may be calculated as H*Mv/Mvmax. Here, a length, in a direction perpendicular to the movement direction (target portion movement direction) of the target portion, of the display region in the peripheral section in the output device is "H", a maximum movement in the movements of the target portion is Mvmax, and the movement of the target portion of each screen is Mv.

FIG. 11 is a flowchart illustrating an example of a process routine of the symbol drawing section 105 in this case. In FIG. 11, the same reference numbers are given to steps corresponding to those in FIG. 4, and detailed description thereof will be omitted. In the flowchart of FIG. 11, step ST28A is placed instead of step ST28 in the flowchart of FIG. 4.

If the staying number is 1 in step ST26, the symbol drawing section 105 allows the routine to proceed to step ST28A. In step ST28A, the symbol drawing section 105 draws a normal symbol as a symbol in a position corresponding to a target portion of the current frame (current screen) of the representative image. In this case, the symbol drawing section 105 sets the length "h" of the normal symbol to be drawn to H*Mv/Mvmax as described above, to obtain a length corresponding to the size Mv of the movement of the target portion of the current frame.

After the operation of step ST28A, the symbol drawing section 105 sets the processing frame to the next frame in step ST27, and then returns the routine to step ST25. Detailed description thereof is omitted, but the other steps in the flowchart of FIG. 11 are the same as the corresponding operations in the flowchart of FIG. 4.

FIG. 12A illustrates a drawing example in the symbol drawing process in the flowchart of FIG. 11. This drawing example is an example of a case where the staying numbers and accumulated values of the respective frames (screens) are as shown in FIG. 3, when the number of frames (screens) which form the predetermined scene is 40. This drawing example is different from the drawing example shown in FIG. 5, in which the length of the normal symbol corresponds to the size of the movement of the target portion. FIG. 12B is an enlarged view illustrating the symbol portion in FIG. 12A. As described above, since the length "h" of the normal symbol is H*Mv/Mvmax, the length "h" of the normal symbol drawn in the screen of the maximum movement Mvmax in the movements of the target portion becomes "H".

Figure 13:
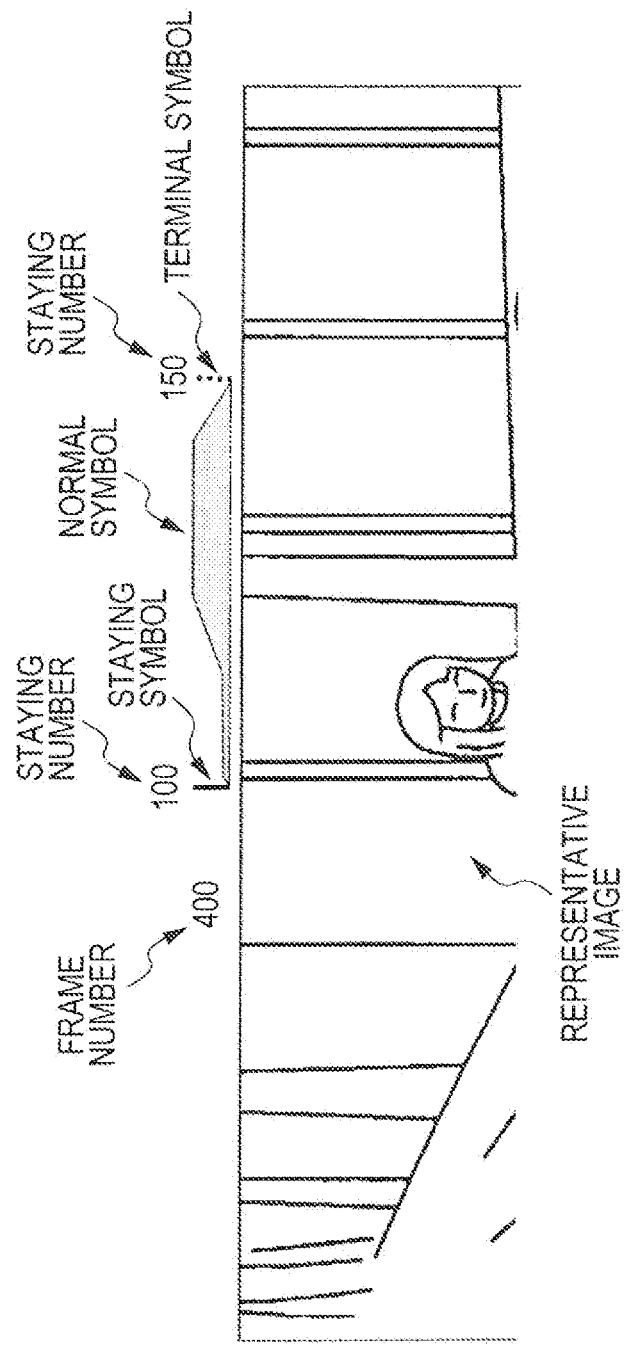
FIG. 13 is a diagram illustrating a drawing example according to a symbol drawing process.

Further, FIG. 13 illustrates a drawing example in the symbol drawing process in the flowchart of FIG. 11. This drawing example is an example when the number of frames (screens) which form the predetermined scene is 400. In this case, the normal symbols to be drawn are in a mixed state (filled state). However, since the length of the normal symbol corresponds to the size of the movement of the target portion, it is difficult to know a minute movement of the screen, but it is possible to grasp an overall tendency of the movements of the target portion of the respective screens through an envelope curve.

In this way, by performing the symbol drawing process in the flowchart of FIG. 11, the length of the normal symbol drawn in each screen corresponds to the movement of the target portion of the screen, and thus, the amount of information indicated by the normal symbol can be increased. [TY1]

[Another Example of Symbol Drawing Process]

Further, in the above description, the symbol drawing section 105 draws the normal symbols in all screens where the staying number is 1 (generally, the staying number is 1 to N (N is an integer which is equal to or larger than 1)). In this case, there is a possibility that the symbols to be drawn are mixed and overlapped. Thus, it is considered that the proximity between the drawn symbols is determined and a drawing state of the normal symbol is changed on the basis of the determination result.

2. Second Embodiment

[Configuration Example of Image Processing Apparatus]

Figure 14:
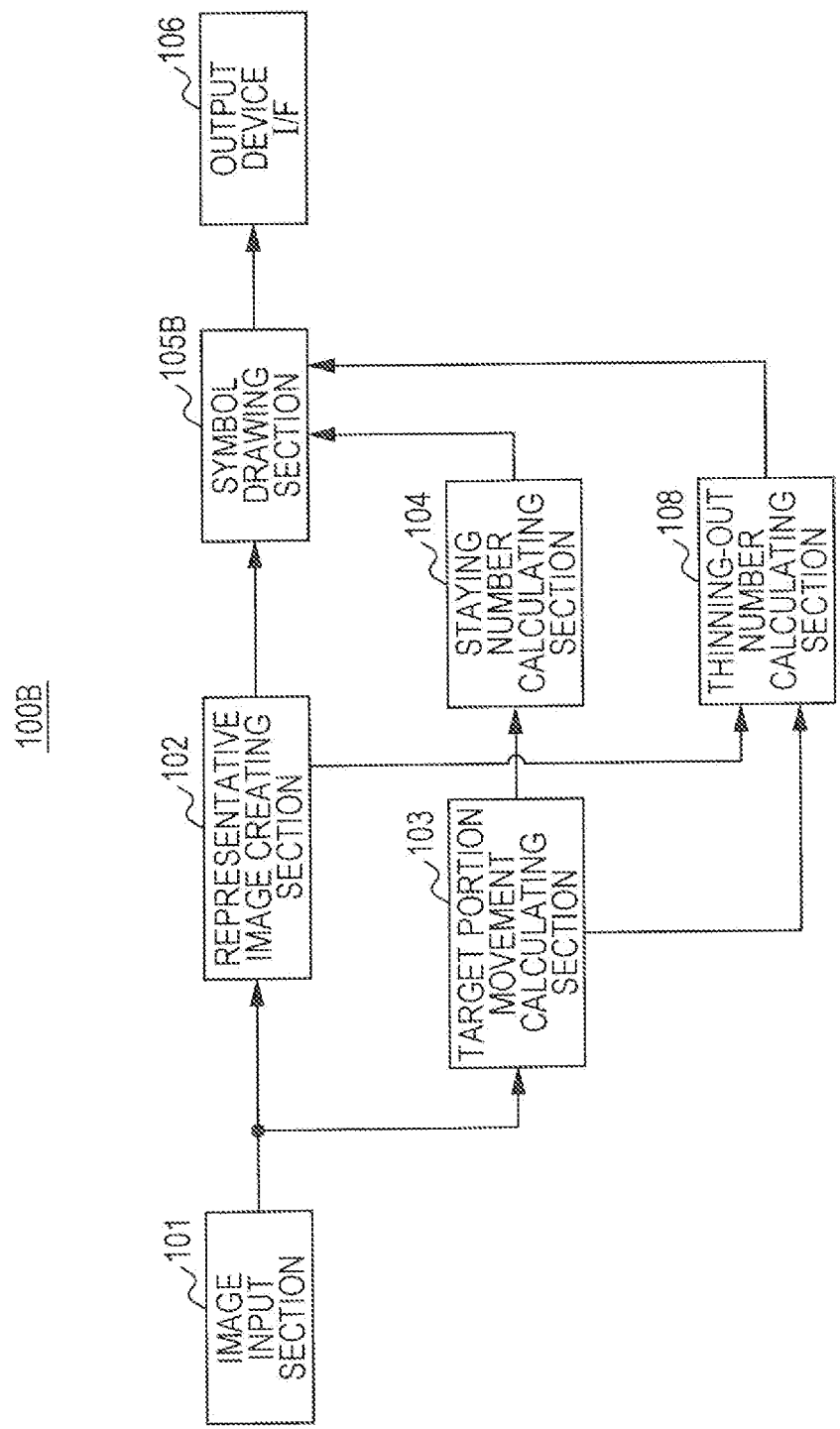
FIG. 14 is a block diagram illustrating a configuration example of an image processing apparatus according to a second embodiment of the present disclosure.

FIG. 14 illustrates a configuration example of an image processing apparatus 100B according to a second embodiment. The image processing apparatus 100B includes an image input section 101, a representative image creating section 102, a target portion movement calculating section 103, a staying number calculating section 104, a symbol drawing section 105B, an output device interface (I/F) 106, and a thinning-out number calculating section 108. In FIG. 14, the same reference numerals are given to sections corresponding to those in FIG. 1, and detailed description thereof will be appropriately omitted.

Figure 15A:
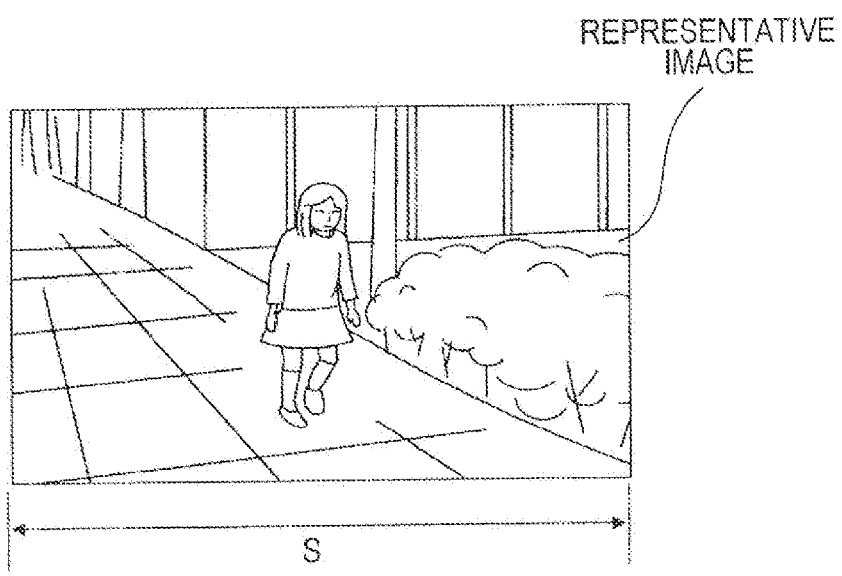
FIGS. 15A and 15B are diagrams illustrating a length S in a movement direction of a target portion of a screen for calculating a distance d between the closest symbols in a display region, and a length W, in the movement direction of the target portion, of a display region of a representative image in an output device.
Figure 15B:
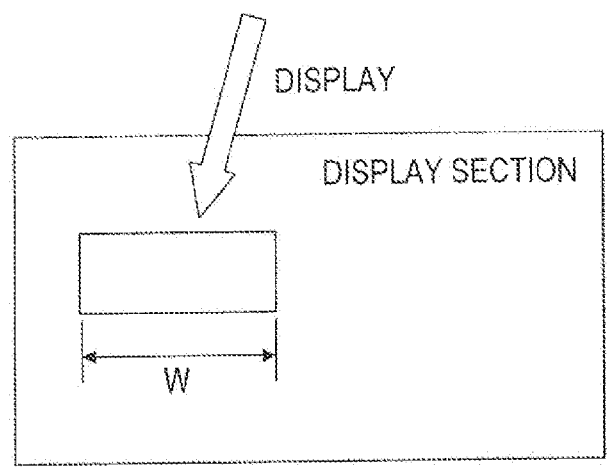

For example, a distance "d" between the closest symbols in a display region is calculated, and proximity between the symbols is determined on the basis of the distance "d". The distance "d" is calculated by the following expression (1), using a length "S" in a movement direction of a target portion of a screen, a minimum movement Vmin where it is determined that the target portion is not staying in the movements of the target portion, and a length "W", in the movement direction of the target portion, of a display region of a representative image in an output device. FIGS. 15A and 15B illustrate the length "S", an accumulated value T and the length "W".

$$d = W * V\mathrm{min}/S \quad (1)$$

Figure 16:
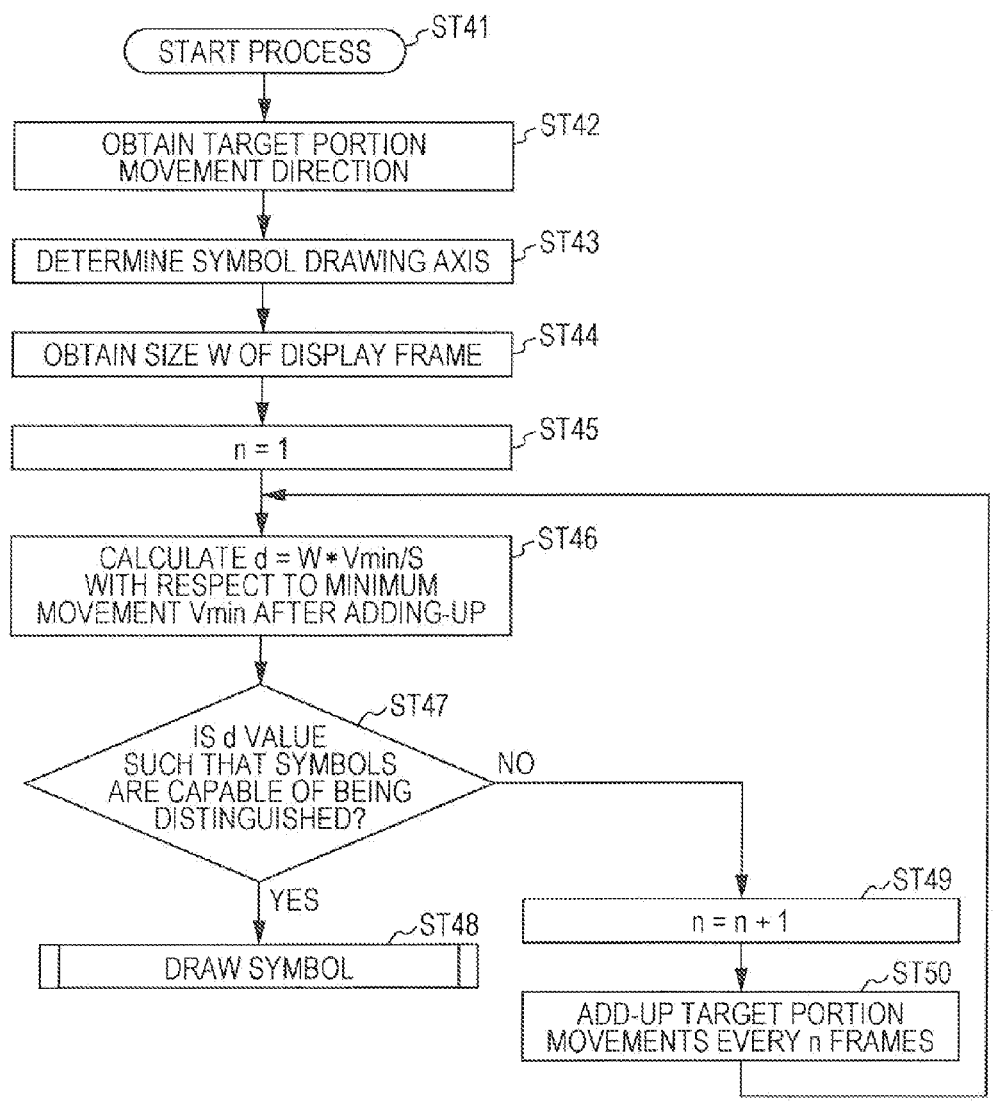
FIG. 16 is a flowchart illustrating an example of a process routine of a symbol drawing section.

The symbol drawing section 105B draws a normal symbol for each screen of a predetermined number so that the distance "d" between the closest symbols in the display region exceeds a predetermined value. In this case, the normal symbols are thinned out to be drawn. FIG. 16 is a flowchart illustrating an example of a process routine of the thinning-out number calculating section 108 which calculates a thinning-out number "n" in this case.

The thinning-out number calculating section 108 starts the process in step ST41, and then allows the routine to proceed to step ST42. In step ST42, the thinning-out number calculating section 108 obtains the movement direction of the target portion. For example, a horizontal direction, a vertical direction, a tilt direction (both of the horizontal direction and the vertical direction), or the like is used as the movement direction. In this case, the thinning-out number calculating section 108 obtains the movement direction of the target portion, on the basis of the movement (movement vector) of the target portion of each screen calculated by the target portion movement calculating section 103, for example.

Next, the Chinning-out number calculating section 108 determines a symbol drawing axis in step ST43. In this case, the symbol drawing section 105 determines the symbol drawing axis to correspond to the movement direction of the target portion obtained in step ST42. For example, if the movement direction of the target portion is the horizontal direction, the symbol drawing axis is determined as the horizontal direction.

Next, the thinning-out number calculating section 108 obtains the size "W" of a display frame, that is, the length "W", in the movement direction of the target portion, of the display region of the representative image in the above-described output device. Information about the length "W" is assigned by a user operation, or is automatically obtained from the output device through the output device interface 106, for example.

Next, the thinning-out number calculating section 108 sets the combination number n of the frames to 1, in step ST45. Further, in step ST46, the symbol drawing section 105 calculates the distance "d" using the expression (1) with respect to the minimum movement Vmin of the frames after combination. Further, the thinning-out number calculating section 108 determines in step ST47 whether the calculated value "d" is a value (for example, "2") such that the drawn symbols are capable of being distinguished. If the distance "d" is small compared with the sizes of the drawn symbols, it may be difficult to view the drawn symbols drawn by a user.

If the distance "d" is the value such that the drawn symbols are capable of being distinguished, the thinning-out number calculating section 108 allows the routine to proceed to step ST48. On the other hand, if the distance "d" is not the value such that the drawn symbols are capable of being distinguished, the thinning-out number calculating section 108 allows the routine to proceed to step ST49. In step ST49, the thinning-out number calculating section 108 increments the frame combination number n by 1. Further, in step ST50, the thinning-out number calculating section 108 performs combination of the movements of the target portion every n frames, and then allows the routine to proceed to step ST46.

Figure 17:
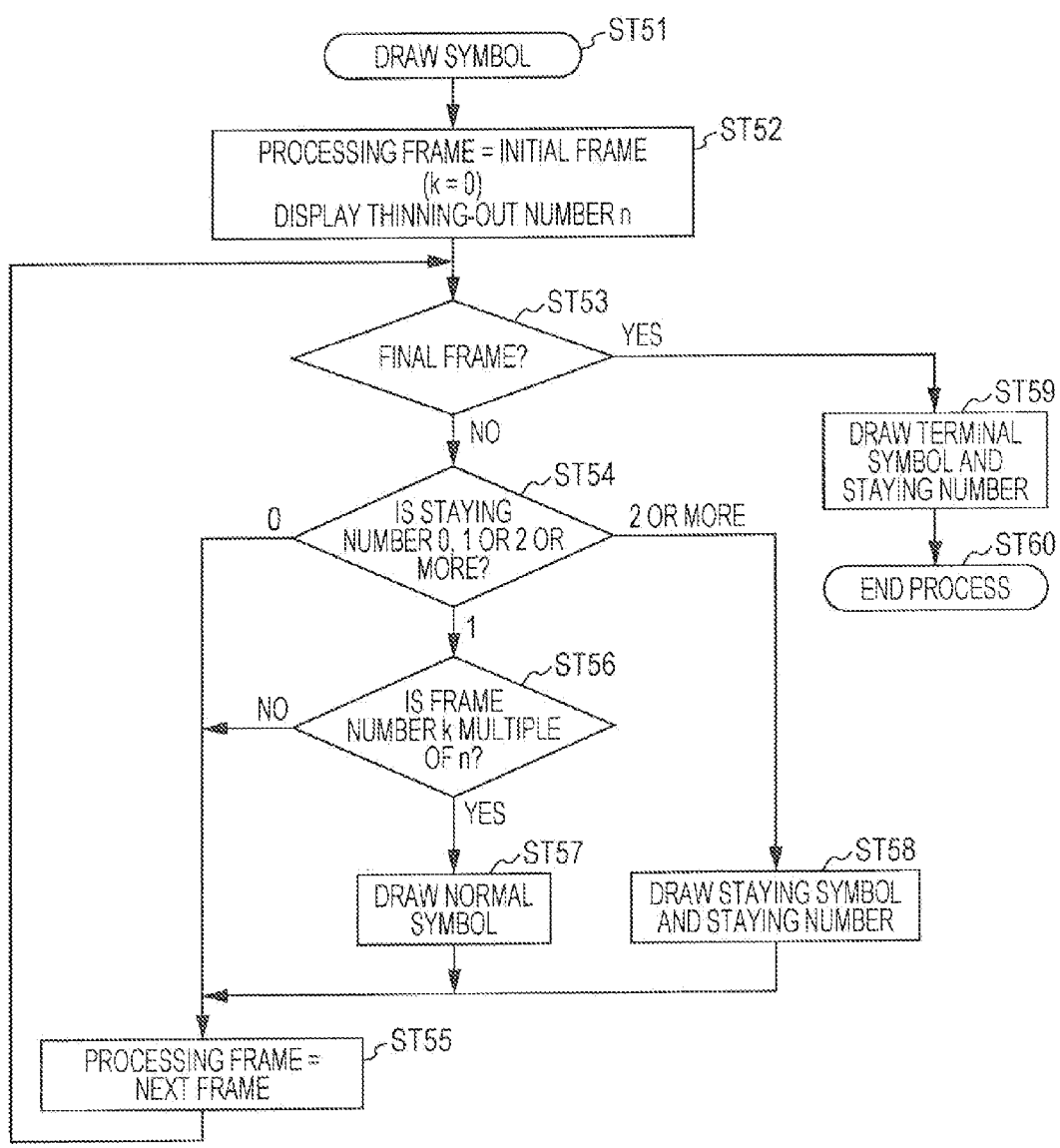
FIG. 17 is a flowchart illustrating an example of a process routine of a symbol drawing section.

FIG. 17 is a flowchart illustrating a symbol drawing process of step ST48 in the flowchart of FIG. 16. The symbol drawing section 105B starts the process in step ST51, and then allows the routine to proceed to step ST52. In step ST52, the symbol drawing section 105B sets a processing frame (processing screen) to an initial frame (initial screen). That is, a frame number k of the processing frame is set to 0. Further, the thinning-out number n is displayed.

Next, the symbol drawing section 105B determines whether the processing frame is the final frame (final screen) in step ST53. If the processing frame is not the final frame, the symbol drawing section 105B allows the routine to proceed to step ST54. In step ST54, the symbol drawing section 105B determines whether the staying number is 0, 1 or 2 or more.

If the staying number is 0, the symbol drawing section 105B does not draw the symbol, and sets the processing frame to the next frame in step ST55, and then returns the routine to step ST53. Further, if the staying number is 1, the symbol drawing section 105B allows the routine to proceed to step ST56. In step ST56, the symbol drawing section 105B determines whether the current frame number k is a multiple of n.

If the frame number k is the multiple of n, the symbol drawing section 105B allows the routine to proceed to step ST57. In step ST57, the symbol drawing section 105B draws a normal symbol as a symbol in a position corresponding to the target portion of the current frame (current screen) of the representative image. Further, after the operation of step ST57, the symbol drawing section 105B sets the processing frame to the next frame in step ST55, and then returns the routine to step ST53. On the other hand, if the frame number k is not the multiple of n, the symbol drawing section 105B does not draw the symbol, and sets the processing frame to the next frame in step ST55, and then returns the routine to step ST53. Thus, the drawing of the normal symbol is performed only one time for the n frames, to thereby perform the thinning-out.

Further, if the staying number is 2 or more in step ST54, the symbol drawing section 105B allows the routine to proceed to step ST58. In step ST58, the symbol drawing section 105B draws a staying symbol as a symbol in a position corresponding to the target portion of the current frame (current screen) of the representative image. The staying symbol may be differentiated from the normal symbol according to its shape, size, pattern, color or the like.

Further, the symbol drawing section 105B also draws the staying number in a position corresponding to the drawing position of the staying symbol, in step ST58. Further, after the operation of step ST58, the symbol drawing section 105B sets the processing frame to the next frame in step ST55, and then returns the routine to step ST53.

Further, if the processing frame is the final frame in step ST53, the symbol drawing section 105B allows the routine to proceed to step ST59. In step ST59, the symbol drawing section 105B draws a terminal symbol as a symbol in a position corresponding to the target portion of the current frame (=final frame) of the representative image. The terminal symbol may be differentiated from the normal symbol and the staying symbol according to its shape, size, pattern, color or the like.

Further, in step ST59, the symbol drawing section 105B also draws the staying number in a position corresponding to the drawing position of the terminal symbol. Further, after the operation of step ST59, the symbol drawing section 1.053 terminates the process in step ST60.

Figure 18:
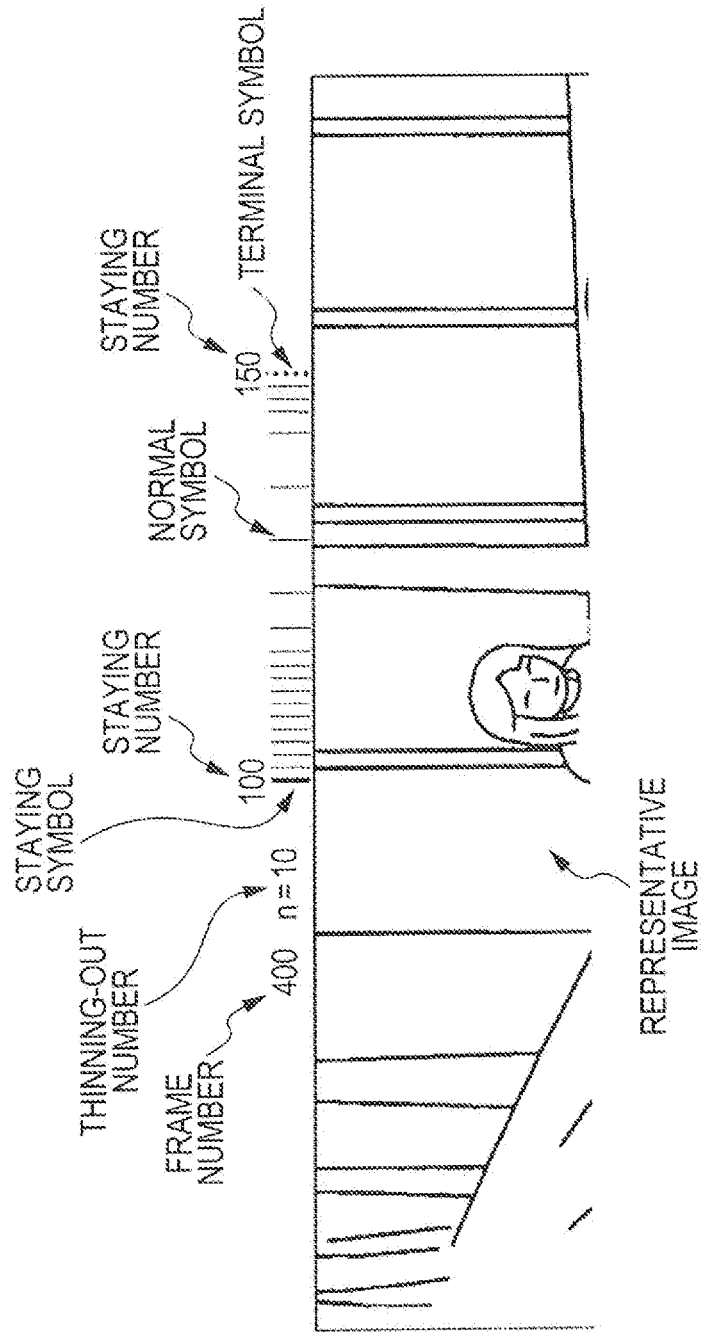
FIG. 18 is a diagram illustrating a drawing example according to a symbol drawing process.

FIG. 18 is a drawing example in the symbol drawing process in the flowchart of FIGS. 16, and 17. This drawing example is an example of a case where the number of frames (screens) which form the predetermined scene is 400, and n=10. In this way, by performing the symbol drawing process according to the flowchart of FIGS. 16 and 17, the normal symbols are thinned-out to be drawn. Thus, even in a case where the display size of the representative image in the output device is small, it is possible to prevent the difficulty in grasping the movement of the target portion due to excessive mixture of the drawn normal symbols.

In the process in the flowchart of FIG. 16, until the distance "d" becomes a value such that the drawn symbols are capable of being distinguished, n is changed from 1 to obtain a final n value relating to the thinning-out ratio. However, a method of calculating the value of n is not limited thereto. For example, simply, the value of n may be an integer value close to 1/d which is a reciprocal of d. Further, for example, instead of changing n from 1, n may be increased or decreased from the integer value close to 1/d which is the reciprocal of d to obtain the final value n.

[Operation Example of Image Processing Apparatus]

The operation of the image processing section 100B shown in FIG. 14 will be described.

An image signal which is a processing target is input to the image input section 101. The image signal which is the processing target is obtained by photographing of an imaging device (camera), for example, and is directly supplied from the imaging device (camera) or is supplied by being read from a predetermined recording medium.

The image input section 101 processes the input image signal to detect a scene change point, and divides the input image signals for each scene. Further, the image input section 101 sequentially supplies the image signals of each scene to the representative image creating section 102 and the target portion movement detecting section 103.

The representative image creating section 102, the target portion movement calculating section 103, the staying number calculating section 104 and the symbol drawing section 105B sequentially process the respective scenes as a scene (predetermined scene) which is a processing target. That is, the representative image creating section 102 processes the image signal of the predetermined scene, and creates a representative image on the basis of the images of the respective screens (frames) which form the predetermined scene. For example, an image of a predetermined one screen, for example, of one leading screen is selected from the images of the respective screens which form the predetermined scene, to be created as the representative image. Further, for example, a composite image obtained by overlapping the images of the respective screens which form the predetermined scene is created as the representative image. Further, for example, a united image obtained by connecting the images of the respective screens which form the predetermined scene is created as the representative image.

Further, the target portion movement calculating section 103 processes the image signals of the predetermined scene, and calculates the movements (movement vectors) of the target portion of the respective screens in the predetermined scene. The movements of the target portion of the respective screens in the predetermined scene are supplied to the staying number calculating section 104. The staying number calculating section 104 calculates the staying numbers and the accumulated values of the target portion of the respective screens, on the basis of the movements of the target portion of the respective screens in the predetermined scene (see FIG. 2). Further, the thinning-out number calculating section 108 determines the distance "d" between the closest symbols in the display region, determines the proximity between the symbols on the basis of the distance d, and calculates the thinning-out number.

The staying numbers and the accumulated values of the target portion of the respective screens calculated by the staying number calculating section 104 are supplied to the symbol drawing section 105B. Further, the thinning-out number calculated by the thinning-out number calculating section 108 is supplied to the symbol drawing section 105B. Further, the image signal (image data) of the representative image created by the representative image creating section 102 is supplied to the symbol drawing section 105B. The symbol drawing section 105B draws the symbols indicating the movements of the target portion in the peripheral section of the representative image, on the basis of the staying number of the target portion of the respective screens (see FIG. 4).

The symbol drawing section 105B obtains an image signal (image data) of the representative image in which the symbols indicating the movements of the target portion are drawn in the peripheral section thereof for each scene. The image signal (image data) is supplied to the output device interface (I/F) 106. The output device interface 106 supplies the image signal which is supplied from the symbol drawing section 1053, that is, the image signal (image data) of the representative image in which the symbols indicating the movements of the target portion are drawn in the peripheral section, to an output device such as an image display device or a recording device.

Thus, for example, the image display device displays the representative image in which the symbols indicating the movements of the target portion are drawn in the peripheral section. Further, for example, in the recording device, the image signal of the representative image of each scene in which the symbols are drawn is recorded in the recording medium in accordance with each scene of the image signal input to the image input section 101.

As described above, the image processing apparatus 100B shown in FIG. 14 processes the image signals of the predetermined scene by the representative image creating section 102, and creates the representative image on the basis of the images of the respective screens which form the predetermined scene. Further, the target portion movement calculating section 103 processes the image signals of the predetermined scene and calculates the movements of the target portion of the respective screens in the predetermined scene. Further, the staying number calculating section 104 calculates the staying numbers of the target portion of the respective screens in the predetermined scene, on the basis of the calculated movements of the target portion of the respective screens in the predetermined scene.

Further, the symbol drawing section 105B draws the symbols (normal symbol, staying symbol and terminal symbol) indicating the movements of the target portion in the peripheral section of the representative image created by the representative image creating section 102, on the basis of the calculated staying numbers of the target portion of the respective screens in the predetermined scene. Accordingly, it is possible for a reader, an editor or the like to easily grasp the entire movement of the target portion in the scene. That is, it is possible for the reader, the editor or the like to generally perceive the movement of the target portion in the scene.

In the image processing apparatus 100B shown in FIG. 14, the thinning-out section 108 determines the distance "d" between the closest symbols in the display region, determines the proximity between the symbols on the basis of the distance d, and calculates the thinning-out number. Further, the symbol drawing section 105B draws the symbols indicating the movements of the target portion in the peripheral section of the representative image, on the basis of the staying numbers of the target portion of the respective screens (see FIG. 4). Thus, even in a case where the display size of the representative image in the output device is small, it is possible to prevent the difficulty in grasping the movement of the target portion due to excessive mixture of the drawn normal symbols.

[Another Example of Symbol Drawing Process]

Further, in the process of the flowchart of FIG. 17, the respective normal symbols drawn by the symbol drawing section 105E are expressed by the line segments of the same length. However, the length of the normal symbol may be a length according to the movement of the target portion of the respective screens. In this case, for example, the length "h" of the normal symbol drawn in a predetermined screen may be H*Mv/Mvmax. Here, the length in the direction perpendicular to the movement direction of the target portion of the display region of the peripheral section in the output device is H, the maximum movement among the movements of the target portion is Mvmax, and the movement of the target of each screen is Mv.

Figure 19:
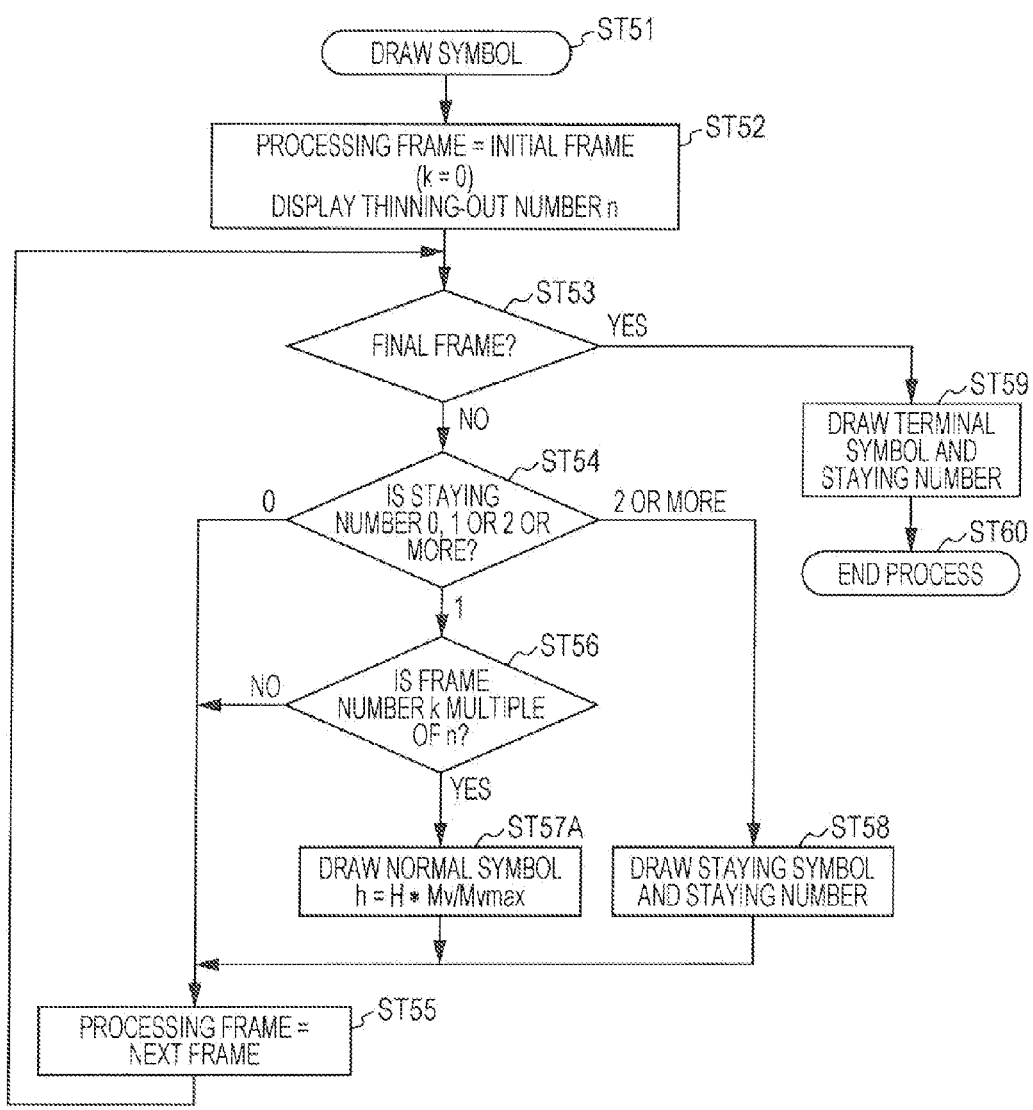
FIG. 19 is a flowchart illustrating an example of a process routine of a symbol drawing section.

FIG. 19 is a flowchart illustrating an example of a process routine of the symbol drawing section 105B in this case. In FIG. 19, the same reference numbers are given to steps corresponding to those in FIG. 17, and detailed description thereof will be omitted. In the flowchart of FIG. 19, step ST57A is placed instead of step ST57 in the flowchart of FIG. 17.

If the frame number k is the multiple of n in step ST56, the symbol drawing section 105B allows the routine to proceed to step ST57A. In step ST57A, the symbol drawing section 105B draws a normal symbol as a symbol in a position corresponding to the target portion of the current frame (current screen) of the representative image. In this case, the symbol drawing section 105B sets the length h of the drawn normal symbol to H*Mv/Mvmax as described above, to obtain the length corresponding to the size Mv of the movement of the target portion of the current frame.

After the operation of step ST57A, the symbol drawing section 105B sets the processing frame to the next frame in step ST55, and then returns the routine to step ST53. Detailed description thereof will be omitted, but the other steps in the flowchart of FIG. 19 are the same as the corresponding operations in the flowchart of FIG. 17.

Figure 20:
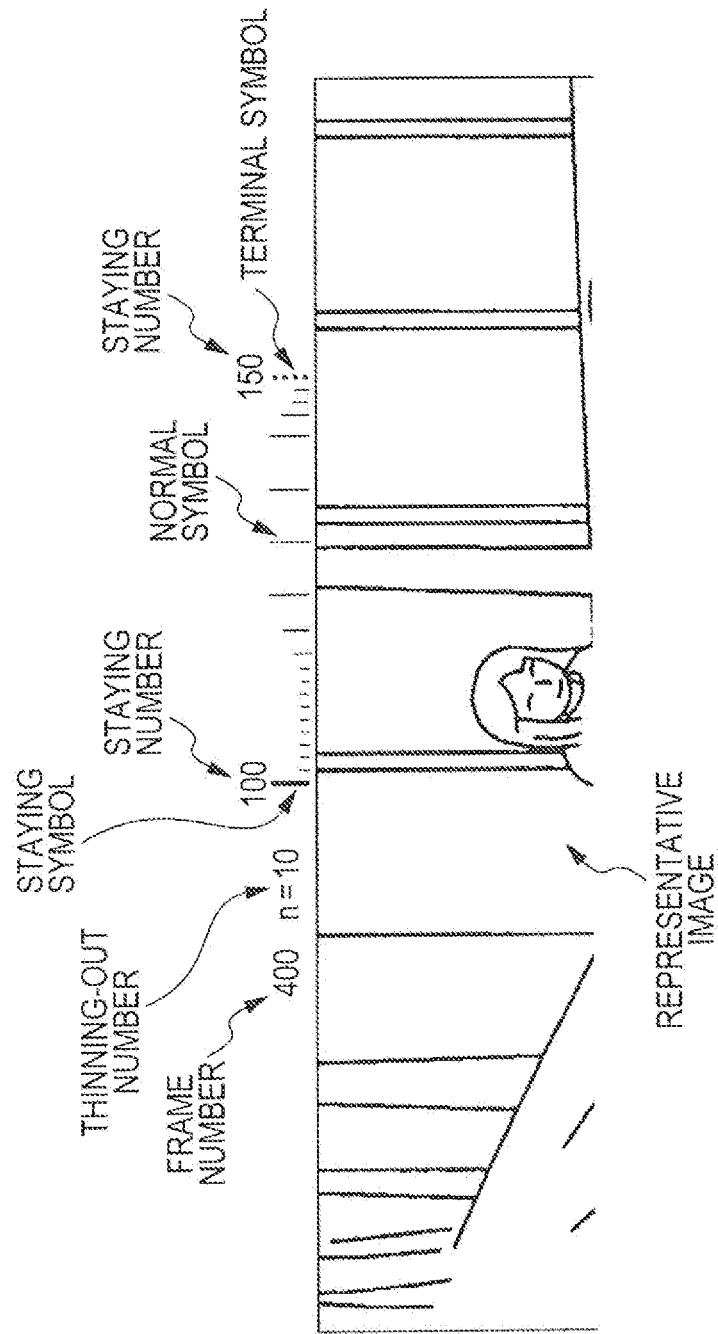
FIG. 20 is a diagram illustrating a drawing example according to a symbol drawing process.

FIG. 20 illustrates a drawing example of the symbol drawing process in the flowchart of FIG. 19. This drawing example is an example when the number of frames (screens) which form the predetermined scene is 400, and n=10. In this way, by performing the symbol drawing process in the flowchart of FIG. 19, the normal symbols are thinned-out to be drawn. Thus, even in a case where the display size of the representative image in the output device is small, it is possible to prevent the difficulty in grasping the movement of the target portion due to excessive mixture of the drawn normal symbols. Further, by performing the symbol drawing process in the flowchart of FIG. 19, the length of the normal symbol drawn for every frame number k which is the multiple of n corresponds to the movement of the target portion of the screen, thereby making it possible to increase the amount of information indicated by the normal symbol.

[Another Example of Symbol Drawing Process]

Further, in the process of the flowchart of FIG. 19, the normal symbol is drawn in the screen in which the frame number k is the multiple of n, but the normal symbol is not drawn in a different screen. However, the normal symbol may be deeply drawn by a deep color in the screen in which the frame number k is the multiple of n, and the normal symbol may be lightly drawn by a light color in a different screen.

Figure 21:
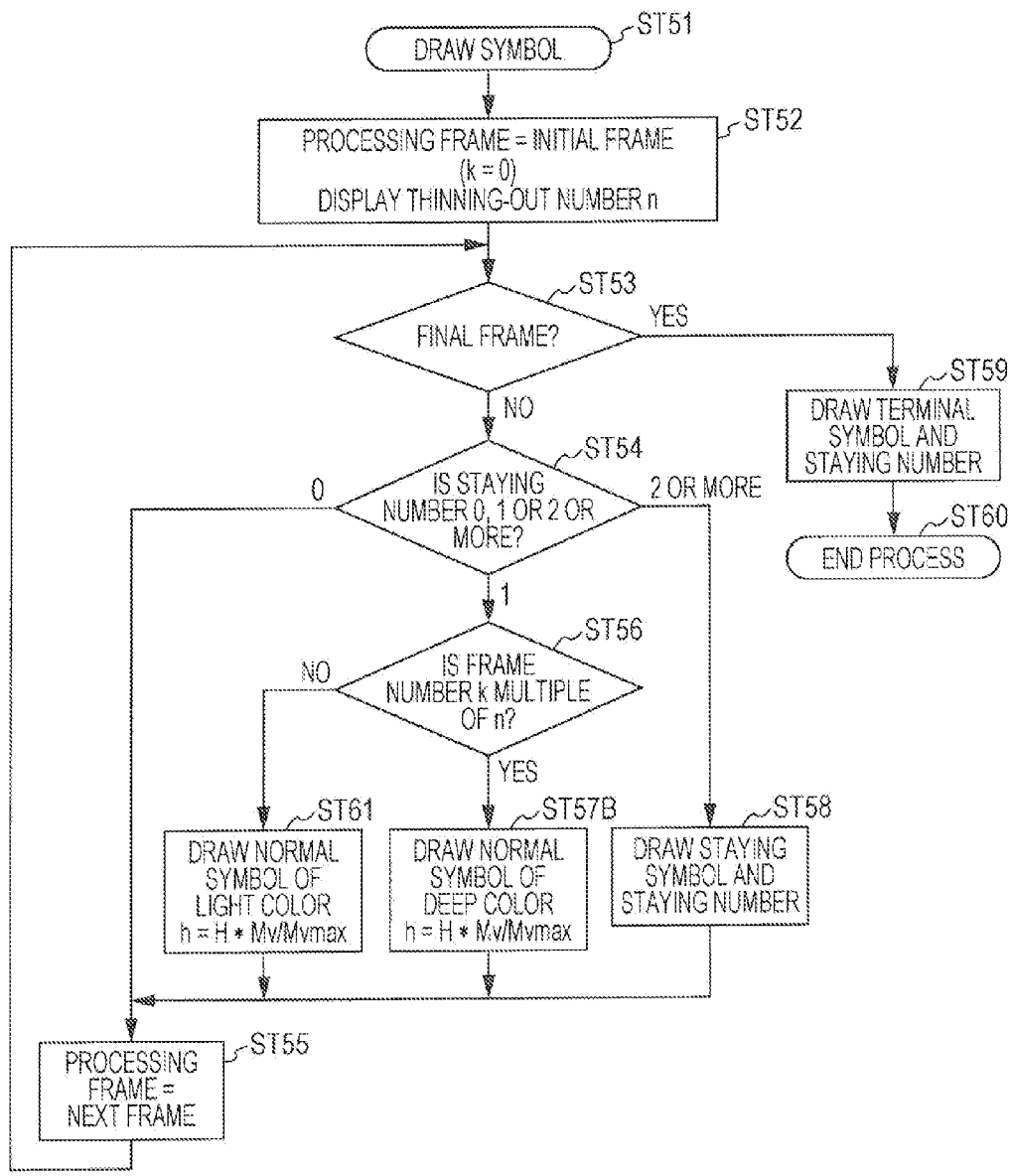
FIG. 21 is a flowchart illustrating an example of a process routine of a symbol drawing section.

FIG. 21 is a flowchart illustrating an example of a process routine of the symbol drawing section 105B in this case. In FIG. 21, the same reference numbers are given to steps corresponding to those in FIG. 19, and detailed description thereof will be omitted. In the flowchart of FIG. 21, step ST57B is placed instead of step ST57A in the flowchart of FIG. 19, and step ST61 is added as an operation step when the frame number k is not the multiple of n.

If the frame number k is the multiple of n in step ST56, the symbol drawing section 105B allows the routine to proceed to step ST57B. In step ST57B, the symbol drawing section 105B deeply draws a normal symbol with a deep color, as a symbol in a position corresponding to the target portion of the current frame (current screen) of the representative image. In this case, the symbol drawing section 105B sets the length h of the drawn normal symbol to H*Mv/Mvmax as described above, to obtain the length corresponding to the size Mv of the movement of the target portion of the current frame. After the operation of step ST57B, the symbol drawing section 105B uses the processing frame to the next frame in step ST55, and then returns the routine to step ST53.

Further, if the frame number k is not the multiple of n in step ST56, the symbol drawing section 105B allows the routine to proceed to step ST61. In step ST61, the symbol drawing section 105B lightly draws a normal symbol with a light color, as a symbol in a position corresponding to the target portion of the current frame (current screen) of the representative image. In this case, the symbol drawing section 105B sets the length h of the drawn normal symbol to H*Mv/Mvmax as described above, to obtain the length corresponding to the size Mv of the movement of the target portion of the current frame. After the operation of step ST61, the symbol drawing section 105B sets the processing frame to the next frame in step ST55, and then returns the routine to step ST53. Detailed description thereof will be omitted, but the other steps in the flowchart of FIG. 21 are the same as the corresponding operations in the flowchart of FIG. 19.

Figure 22:
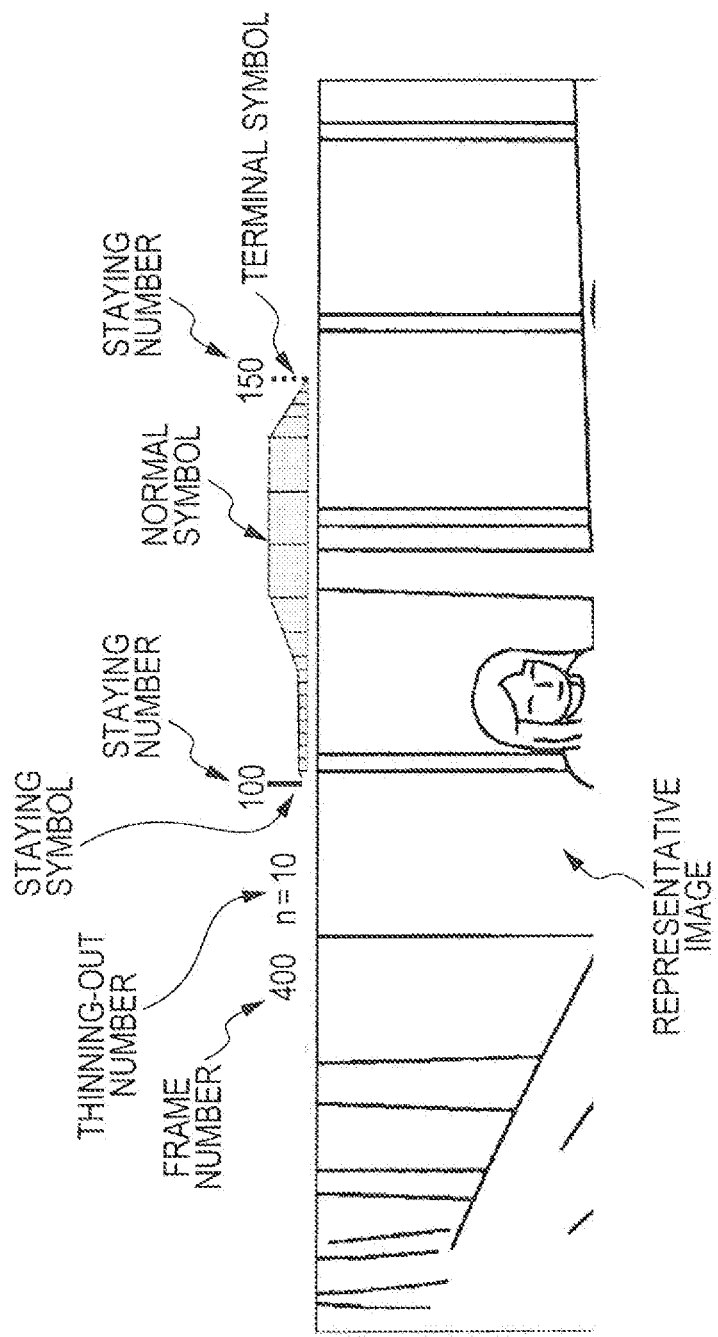
FIG. 22 is a diagram illustrating a drawing example according to a symbol drawing process.

FIG. 22 is a flowchart illustrating a drawing example in the symbol drawing process in the flowchart of FIG. 21. This drawing example is an example when the number of frames (screens) which form the predetermined scene is 400, and n=10. In this way, in the symbol drawing process in the flowchart of FIG. 21, the normal symbols which are deeply drawn are thinned-out. Thus, even in a case where the display size of the representative image in the output device is small, it is possible to prevent the difficulty in grasping the movement of the target portion due to excessive mixture of the drawn normal symbols. Further, in this case, since the length of the normal symbol drawn in each screen corresponds to the movement of the target portion of the screen, it is possible to increase the amount of information indicated by the normal symbol [TY2].

3. Third Embodiment

[Configuration Example of Image Processing Apparatus]

Figure 23:
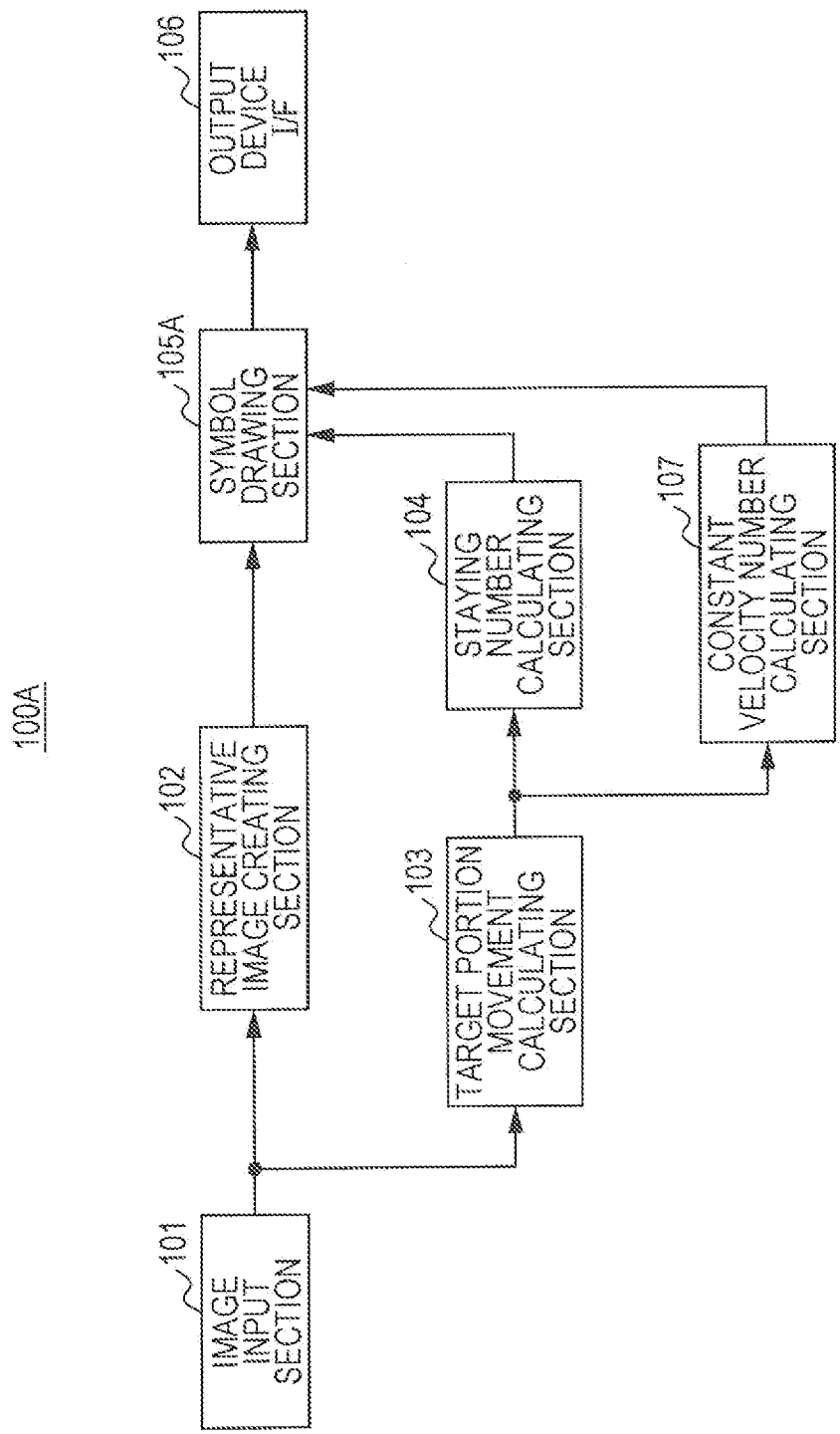
FIG. 23 is a block diagram illustrating a configuration example of an image processing apparatus according to a third embodiment of the present disclosure.

FIG. 23 illustrates a configuration example of an image processing apparatus 100A according to a third embodiment. The image processing apparatus 100A includes an image input section 101, a representative image creating section 102, a target portion movement calculating section 103, a staying number calculating section 104, a symbol drawing section 105A, an output device interface (I/F) 106, and a constant velocity number calculating section 107. In FIG. 23, the same reference numerals are given to the sections corresponding to those in FIG. 1, and detailed description thereof will be appropriately omitted.

An image signal which is a processing target is input to the image input section 101. The image signal which is the processing target is obtained by photographing of an imaging device (camera), for example, and is directly supplied from the imaging device (camera) or is supplied by being read from a predetermined recording medium. The image input section 101 processes the input image signal to detect a scene change point, and divides the input image signals for each scene. Further, the image input section 101 sequentially supplies the image signals of each scene to the representative image creating section 102 and the target portion movement detecting section 103.

The representative image creating section 102, the target portion movement calculating section 103, the staying number calculating section 104, the constant velocity number calculating section 107 and the symbol drawing section 105A sequentially process the respective scenes. Here, respective sections will be described using a scene which is a processing target as a predetermined scene. The representative image creating section 102 processes the image signals of the predetermined scene, and creates a representative image on the basis of the image signals of respective screens which form the predetermined scene. The target portion movement calculating section 103 processes the image signals of the predetermined scene, and calculates the movements (movement vector) of the target portion of the respective screens in the predetermined scene. The staying number calculating section 104 calculates the staying numbers of the target portion of the respective screens, on the basis of the movements of the target portion of the respective screens in the predetermined scene calculated by the target portion movement calculating section 103 (see FIGS. 2 and 7).

The constant velocity number calculating section 107 calculates the number of constant velocities of the target portion of the respective screens, on the basis of the movements of the target portion of the respective screens in the predetermined scene calculated by the target portion movement calculating section 103.

[Constant Velocity Number Calculating Process]

Figure 24:
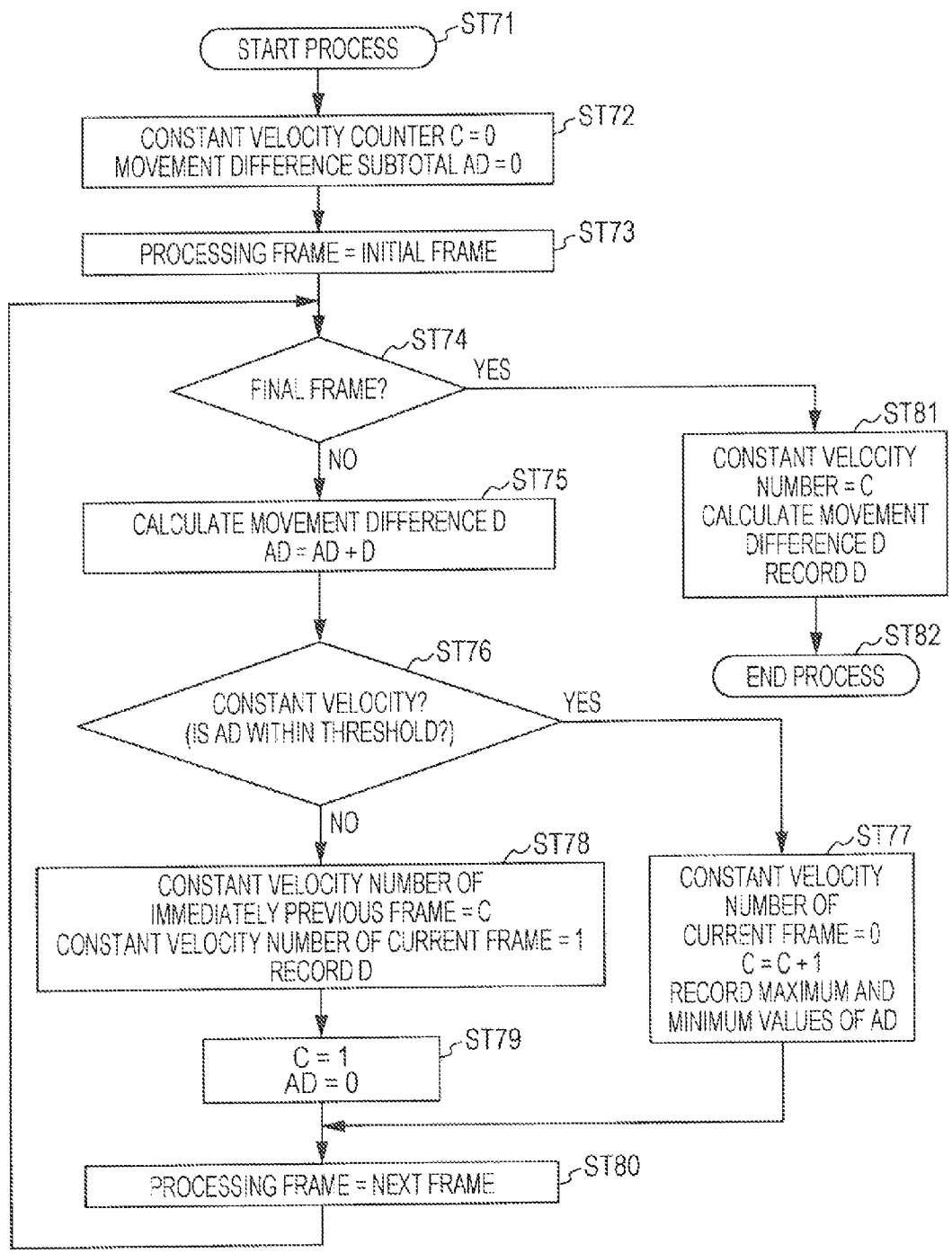
FIG. 24 is a flowchart illustrating an example of a process routine in a constant velocity number calculating section.

FIG. 24 is a flowchart illustrating an example of a process routine in the constant velocity number calculating section 107. In step ST71, the constant velocity number calculating section 107 starts the process, and then allows the routine to proceed to step ST72. In step ST72, the constant velocity number calculating section 107 sets a value of a constant velocity counter C to 0, and sets a value of a movement difference subtotal AD to 0. Further, the constant velocity number calculating section 107 sets a processing frame (processing screen) to an initial frame (initial screen), in step ST73.

Next, the constant velocity number calculating section 107 determines in step ST74 whether the processing frame is the final frame (final screen). If the processing frame is not the final frame, the constant velocity number calculating section 107 allows the routine to proceed to step ST75. In step ST75, the constant velocity number calculating section 107 subtracts the movement of the target portion of the previous frame from the movement of the target portion of the current frame to calculate a movement difference AD of the current frame. Further, the constant velocity number calculating section 107 adds the movement difference AD of the current frame to the movement difference subtotal AD to calculate the movement difference subtotal AD in the current frame.

Next, the Constant velocity number calculating section 107 determines in step ST76 whether the target portion moves at a constant velocity. Here, the constant velocity number calculating section 107 determines whether the target portion moves at the constant velocity according to whether the movement difference subtotal AD is within the range of a threshold. That is, the constant velocity number calculating section 107 determines that the target portion moves at the constant velocity if the AD is within the range of the threshold, and determines that the target portion does not move at the constant velocity if the AD is not within the range of the threshold.

If it is determined that the target portion moves at the constant velocity, the constant velocity number calculating section 107 allows the routine to proceed to step ST77. In step ST77, the constant velocity number calculating section 107 sets the constant velocity number of the current frame to 0, and increments the value of the constant velocity counter C by 1. Further, the constant velocity number calculating section 107 records a maximum value and a minimum value of the movement difference subtotal AD, in step ST77. This recording information is information (metadata) indicating the level of the movement difference subtotal AD in a case where it is determined that the target portion does not move at the constant velocity. For example, the threshold may be adaptively changed on the basis of the information.

If it is determined that the target portion does not move at the constant velocity in step ST76, the constant velocity number calculating section 107 allows the routine to proceed to step ST78. In step ST78, the constant velocity number calculating section 107 sets the constant velocity number of the immediately previous frame (screen) to the value of the constant velocity counter, sets the constant velocity number of the current frame to 1, and records the movement difference D of the target portion of the current frame. Further, in step ST79, the constant velocity number calculating section 107 sets the value of the constant velocity counter C to 1, and resets the movement difference subtotal AD to 0.

After the operations of step ST77 and step ST79, the constant velocity number calculating section 107 allows the routine to proceed to step ST80. In step ST80, the constant velocity number calculating section 107 sets the processing frame to the next frame, and then returns the routine to step ST74.

Further, if the processing frame is the final frame in ST74, the constant velocity number calculating section 107 allows the routine to proceed to step ST81. In step ST81, the constant velocity number calculating section 107 sets the constant velocity number of the current frame (=final frame) to the value of the constant velocity counter C. Further, in step ST81, the constant velocity number calculating section 107 calculates and records the movement difference D of the target portion of the current frame. Further, the constant velocity number calculating section 107 terminates the process in step ST82.

FIG. 25 is a diagram illustrating an example of a target portion movement Mv of each frame, and a staying number, an accumulated value, a movement difference and a constant velocity obtained by the target portion movement Mv of each frame, in a case where the number of frames (screens) which form a predetermined scene is 40. The staying number and the accumulated value are obtained in the staying number calculating process shown in the flowcharts of the above-described FIGS. 2 and 7. Further, the movement difference and the constant velocity number are obtained in the constant velocity number calculating process shown in the flowchart of FIG. 24. In this example, since the movement differences D are 0 in frames 1 to 10, it is determined that the target portion continuously moves at the constant velocity. Further, since the movement Mv of the target portion is 50 and the movement difference D is 50 in frame 11, it is determined that the target portion does not move at the constant velocity. Thus, the constant velocity numbers in frames 1 to 9 are 0, and the constant velocity number in frame 10 is 10.

Further, in this example, since the movement differences D are 0 in frames 11 to 17, it is determined that the target portion continuously moves at the constant velocity. Thus, since the movement difference D in frame 18 is 50, it is determined that the target portion does not continuously move at the constant velocity. Thus, the constant velocity numbers in frames 11 to 16 are 0, and the constant velocity number in frame 17 is 7. In this example, since the movement differences D are 50 in frames 18 to 20, it is determined that the target portion does not continuously move at the constant velocity. Thus, the constant velocity numbers in frames 18 to 20 are 1.

Further, in this example, since the movement differences D in frames 21 and 22 are 0, it is determined that the target portion continuously moves at the constant velocity. Further, since the movement difference D in frame 23 is −50, it is determined that the target portion does not continuously move at the constant velocity. Thus, the constant velocity number in frame 21 is 0, and the constant velocity number in frame 22 is 2. Further, in this example, since the movement differences D in frames 23 to 25 are −50, it is determined that the target portion does not continuously move at the constant velocity. Thus, the constant velocity numbers in frames 23 to 25 are 1. Further, in this example, since the movement differences D in frame 26 to 39 are 0, it is determined that the target portion continuously moves at the constant velocity. Thus, the constant velocity numbers in frames 27 to 39 are 0, the constant velocity number in frame 40 is 15.

In the constant velocity number calculating process shown in the flowchart of FIG. 24, the constant velocity in step ST76 is determined according to whether the movement difference subtotal AD is within the range of the threshold. However, the constant velocity in the predetermined frame may be determined according to whether the movement difference D in the frame is within the range of a threshold.

The symbol drawing section 105A draws the symbols indicating the movements of the target portion in the peripheral section of the representative image created by the representative image creating section 102. In this case, the symbol drawing section 105A performs the drawing process on the basis of the staying numbers of the respective screens calculated by the staying number calculating section 104 and the movement differences D and the constant velocity numbers of the respective screens calculated by the constant velocity number calculating section 107. Further, the symbol drawing section 105A supplies an image signal (image data) of the representative image in which the symbols indicating the movements of the target portion are drawn in the peripheral section thereof to the output device interface (I/F) 106.

[Symbol Drawing Process]

Figure 26:
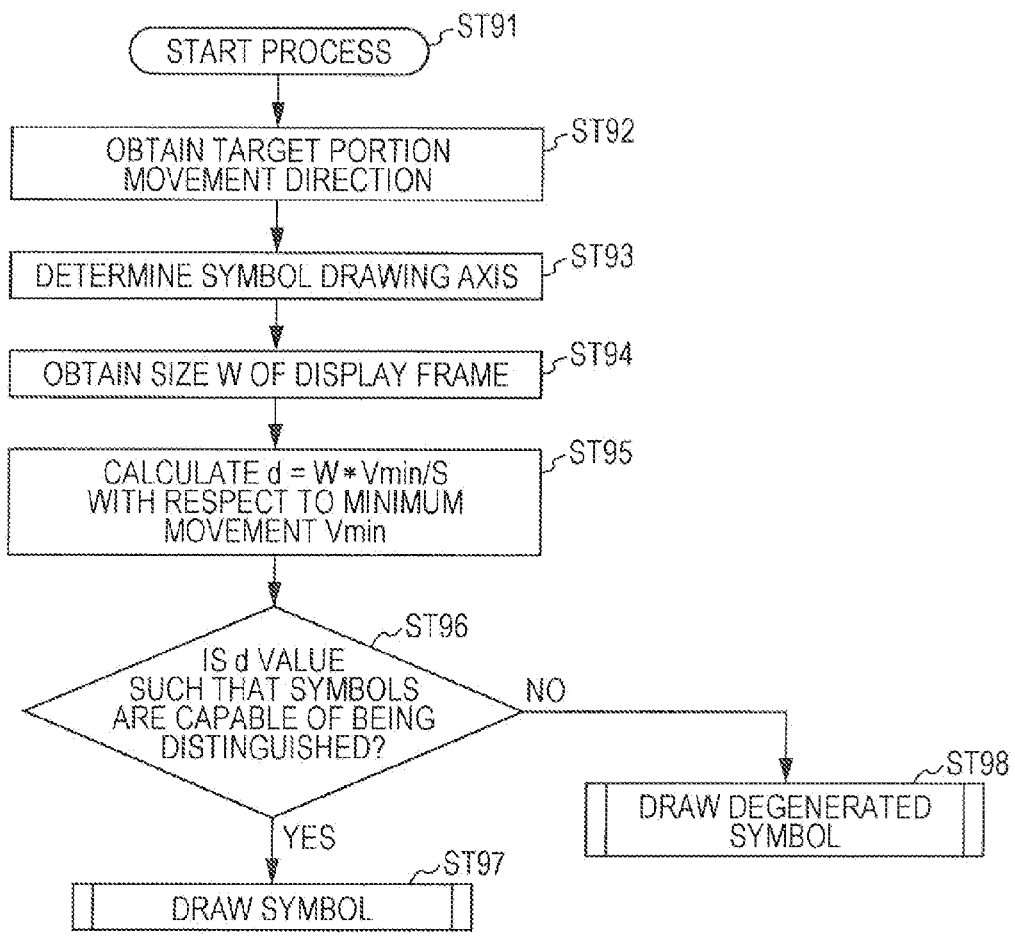
FIG. 26 is a flowchart illustrating an example of a process routine of a symbol drawing section.

FIG. 26 is a flowchart illustrating an example of a process routine in the symbol drawing section 105A. The symbol drawing section 105A starts the process in step ST91, and then allows the routine to proceed to step ST92. In step ST92, the symbol drawing section 105A obtains a movement direction of the target portion. For example, a horizontal direction, a vertical direction, a tilt direction (both of the horizontal direction and the vertical direction), or the like is used as the movement direction. In this case, the symbol drawing section 105A obtains the movement direction of the target portion, on the basis of the movement (movement vector) of the target portion of each screen calculated by the target portion movement calculating section 103, for example.

Next, the symbol drawing section 105A determines a symbol drawing axis, in step ST93. In this case, the symbol drawing section 105A determines the symbol drawing axis to correspond to the movement direction of the target portion obtained in step ST92. For example, if the movement direction of the target portion is the horizontal direction, the symbol drawing axis is determined as the horizontal direction. Further, in step ST94 the symbol drawing section 105A obtains the size "W" of the display frame, that is, the length "W" of the movement direction of the target portion of the display region of the representative image in the above-described output device. Information about the length "W" is assigned by a user operation, or is automatically obtained from the output device through the output device interface 106.

Next, in step ST95, the symbol drawing section 105A calculates the distance "d" using the expression (1) with respect to the minimum movement Vmin of the frame. Further, in step ST96, it is determined whether the calculated distance "d" is a value (for example, 2) such that the drawn symbols are capable of being distinguished. When the distance "d" is small compared with the sizes of the drawn symbols, it may be difficult to view the drawing symbols drawn by a user.

If the distance "d" is the value such that the drawn symbols are capable of being distinguished, the symbol drawing section 105A allows the routine to proceed to step ST97. Detailed description about the symbol drawing process in step ST97 is omitted, which is the same as the symbol drawing processes in the flowchart of FIGS. 4, 7 and 11.

Figure 27:
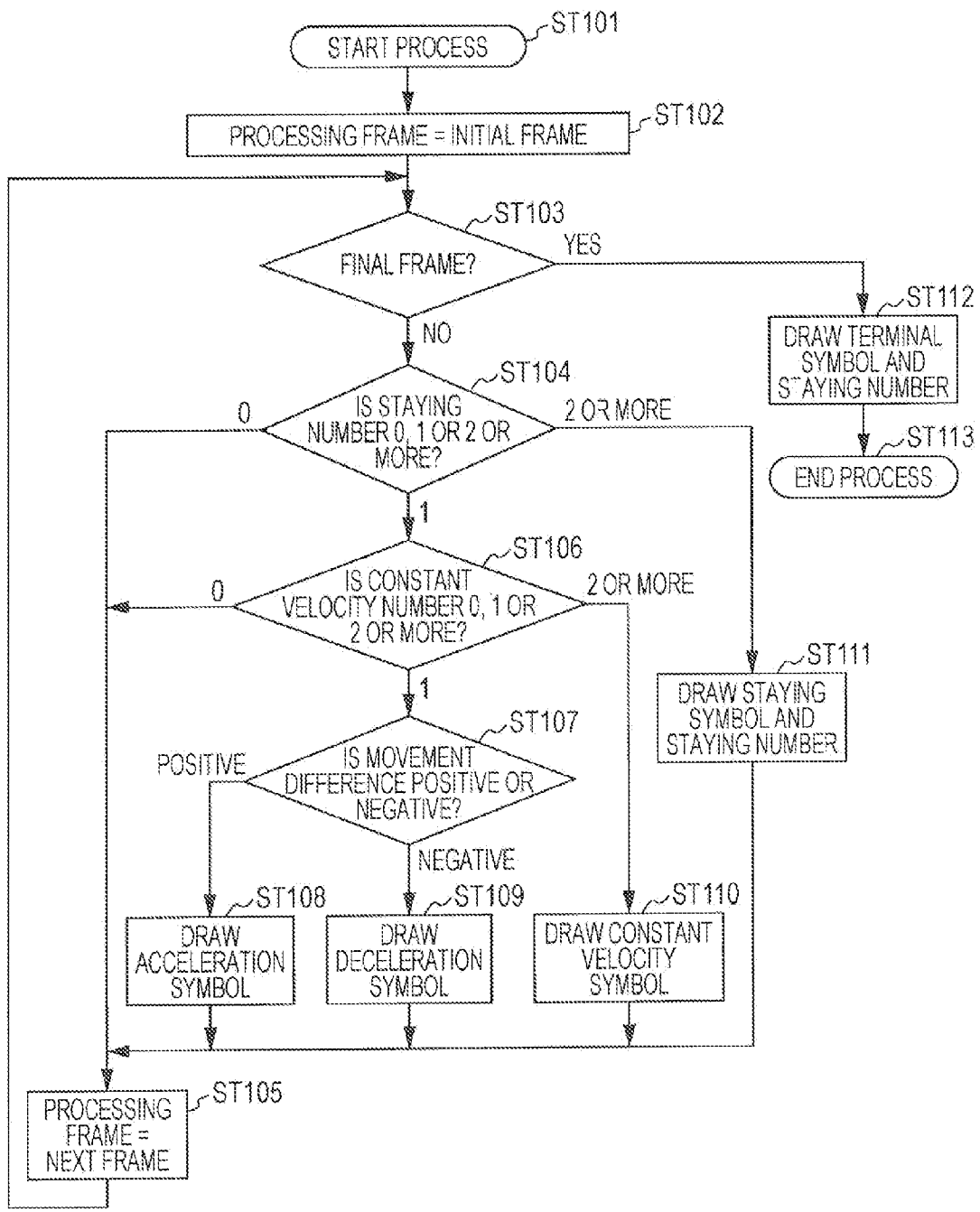
FIG. 27 is a flowchart illustrating an example of a process routine of a symbol drawing section.

Further, if the distance "d" is not the value such that the drawn symbols are capable of being distinguished in step ST96, the symbol drawing section 105A allows the routine to proceed to a degenerated symbol drawing process in step ST98. FIG. 27 is a flowchart illustrating the degenerated symbol drawing process in step ST98 in the flowchart of FIG. 26.

In step ST101, the symbol drawing section 105A starts the process, and then allows the routine to proceed to step ST102. In step ST102, the symbol drawing section 105A sets a processing frame (processing screen) to an initial frame (initial screen).

Next, the symbol drawing section 105A determines in step ST103 whether the processing frame is the final frame (final screen). If the processing frame is not the final frame, the symbol drawing section 105A allows the routine to proceed to step ST104. In step ST104, the symbol drawing section 105A determines whether the staying number is 0, 1, or 2 or more.

If the staying number is 0, the symbol drawing section 105A sets the processing frame to the next frame in step ST105, without drawing the symbols, and then returns the routine to step ST103. Further, if the staying number is 1, the symbol drawing section 105A allows the routine to proceed to step ST106. In step ST106, the symbol drawing section 105A determines whether the constant velocity number of the current frame is 0, 1 or 2 or more.

If the constant velocity number is 0, the symbol drawing section 105A sets the processing frame to the next frame in step ST105 without drawing the symbols, and then returns the routine to step ST103. Further, if the constant velocity number is 1, the symbol drawing section 105A allows the routine to proceed to step ST107. In step ST107, the symbol drawing section 105A determines whether the movement difference is positive or negative.

If the movement difference is positive, the symbol drawing section 105A allows the routine to proceed to step ST108. In step ST108, the symbol drawing section 105A draws, as a symbol, an acceleration symbol indicating that the movement of the target portion is accelerated in a position corresponding to the target portion of the current frame (current screen) of the representative image. On the other hand, if the movement difference is negative, the symbol drawing section 105A allows the routine to proceed to step ST109. In step ST109, the symbol drawing section 105A draws, as a symbol, a deceleration symbol indicating that the movement of the target portion is decelerated in the position corresponding to the target portion of the current frame (current screen) of the representative image. Further, after the operation of step ST108 or step ST109, the symbol drawing section 105A sets the processing frame to the next frame in step ST105, and then returns the routine to step ST103.

Further, if the constant velocity number is 2 or more in step ST106, the symbol drawing section 105A draws, as a symbol, a constant velocity symbol indicating that the target portion moves at the constant velocity in the position corresponding to the target portion of the current frame (current screen) of the representative image. Further, after the operation of step ST110, the symbol drawing section 105A sets the processing frame to the next frame in step ST105, and then returns the routine to step ST103.

Further, if the constant velocity number is 2 or more in step ST104, the symbol drawing section 105A allows the routine to proceed to step ST111. In step ST111, the symbol drawing section 105A draws a staying symbol as a symbol in the position corresponding to the target portion of the current frame (current screen) of the representative image. The staying symbol may be differentiated from the normal symbol according to its shape, size, pattern, color or the like. Further, the symbol drawing section 105A also draws the staying number in a position corresponding to the drawing position of the staying symbol, in step ST111. Further, after the operation of step ST111, the symbol drawing section 105A sets the processing frame to the next frame in step ST105, and then returns the routine to step ST103.

Further, if the processing frame is the final frame in step ST103, the symbol drawing section 105A allows the routine to proceed to step ST112. In step ST112, the symbol drawing section 105A draws a terminal symbol as a symbol in the position corresponding to the target portion of the current frame (=final frame) of the representative image. The terminal symbol may be differentiated from the normal symbol and the staying symbol according to its shape, size, pattern, color or the like. Further, the symbol drawing section 105A also draws the staying number in a position corresponding to the drawing position of the terminal symbol, in step ST112. Further, after the operation of step ST112, the symbol drawing section 105A terminates the process in step ST113.

Figure 28:
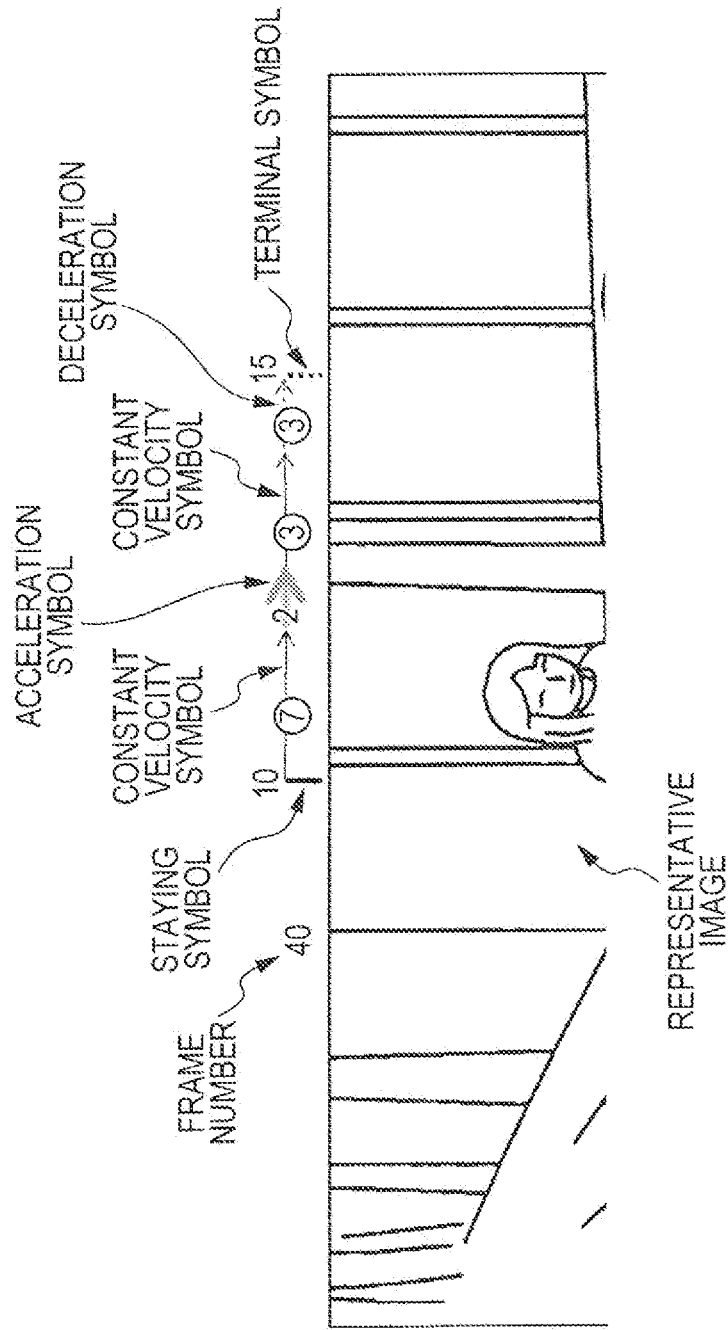
FIG. 28 is a diagram illustrating a drawing example according to a symbol drawing process.

FIG. 28 illustrates a drawing example of respective symbols and staying numbers when staying numbers, movement differences, constant velocity numbers and the like of respective frames (screens) are as shown in FIG. 25, in a case where the number of frames (screens) which form a predetermined scene is 40. In the drawing example of FIG. 28, continuous frame numbers of the constant velocity, acceleration and deceleration are displayed, but these may not be displayed.

The output device interface 106 supplies the image data which is supplied from the symbol drawing section 105A, that is, the image signal (image data) of the representative image in which the symbols indicating the movements of the target portion are drawn in the peripheral section thereof, to an output device such as an image display device or a recording device. For example, in the image display device, the representative image in which the symbols indicating the movements of the target portion are drawn in the peripheral section is displayed. Further, for example, in the recording device, the image signal of the representative image of each scene in which the symbols are drawn is recorded in the recording medium in accordance with each scene of the image signal input to the image input section 101.

[Operation Example of Image Processing Apparatus]

An operation example of the image processing section 100A shown in FIG. 23 will be described. An image signal which is a processing target is input to the image input section 101. The image signal which is the processing target is obtained by photographing of an imaging device (camera), for example, and is directly supplied from the imaging device (camera) or is supplied by being read from a predetermined recording medium.

The image input section 101 processes the input image signal to detect a scene change point, and divides the input image signals for each scene. Further, the image input section 101 sequentially supplies the image signals of each scene to the representative image creating section 102 and the target portion movement detecting section 103.

The representative image creating section 102, the target portion movement calculating section 103, the staying number calculating section 104, the constant velocity number calculating section 107 and the symbol drawing section 105A sequentially process the respective scenes as a scene (predetermined scene) which is a processing target. That is, the representative image creating section 102 processes the image signals of the predetermined scene, and creates a representative image on the basis of the images of the respective screens (frames) which form the predetermined scene. For example, an image of a predetermined one screen, for example, of one leading screen is selected from the images of the respective screens which form the predetermined scene, to be created as the representative image. Further, for example, a composite image obtained by overlapping the images of the respective screens which form the predetermined scene is created as the representative image. Further, for example, a united image obtained by connecting the images of the respective screens which form the predetermined scene is created as the representative image.

Further, the target portion movement calculating section 103 processes the image signals of the predetermined scene, and calculates a movement (movement vector) of a target portion of each screen in the predetermined scene. The movement of the target portion of each screen in the predetermined scene calculated in this way is supplied to the staying number calculating section 104. The staying number calculating section 104 calculates a staying number and an accumulated value of each screen, on the basis of the movement of the target portion of each screen (see FIGS. 2 and 7). Further, the constant velocity number calculating section 107 calculates a constant velocity number and a movement difference of each screen in the predetermined scene, on the basis of the movement of the target portion of each screen in the predetermined scene (see FIG. 24).

The staying number and the accumulated value of each screen in the predetermined scene calculated by the staying number calculating section 104 is supplied to the symbol drawing section 105A. Further, the constant velocity number and the movement difference of each screen in the predetermined scene calculated by the constant velocity number calculating section 107 is supplied to the symbol drawing section 105A. Further, the image signal (image data) of the representative image created by the representative image creating section 102 is supplied to the symbol drawing section 105A. The symbol drawing section 105A draws the symbol indicating the movement of the target portion in the peripheral section of the representative image, on the basis of the staying number, the constant velocity number, the movement difference and the like of each screen in the predetermined scene (see FIGS. 26 and 27).

In this case, a distance "d" between the closest symbols in a display region is calculated. Further, if the distance "d" is a value such that the drawn symbols are capable of being distinguished, a normal symbol is drawn (see FIGS. 4, 7 and 11) as a symbol in a position corresponding to the target portion of the screen of the representative image, in a screen in which the staying number is 1. Further, if the distance "d" is not the value such that the drawn symbols are capable of being distinguished, an acceleration symbol, a constant velocity symbol, or a deceleration symbol is drawn as a degenerated symbol, in the position corresponding to the target portion of the screen of the representative image, in a screen in which the staying number is 1 and the constant velocity number is 1 or more (see FIG. 27).

Further, in a screen where the staying number is 2 or more, a staying symbol is drawn as a symbol in the position corresponding to the target portion of the screen of the representative image, and the staying number is correspondingly drawn. Further, in a terminal screen, a terminal symbol is drawn as a symbol in the position corresponding to the screen, and the staying number is correspondingly drawn.

The symbol drawing section 105A obtains, an image signal (image data) of the representative image in which the symbols indicating the movements of the target portion are drawn in the peripheral section thereof for each scene. The image signal (image data) is supplied to the output device interface (I/F) 106. The output device interface 106 supplies the image signal which is supplied from the symbol drawing section 105A, that is, the image signal (image data) of the representative image in which the symbols indicating the movements of the target portion are drawn in the peripheral section, to an output device such as an image display device or a recording device.

Thus, for example, the image display device displays the representative image in which the symbols indicating the movements of the target portion are drawn in the peripheral section. Further, for example, in the recording device, the image signal of the representative image of each scene in which the symbols are drawn is recorded in the recording medium in accordance with each scene of the image signal input to the image input section 101.

As described above, the image processing apparatus 100A shown in FIG. 23 processes the image signals of the predetermined scene by the representative image creating section 102, and creates the representative image on the basis of the images of the respective screens which form the predetermined scene. Further, the target portion movement calculating section 103 processes the image signal of the predetermined scene and calculates the movement of the target portion of each screen in the predetermined scene. Further, the staying number calculating section 104 calculates the staying number and the movement accumulated value of the target portion of each screen in the predetermined scene, on the basis of the calculated movement of the target portion of each screen in the predetermined scene. Further, the constant velocity number calculating section 107 calculates the constant velocity number and the movement difference, of each screen in the predetermined scene, on the basis of the calculated movement of the target portion of each screen in the predetermined scene.

Further, the symbol drawing section 105A draws the symbols (normal symbol, staying symbol and terminal symbol) indicating the movements of the target portion in the peripheral section of the representative image created by the representative image creating section 102, on the basis of the calculated staying numbers, movement differences, constant velocity numbers and the like of the respective screens in the predetermined scene. Accordingly, it is possible for a reader, an editor or the like to easily grasp the overall movement of the target portion in the scene. That is, it is possible for the reader, the editor or the like to generally perceive the movement of the target portion in the scene.

In the image processing apparatus 100A shown in FIG. 23, if the distance "d" between the closest symbols in the display region is not the value such that the drawn symbols are capable of being distinguished (normal symbols), a symbol such as an acceleration symbol, a constant velocity symbol, or a deceleration symbol is drawn as a degenerated symbol. Thus, even in a case where the display size of the representative image in the output device is small, it is possible to reduce the number of symbols to be drawn and to prevent the difficulty in grasping the movement of the target portion due to excessive mixture of the drawn normal, symbols. Further, in this case, it is possible to easily grasp the acceleration period, the constant velocity period and the deceleration period of the movement of the target portion.

The degenerated symbols of the acceleration symbol, the constant velocity symbol and the deceleration symbol in the drawing example shown in FIG. 28 is an example, but the present disclosure is not limited thereto. For example, as shown in FIG. 29, as the degenerated symbols of the acceleration symbol, the constant velocity symbol and the deceleration symbol, for example, figures, symbols, arrow thicknesses, arrow directions, arrow colors, linguistic symbols (Chinese characters (加 (acceleration)/ 等 (constant velocity)/ 減 (deceleration)), English characters (acc/eq/br), or the like), different arrow color overlapping, or the like may be considered. Further, although not described, a display method using a flashing or moving icon may be applied as the type of the output device.

Figure 31A:
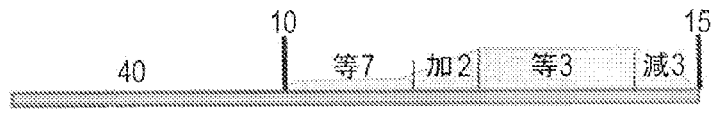
FIGS. 31A to 31C are diagrams illustrating drawing examples using degenerated symbols.
Figure 31B:
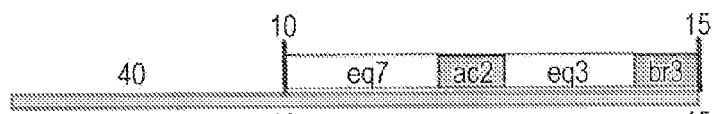
Figure 31C:
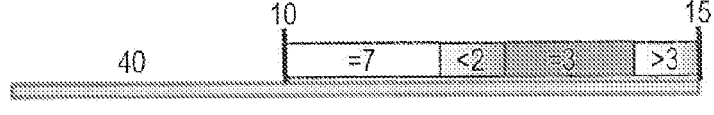

FIGS. 30A to 30F illustrate drawing examples using a variety of degenerated symbols. At this time, arrow directions may be upward and downward with reference to a reference line. Further, as described above, using the same algorithm as in a case where the normal symbol having the length corresponding to the size of the screen movement as described above is drawn, arrows (see FIG. 30D) along the envelope curve are used, and thus, it is possible to display a large range of distribution of the movement of each screen. Further, as shown in FIGS. 31A to 31C, display using polygonal shapes, rectangular shaped colors, gradation or the like may be considered.

Further, in the drawing process of the above-described degenerated symbol in the image processing apparatus 100A shown in FIG. 23, the number of symbols is dramatically decreased when the imaging device (camera) moves at the constant velocity. However, here, there is a possibility that the acceleration symbols or the deceleration symbols may be packed to be drawn. Readability may be covered by modifying the shapes of the symbols, but it is possible to degenerate the number of the acceleration symbols or deceleration symbols by the following method.

One is a technique which detects frames in which the constant velocity numbers of 1 are continuous, and draws an acceleration symbol or a deceleration symbol only at a final one timing among the continuous constant velocity numbers. The other one is a technique which calculates a difference of the movement difference with respect to the further previous frame. This is referred to as a "movement acceleration difference". On the basis of the movement acceleration difference, an accelerated constant velocity number may be calculated by the same process as the process of the flowchart in FIG. 24, and the acceleration symbol and the deceleration symbol may be drawn using the accelerated constant velocity number in a similar way to the constant velocity number as described above (see FIG. 27).

Further, in the image processing apparatus 100A shown in FIG. 23, the symbol drawing section 105A draws the acceleration symbol or the deceleration symbol in a screen where the constant velocity number is 1, and draws the constant velocity symbol in a screen where the constant velocity number is 2 or more (see FIG. 27). However, generally, the symbol drawing section 105A may draw the acceleration symbol or the deceleration symbol in a screen where the constant velocity number is 1 to M (M is an integer which is equal to or larger than 1), and may draw the constant velocity symbol in a screen where the constant velocity number exceeds M. Further, in this case, a user may arbitrarily set the value of M through a user operating section (not shown).

4. Fourth Embodiment

In the symbol drawing process in the image processing apparatus 100A shown in FIG. 23, if the distance "d" between the closest symbols in the display region is not the value such that the drawn symbols are capable of being distinguished, the degenerated symbol drawing process is performed (step ST98 in FIG. 26). However, if the distance "d" is not the value such that the drawn symbols are capable of being distinguished, any one of the degenerated symbol drawing process or the thinning-out drawing process may be performed according to a user selection setting.

[Configuration Example of Image Processing Apparatus]

Figure 32:
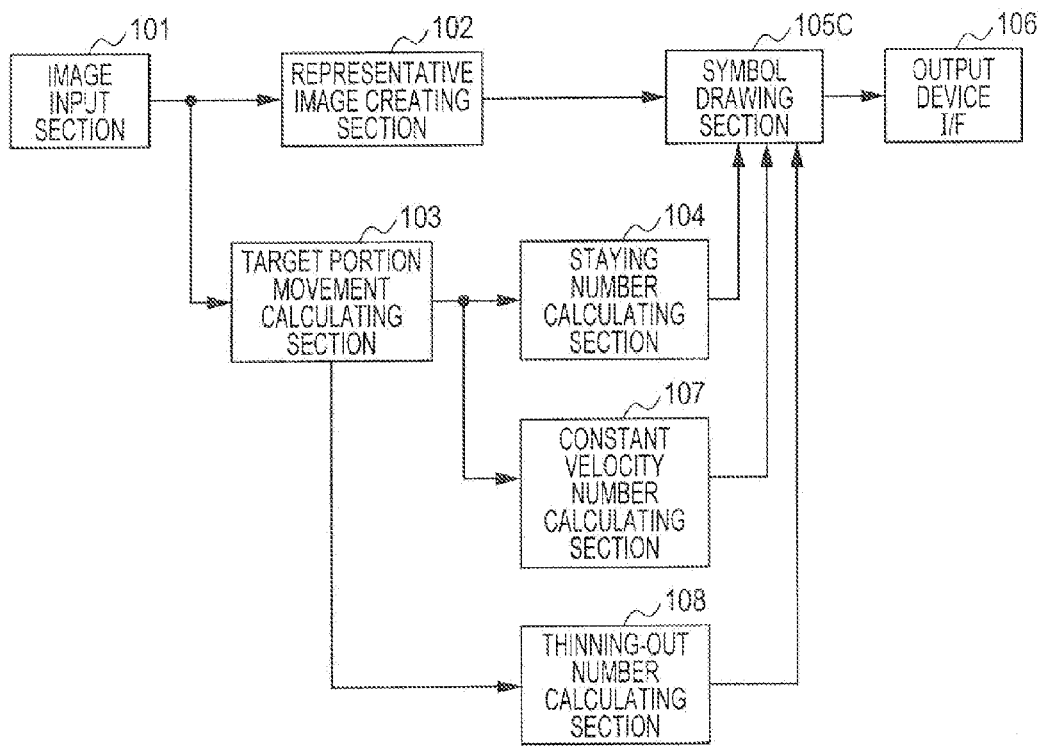
FIG. 32 is a block diagram illustrating a configuration example of an image processing apparatus according to a fourth embodiment of the present disclosure.

FIG. 32 illustrates a configuration example of an image processing apparatus 100C according to a fourth embodiment. The image processing apparatus 100C includes an image input section 101, a representative image creating section 102, a target portion movement calculating section 103, a staying number calculating section 104, a symbol drawing section 105C, an output device interface (I/F) 106, a constant velocity number calculating section 107, and a thinning-out number calculating section 108. In FIG. 32, the same reference numerals are given to sections corresponding to those in FIG. 1, FIG. 14 and FIG. 23, and detailed description thereof will be appropriately omitted.

Figure 33:
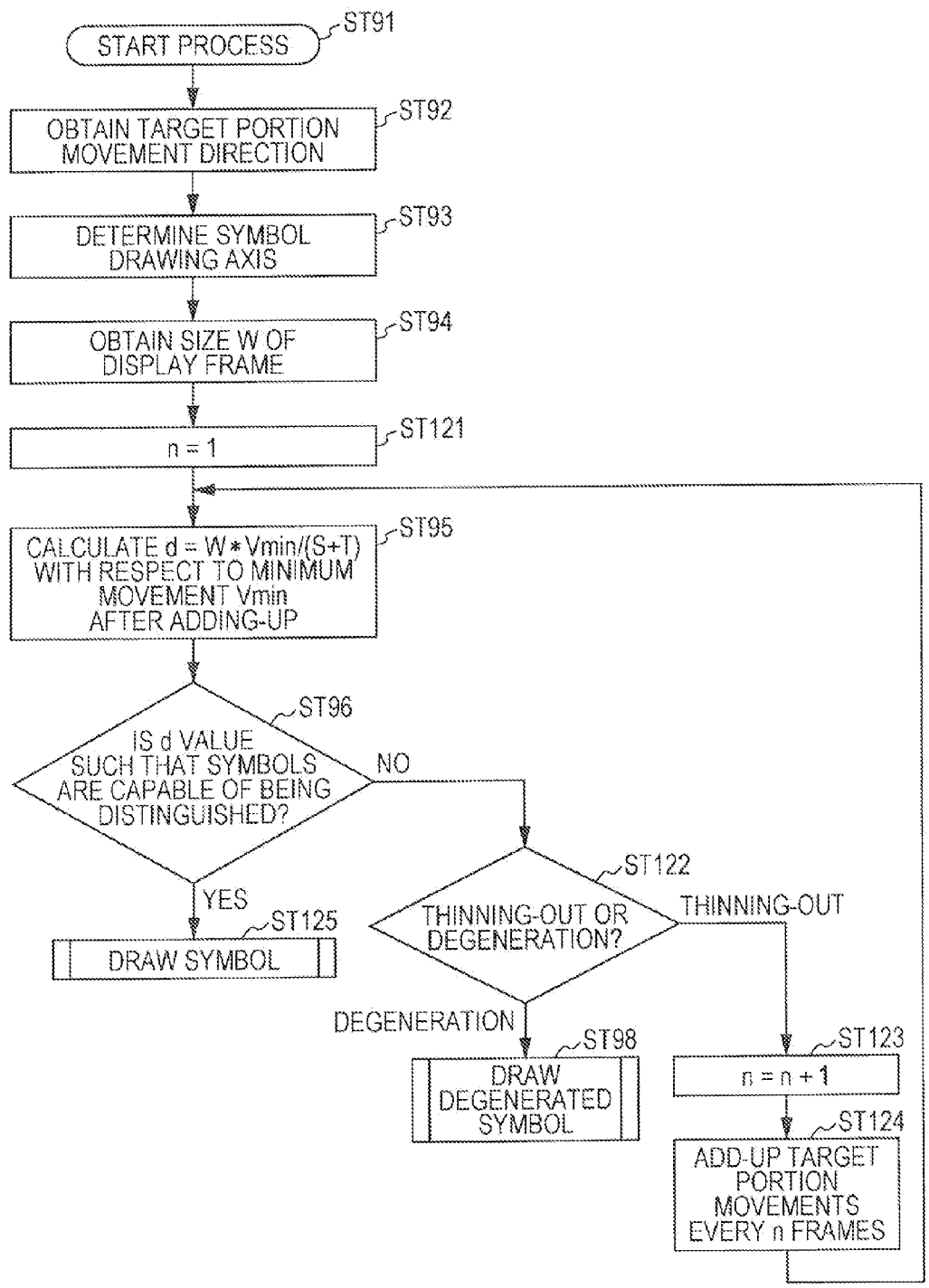
FIG. 33 is a flowchart illustrating an example of a process routine of a symbol drawing section.

FIG. 33 is a flowchart illustrating an example of a process routine of a symbol drawing section 105C in this case. In FIG. 33, the same reference numerals are given to steps corresponding to those in FIG. 26, and detailed description thereof will be omitted. The symbol drawing section 105C obtains the size W of the display frame in step ST94, sets the combination number n of the frames to 1 in step ST121, and then allows the routine to proceed to step ST95.

Further, the symbol drawing section 105C calculates the distance "d" using the expression (1) with respect to the minimum movement Vmin of the frame, in step ST95. Further, in step ST96, it is determined whether the calculated distance "d" is a value (for example, "2") such that the drawn symbols are capable of being distinguished. If the distance "d" is small compared with the sizes of the drawn symbols, it may be difficult to view the drawn symbols drawn by a user.

Further, if the distance "d" is not the value such that the drawn symbols are capable of being distinguished in step ST96, the symbol drawing section 105C determines in step ST122 whether the user selection setting corresponds to any one of the degenerated symbol drawing process or the thinning-out drawing process. If the user selection setting corresponds to the degenerated symbol drawing process, the symbol drawing section 105C allows the routine to proceed to the degenerated symbol drawing process in step ST98.

On the other hand, if the user selection setting corresponds to the thinning-out drawing process, the symbol drawing section 105O allows the routine to proceed to step ST123. In step ST123, the symbol drawing section 105C increments the frame combination number n by 1. Further, in step ST124, the symbol drawing section 105C performs combination of the target portion movements every n frames, and then returns the routine to step ST95.

Further, in step ST96, if the distance "d" is the value such that the drawn symbols are capable of being distinguished, the symbol drawing section 105C allows the routine to proceed to step ST125. The symbol drawing process corresponds to the process of step ST48 in the flowchart of FIG. 16 (see FIG. 17).

5. Fifth Embodiment

[Configuration Example of Image Processing Apparatus]

Figure 34:
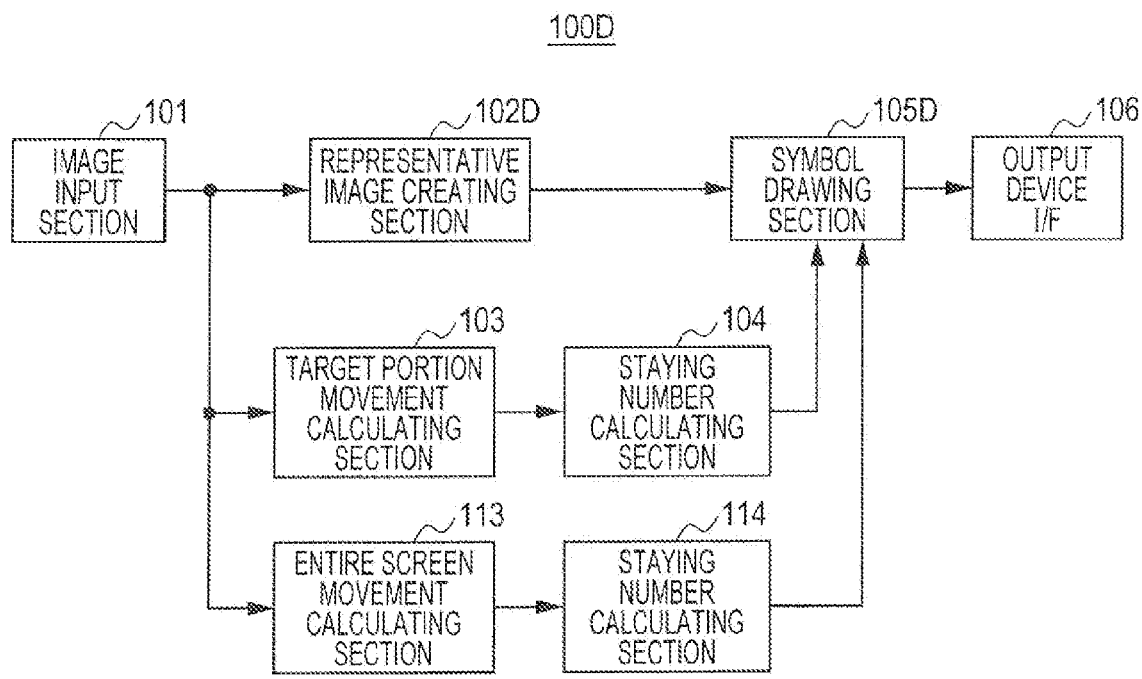
FIG. 34 is a block diagram illustrating a configuration example of an image processing apparatus according to a fifth embodiment of the present disclosure.

FIG. 34 illustrates a configuration example of an image processing apparatus 100D according to a fifth embodiment. The image processing apparatus 100D includes an image input section 101, a representative image creating section 102D, a target portion movement calculating section 103, a staying number calculating section 104, a symbol drawing section 105D, and an output device interface (I/F) 106. Further, the image processing apparatus 100D includes an entire screen movement calculating section 113 and a staying number calculating section 114. In FIG. 34, the same reference numerals are given to the sections corresponding to those in FIG. 1, and detailed description thereof will be appropriately omitted.

Figure 35:
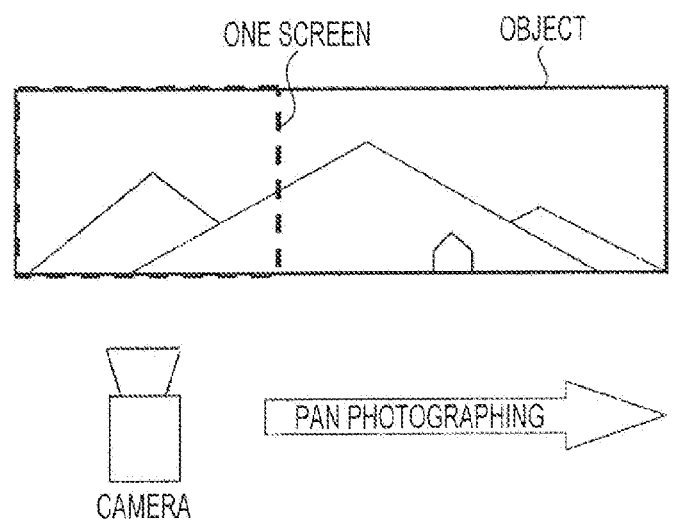
FIG. 35 is a diagram illustrating an example where an object which extends in a horizontal direction is photographed by an imaging device (camera) using a pan technique.

In the related art, an object which is, not fit for one screen of an imaging device (camera) has been photographed in a plurality of frames using a technique such as pan or tilt. FIG. 35 illustrates an example in which an object which extends in the horizontal direction is photographed by the imaging device (camera) using the pan technique.

Further, in the related art, a technique has been proposed which processes a photographed or created image signal, selects a predetermined screen (for example, an initial screen or the like) for each scene, and uses the image of the screen as a representative image. In this case, for example, it is difficult for a reader, an editor or the like to grasp the entire image, with respect to the object which is not fit for one screen of the imaging device (camera) using the above-described pan technique.

Thus, it is considered that the above-described united image is created as a representative image (thumbnail). With the representative image created in this way, it is possible for a reader or an editor to grasp all the images, with respect to the object which is photographed using the pan technique, which is not fit for one screen of the imaging device (camera). However, it is difficult to obtain information about the pan speed or the like, even with this representative image. In this case, it is difficult for a reader, editor or the like to generally view "what object is photographed and which expression the object is photographed in?" in a scene, over "what object is photographed?" therein.

The image processing apparatus 100D shown in FIG. 34 is capable of grasping the entire movement of the target portion in the scene. Further, the image processing apparatus 100D is capable of grasping, in a scene representative image including a united image, all the images in the scene, and also is capable of grasping the movements of the respective screens in the scene.

The representative image creating section 102D processes the image signals of the predetermined scene, and creates a united image which is obtained by connecting the images of the respective screens (frames) which form the predetermined scene, as the representative image of the predetermined scene. Detailed description of a method of creating the united image is omitted, but this is disclosed in Japanese Unexamined Patent Application Publication. No. 07-298137, Japanese Unexamined Patent Application Publication No. 06-326965, or the like as techniques in the related art. For example, the representative image creating section 102D calculates the entire screen movements (movement vectors) of the respective screens which form the predetermined scene, and connects the respective images on the basis of the calculated entire screen movements of the respective screens to create the united image.

The entire screen movement calculating section 113 processes the image signals of the predetermined scene, and calculates the entire screen movements (movement vectors) of the respective screens in the predetermined scene. Detailed description of a calculation method of the entire screen movements is omitted, but this is disclosed in Japanese Unexamined Patent Application Publication No. 2001-086387, Japanese Unexamined Patent Application Publication No. 2007-104516, Japanese Unexamined Patent Application Publication No. 2004-88474, or the like as techniques in the related art. For example, the entire screen movement calculating section 113 calculates the entire screen movements (movement vectors) of the respective screens which form the predetermined scene, by the same process as the calculation process of the entire screen movements (movement vectors) in the representative image creating section 102D.

The staying number calculating section 114 calculates the staying numbers of the respective screens, on the basis of the entire screen movements of the respective screens in the predetermined scene calculated by the entire screen movement detecting section 113. Although detailed description thereof is omitted, but the staying number calculating section 114 calculates the staying numbers and the accumulated values of the respective frames (screens), on the basis of the entire screen movements Mv of the respective frames, in a similar way to the staying number calculating section 104. That is, the staying number calculating section 104 uses the target portion movements Mv of the respective frames, but the staying number calculating section 114 uses the entire screen movements Mv.

The symbol drawing section 105D draws the symbols indicating the movements of the target portion in the peripheral section of the representative image (united image) which is created by the representative image creating section 102D, on the basis of the staying numbers of the respective screens calculated by the staying number calculating section 104.

Further, the symbol drawing section 105D draws the symbols indicating the entire screen movements in the peripheral section of the representative image (united image) which is created by the representative image creating section 102D, on the basis of the staying numbers of the respective screens calculated by the staying number calculating section 114.

Although detailed description thereof is omitted, the drawing process of the symbols indicating the entire screen movements is performed in a similar way to the drawing process of the symbols indicating the movements of the target portion. In a certain frame (screen), the symbols indicating the movements of the target portion are drawn in a position corresponding to the target portion of the frame of the representative image (united image), but the symbols indicating the entire screen movements are drawn in a position corresponding to the frame of the representative image (united image).

Further, the symbol drawing section 105D supplies the image signal (image data) of the representative image in which the symbols indicating the movements of the target portion and the entire screen movements are respectively drawn in the peripheral section thereof to the output device interface (I/F) 106. Detailed description thereof about the image processing apparatus 100D shown in FIG. 34 is omitted, but other sections thereof are the same as in the image processing apparatus 100 shown in FIG. 1.

[Operation Example of Image Processing Apparatus]

An operation example of the image processing section 100D shown in FIG. 34 will be described. An image signal which is a processing target is input to the image input section 101. The image signal which is the processing target is obtained by photographing of an imaging device (camera), for example, and is directly supplied from the imaging device (camera) or is supplied by being read from a predetermined recording medium.

The image input section 101 processes the input image signal to detect a scene change point, and divides the input image signals for each scene. Further, the image input section 101 sequentially supplies the image signals of each scene to the representative image creating section 102D, the target portion movement detecting section 103 and the entire screen movement calculating section 113.

The representative image creating section 102D, the target portion movement calculating section 103, the staying number calculating section 104, the entire screen movement calculating section 113, the staying number calculating section 114, and the symbol drawing section 105D sequentially process the respective scenes as a scene (predetermined scene) which is a processing target. The representative image creating section 102D sequentially processes the respective scenes as a scene (predetermined scene) which is a processing target. That is, the representative image creating section 102D processes the image signals of the predetermined scene, and creates a united image obtained by connecting the images of the respective screens (frames) which form the predetermined scene as the representative image of the predetermined scene.

Further, the target portion movement calculating section 103 processes the image signals of the predetermined scene, and calculates the movements (movement vectors) of the target portion of the respective screens in the predetermined scene. The movements of the target portion of the respective Screens in the predetermined scene are supplied to the staying number calculating section 164. The staying number calculating section 104 calculates the staying numbers and the accumulated values of the target portion of the respective screens, on the basis of the movements of the target portion of the respective screens in the predetermined scene (see FIG. 2).

The entire screen movement calculating section 113 processes the image signals of the predetermined scene, and calculates the entire screen movements (movement vectors) of the respective screens in the predetermined scene. The calculated entire screen movements of the respective screens in the predetermined scene are supplied to the staying number calculating section 114. The staying number calculating section 114 calculates the staying numbers and the accumulated values of the respective screens in the predetermined scene, on the basis of the entire screen movements of the respective screens in the predetermined scene.

The staying numbers and the accumulated values of the respective screens in the predetermined scene calculated by the staying number calculating section 104 are supplied to the symbol drawing section 105. Further, the staying numbers and the accumulated values of the respective screens in the predetermined scene calculated by the staying number calculating section 114 are supplied to the symbol drawing section 105D. Further, the image signal (image data) of the representative image created by the representative image creating section 102D is supplied to the symbol drawing section 105D.

The symbol drawing section 105D draws the symbols indicating the movements of the target portion in the peripheral section of the representative image, on the basis of the staying numbers of the target portion of the respective screens (see FIG. 4). Further, the symbol drawing section 105D draws the symbols indicating the entire screen movements in the peripheral section of the representative image, on the basis of the staying numbers of the entire screens of the respective screens.

Thus, the symbol drawing section 105D obtains the image signal (image data) of the representative image (united image) in which the symbols respectively indicating the movements of the target portion and the entire screen movements are drawn in the peripheral section thereof for each scene. The image signal (image data) is supplied to the output device interface (I/F) 106. Further, the output device interface 106 supplies the image signal (image data) to an output device such as an image display device or a recording device.

Figure 36:
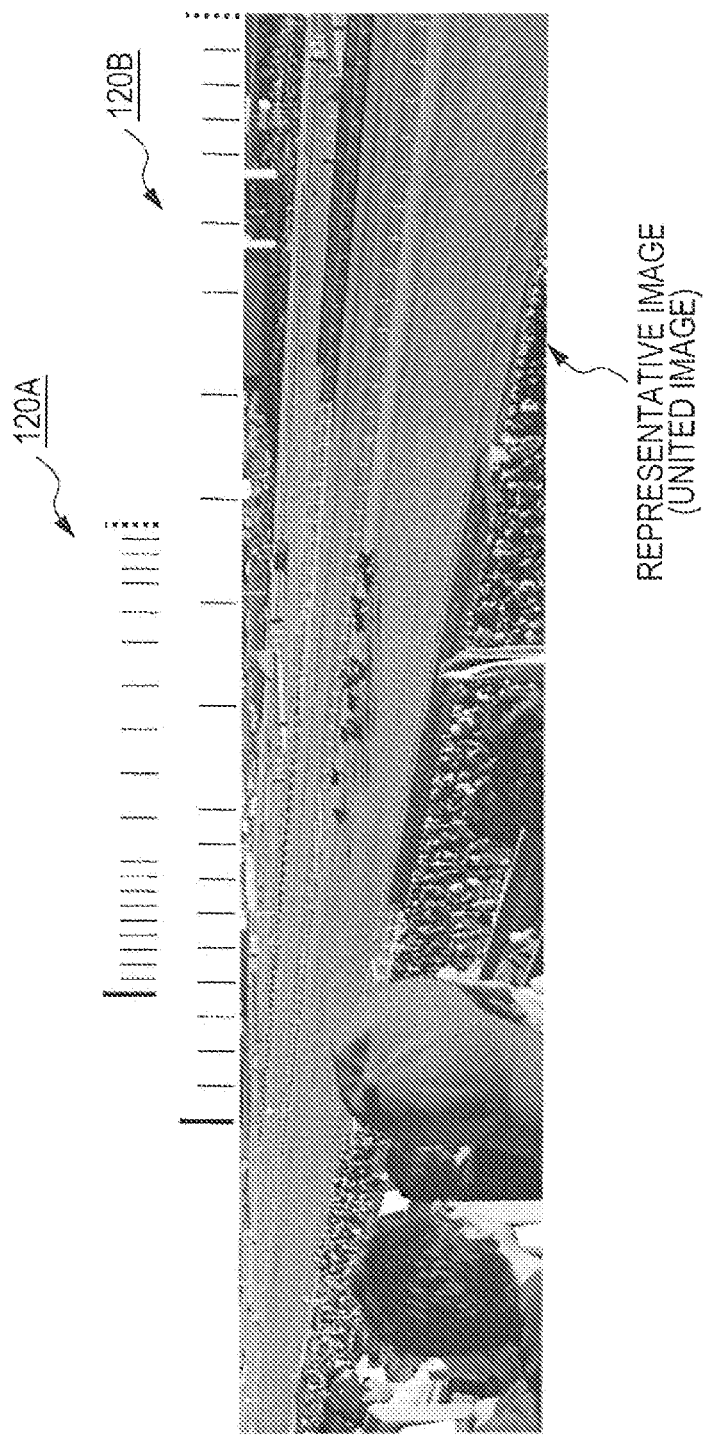
FIG. 36 is a diagram illustrating a drawing example according to a symbol drawing process.

FIG. 36 is a diagram illustrating a drawing example in which a target portion movement direction and an entire screen movement direction are horizontal. In the periphery of the representative image (united image), symbols (symbol group) 120A indicating the movements of the target portion and symbols (symbol group) 120B indicating the entire screen movements are drawn.

As described above, the image processing apparatus 100D shown in FIG. 34 is capable of easily grasping the entire movement of the target portion in the scene. Further, the image processing apparatus 100D is capable of grasping, in a scene representative image including a united image, all the images in the scene, and also is capable of grasping the movements of the respective screens in the scene.

Figure 37:
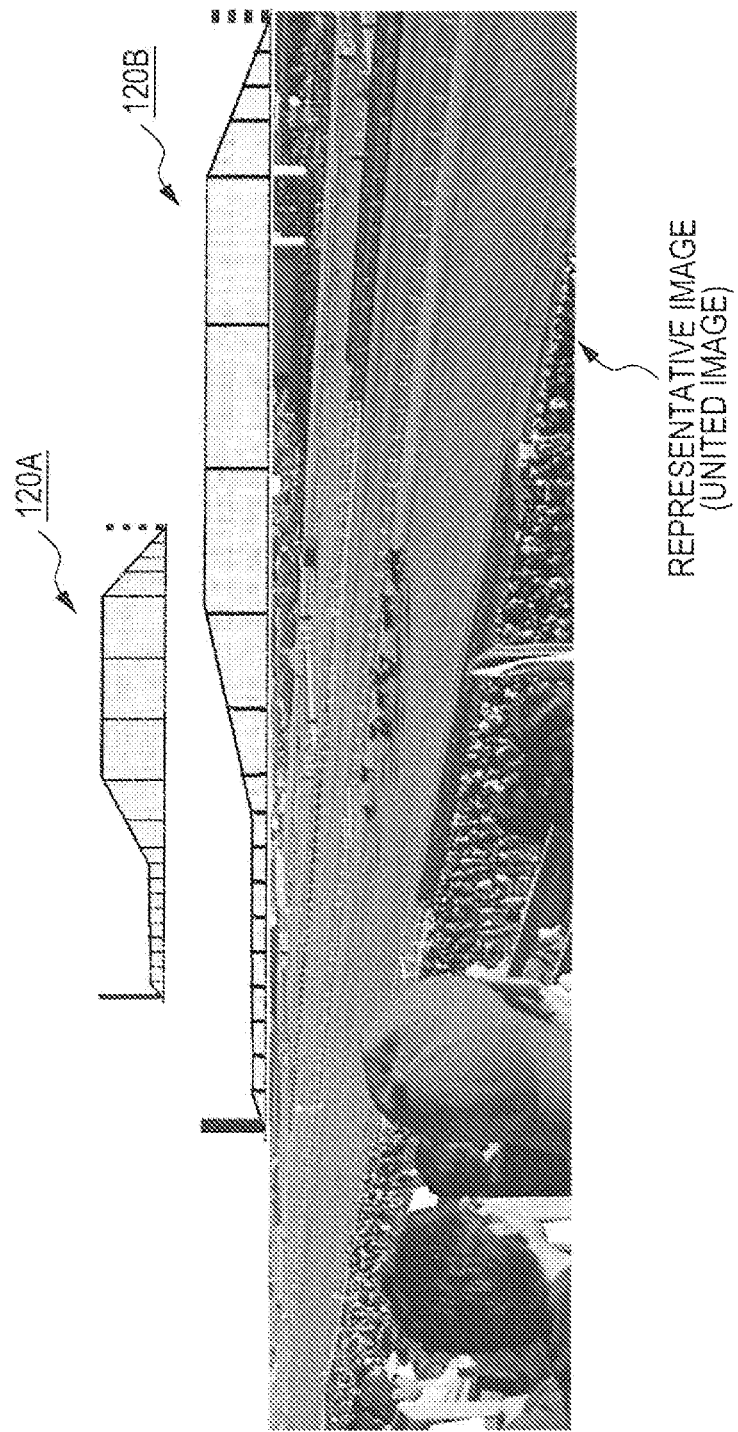
FIG. 37 is a diagram illustrating a drawing example according to a symbol drawing process.

With respect to the drawing types of the symbols indicating the entire screen movements, it is possible to use a variety of types in a similar way to the drawing types of the symbols indicating the movements of the target portion as described above (see FIGS. 8, 9A, 9B, 10A, 10B, 10C, 12A, 12B, 13, 18, 20, 22, 28 and the like). FIG. 37 illustrates another drawing example in which symbols (symbol group) 120A indicating the movements of the target portion and symbols (symbol group) 120B indicating the entire screen movements are drawn in the periphery of the representative image (united image).

In this drawing example, the normal symbols which are deeply drawn are thinned-out. Thus, even in a case where the display size of the representative image in the output device is small, it is possible to prevent the difficulty in grasping the movements of the target portion due to excessive mixture of the drawn normal symbols. Further, in this case, since the length of the normal symbol drawn in each screen corresponds to the movement of the target portion and the entire screen movement of the screen, it is possible to increase the amount of information indicated by the normal symbol [TY3].

Figure 38:
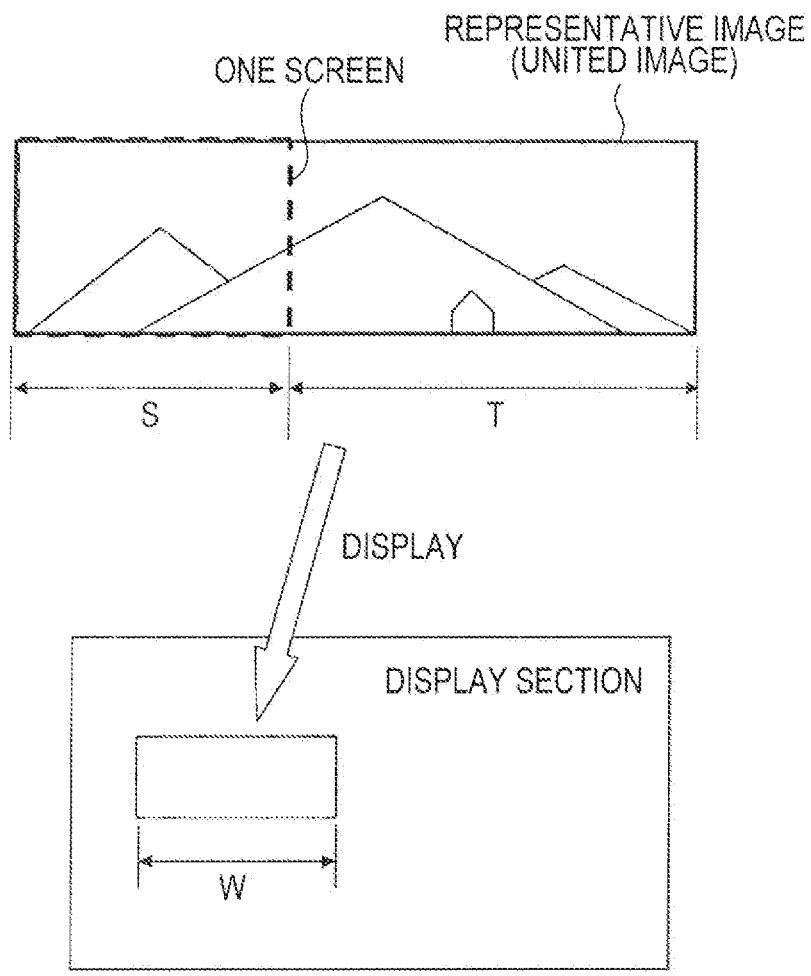
FIG. 38 is a diagram illustrating a length S in an entire screen movement direction of a screen for calculating a distance d between the closest symbols in a display region, an accumulated value T of entire screen movements, and a length W, in the entire screen movement direction, of a display region of a representative image in an output device.
Figure 39:
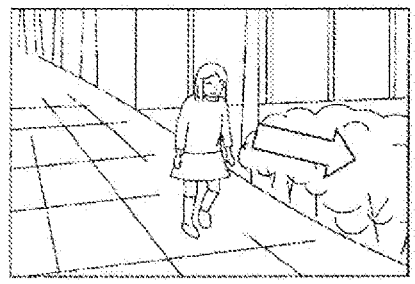
FIG. 39 is a diagram illustrating, for example, a state where a movement vector is attached to a target portion which is accompanied by movement of a figure, an object or the like of a representative image.

As described above, in a case where the united image obtained by connecting the images of the respective screens (frames) which form the predetermined scene is the representative image, the distance "d" between the closest symbols in the display region is calculated by the following expression (2), instead of the above-described expression (1). That is, the distance "d" is calculated by the expression (2), using a length "S" in the entire screen movement direction of the screen, an accumulated value T of the entire screen movements, a minimum movement Vmin among the entire screen movements where it is determined that the target portion is not staying, and a length "W", in the entire screen movement direction of the display region of the representative image in an output device. FIG. 38 illustrates sections corresponding to the length "S", the accumulated value T and the length "W".

$$d = W * V\min/(S+T) \quad (2)$$

The present disclosure contains subject matter related to that disclosed in Japanese Priority Patent Application JP 2010-274387 filed in the Japan Patent Office on Dec. 9, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
one or more processors operable to:
create a representative image based on images of respective screens which form a predetermined scene;
draw a symbol based on a movement of a target portion of each of the respective screens in the predetermined scene,
wherein the symbol is drawn in a peripheral section of the representative image indicating the movement of the target portion; and
calculate a staying number of the target portion of each of the respective screens based on the movement of the target portion of each of the respective screens in the predetermined scene,
wherein when it is determined that the target portion of a corresponding one of the respective screens is staying, the one or more processors are operable to set the staying number of the target portion of the corresponding one of the respective screens to 0 and increment a staying counter by 1, and when it is determined that the target portion of the corresponding one of the respective screens is not staying, the one or more processors are operable to set the staying number of the target portion of an immediately previous screen to a value of the staying counter, set the staying number of the target portion of the corresponding one of the respective screens to 1, set the value of the staying counter to 1, and set a staying number of the target portion of a final screen of the respective screens to the value of the staying counter, and wherein the symbol indicating the movement of the target portion in the peripheral section of the representative image is drawn based on the staying number of the target portion of each of the respective screens.

2. The image processing apparatus according to claim 1, wherein the symbol is drawn in the peripheral section of the representative image in the position corresponding to the target portion of the predetermined screen when the staying number of the target portion of the predetermined screen is 1 or more.

3. The image processing apparatus according to claim 2, wherein the drawn symbol is a normal symbol in the position corresponding to the target portion of the predetermined screen in the peripheral section of the representative image when the staying number of the target portion of the predetermined screen is 1 or more and N or less, wherein N is an integer which is equal to or larger than 1; and wherein the drawn symbol is a staying symbol in the position corresponding to the target portion of the predetermined screen in the peripheral section of the representative image when the staying number of the target portion of the predetermined screen exceeds N.

4. The image processing apparatus according to claim 3, wherein the drawn symbol is of a line segment shape extending in a direction perpendicular to a movement direction of the target portion; and wherein a length of the normal symbol is set corresponding to a magnitude of the movement of the target portion of the predetermined screen when the staying number of the target portion of the predetermined screen is N or less.

5. The image processing apparatus according to claim 4, wherein the length h of the normal symbol drawn when the staying number of the target portion of the predetermined screen is 1 or more and N or less, is set according to an expression H*Mv/Mvmax, where H is the length, in the direction perpendicular to the movement direction of the target portion, Mvmax is a maximum movement among the movements of the target portion, and Mv is the movement of the target portion of each of the respective screens.

6. The image processing apparatus according to claim 3, wherein the one or more processors are operable to determine a proximity between the drawn symbols, and change a drawing state of the normal symbol when the staying number of the target portion of the predetermined screen is 1 or more and N or less based on the determination result.

7. The image processing apparatus according to claim 6, wherein the one or more processors are operable to draw the normal symbol every predetermined number of screens of the respective screens so that the distance between the drawn symbols in the movement direction of the target portion exceeds a predetermined value in a display region of an output device.

8. The image processing apparatus according to claim 7, wherein the one or more processors are operable to:

draw, as the symbol, a symbol of a line segment shape extending in a direction perpendicular to a movement direction of the target portion;

calculate a length h of the normal symbol drawn when the staying number of the target portion of the predetermined screen is 1 or more and N or less according to an expression H*Mv/Mvmax where H is the length, in the direction perpendicular to the movement direction of the target portion, Mvmax is a maximum movement among the movements of the target portion, and Mv is the movement of the target portion of each of the respective screens; and draw the normal symbol drawn in every predetermined number of screens deeply and draws the normal symbol in a different screen lightly.

9. The image processing apparatus according to claim 6, wherein when the distance between the drawn symbols in the movement direction of the target portion is smaller than a predetermined value in a display region of an output device, an acceleration symbol is drawn corresponding to an acceleration period, a constant velocity symbol is drawn corresponding to a constant velocity period, and a deceleration symbol is drawn corresponding to a deceleration period, according to a movement difference of the target portion between each of the respective screens and a previous screen.

10. The image processing apparatus according to claim 9, wherein the one or more processors are further operable to:

calculate a constant velocity number of each of the respective screens based on the movement difference of the target portion between each of the respective screens and a previous screen in the predetermined scene, wherein when it is determined that the target portion of the predetermined screen is staying, the constant velocity number of the target portion of the predetermined screen is set to 0 and a constant velocity counter is incremented by 1, and when it is determined that the target portion of the predetermined-screen is not staying, the constant velocity number of the target portion of an immediately previous screen is set to a value of the constant velocity counter, the constant velocity number of the target portion of the predetermined screen is set to 1, and the value of the constant velocity counter is set to 1, and wherein the acceleration symbol or the deceleration symbol is displayed in the peripheral section of the representative image in the position corresponding to the target portion of the predetermined screen when the constant velocity number of the target portion of the predetermined screen is 1 or more and M or less, wherein M is an integer which is equal to or larger than 1, and wherein the constant velocity symbol is drawn in the peripheral section of the representative image corresponding to the target portion of the predetermined screen when the constant velocity number of the target portion of the predetermined screen exceeds M.

11. The image processing apparatus according to claim 10, wherein the one or more processors are operable to accumulates the movement difference of each of the target portion of the respective screens, and determine whether the target portion of the predetermined screen moves at a constant velocity according to whether the accumulated value is within the range of a threshold, and sets the accumulated value to 0 if it is determined that the target portion of the predetermined screen moves at the constant velocity.

12. The image processing apparatus according to claim 10, wherein the one or more processors determines whether the target portion of the corresponding one of the respective screens moves at a constant velocity according to whether the movement difference of the target portion of the predetermined screen is within the range of a threshold.

13. The image processing apparatus according to claim 6, wherein the one or more processors calculates a distance d between the closest symbols in a display region according to an expression W*Vmin/S, where the length of one screen in a movement direction of the target portion is S, a minimum movement among the movements of the target portion, in which it is determined that the target portion is not staying, is Vmin, and the length in the movement direction of the target portion of a display region of the representative image in an output device is W, and determines the proximity between the symbols based on the distance d.

14. An image processing method comprising:
in an image processing apparatus comprising one or more processors:
creating a representative image based on images of respective screens which form a predetermined scene;
drawing a symbol based on a movement of a target portion of each of the respective screens in the predetermined scene,
wherein the symbol is drawn in a peripheral section of the representative image indicating the movement of the target portion; and
calculating a staying number of the target portion of each of the respective screens based on the movement of the target portion of each of the respective screens in the predetermined scene,
wherein when it is determined that the target portion of a corresponding one of the respective screens is staying, the staying number of the target portion of the corresponding one of the respective screens is set to 0 and a staying counter is incremented by 1, and when it is determined that the target portion of the corresponding one of the respective screens is not staying, the staying number of the target portion of an immediately previous screen is set to a value of the staying counter, the staying number of the target portion of the corresponding one of the respective screens is set to 1, the value of the staying counter is set to 1, and a staying number of the target portion of a final screen of the respective screens is set to the value of the staying counter, and
wherein the symbol indicating the movement of the target portion in the peripheral section of the representative image is drawn based on the staying number of the target portion of each of the respective screens.

15. An image processing apparatus comprising:
one or more processors operable to:
create a representative image, wherein the representative image is a united image obtained by connecting images of respective screens which form a predetermined scene;
draw a first symbol based on an entire screen movement of each of the respective screens in the predetermined scene,
wherein the first symbol is drawn in a peripheral section of the representative image in a first position indicating the entire screen movement;
draw a second symbol based on a movement of a target portion of each of the respective screens in the predetermined scene,
wherein the second symbol is drawn in the peripheral section of the representative image indicating the movement of the target portion; and
calculate a staying number of the target portion of each of the respective screens based on the movement of the target portion of each of the respective screens in the predetermined scene,
wherein when it is determined that the target portion of a corresponding one of the respective screens is staying, the one or more processors are operable to set the staying number of the target portion of the corresponding one of the respective screens to 0 and increment a staying counter by 1, and when it is determined that the target portion of the corresponding one of the respective screens is not staying, the one or more processors are operable to set the staying number of the target portion of an immediately previous screen to a value of the staying counter, set the staying number of the target portion of the corresponding one of the respective screens to 1, set the value of the staying counter to 1, and set a staying number of the target portion of a final screen of the respective screens to the value of the staying counter, and
wherein the second symbol indicating the movement of the target portion in the peripheral section of the representative image is drawn based on the staying number of the target portion of each of the respective screens.

* * * * *